US009836780B2

(12) United States Patent
Cooke et al.

(10) Patent No.: US 9,836,780 B2
(45) Date of Patent: Dec. 5, 2017

(54) METHOD AND SYSTEM FOR CONSUMER TRANSACTIONS USING VOICE OR HUMAN BASED GESTURE ACTIONS

(75) Inventors: Alan Cooke, Dublin (IE); Garry Lyons, Dublin (IE); Oran Cummins, Dublin (IE); Stephen Elder, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 925 days.

(21) Appl. No.: 13/299,896

(22) Filed: Nov. 18, 2011

(65) Prior Publication Data

US 2012/0130866 A1 May 24, 2012

Related U.S. Application Data

(60) Provisional application No. 61/415,529, filed on Nov. 19, 2010, provisional application No. 61/479,134, (Continued)

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0643* (2013.01)

(58) Field of Classification Search
CPC ................ G06Q 30/06–30/0645; G06Q 30/08
(Continued)

(56) References Cited

U.S. PATENT DOCUMENTS 6,023,688 A * 2/2000 Ramachandran .... G06Q 20/042
705/40
6,587,835 B1 7/2003 Treyz et al.
(Continued)

FOREIGN PATENT DOCUMENTS

CN 101520924 A 9/2009
EP 1513120 A2 3/2005
(Continued)

OTHER PUBLICATIONS

Rankin, Beth: "Smartphone app puts you beyond bar code," The Courier, Oct. 2010; ProQuest Dialog #760073875, 5pgs.*
(Continued)

*Primary Examiner* — Rob Pond
(74) *Attorney, Agent, or Firm* — Buchanan Ingersoll & Rooney pc

(57) ABSTRACT

A method of initiating a consumer transaction using a human interaction device to read voice or human based gesture actions is disclosed. Video data is transmitted from a processing device to a display device. The video is monitoring for event data corresponding to a plurality of consumer products or services, and monitored event data is received in the processing device. A consumer is notified on the display device of an eligible consumer transaction. Voice or human based gesture actions are read with a human interaction device and are analyzed. If the voice or human based gesture actions conform to a predetermined set of requirements, then a consumer transaction for the plurality of consumer products or services is initiated.

23 Claims, 35 Drawing Sheets

Related U.S. Application Data filed on Apr. 26, 2011, provisional application No. 61/534,832, filed on Sep. 14, 2011.

(58) Field of Classification Search
USPC .................................. 705/26.1–27.2, 26, 27
See application file for complete search history.

(56) References Cited

U.S. PATENT DOCUMENTS

| | | |
|---|---|---|
| 7,142,877 B2 | 11/2006 | Lipovski |
| 7,231,025 B2 | 6/2007 | Labaton |
| 7,363,042 B2 | 4/2008 | Lipovski |
| 7,389,275 B2 | 6/2008 | Kemper et al. |
| 7,584,886 B2 | 9/2009 | Labaton |
| 7,702,581 B2 | 4/2010 | Hogl |
| 7,774,283 B2 | 8/2010 | Das et al. |
| 7,988,058 B2 | 8/2011 | Englebardt et al. |
| 8,136,724 B1 | 3/2012 | Aidasani et al. |
| 8,138,930 B1 | 3/2012 | Heath |
| 8,172,135 B1 | 5/2012 | Aidasani et al. |
| 8,332,323 B2* | 12/2012 | Stals ................ G06Q 20/02 235/379 |
| 8,625,838 B2 | 1/2014 | Song et al. |
| 8,682,739 B1 | 3/2014 | Feinstein |
| 2002/0095333 A1 | 7/2002 | Jokinen et al. |
| 2005/0121512 A1 | 6/2005 | Wankmueller |
| 2005/0144123 A1 | 6/2005 | Malcom |
| 2005/0197968 A1 | 9/2005 | Das et al. |
| 2005/0212750 A1 | 9/2005 | Marvit et al. |
| 2005/0248454 A1 | 11/2005 | Hanson et al. |
| 2005/0282603 A1* | 12/2005 | Parrott ................ G06F 3/013 463/1 |
| 2006/0019605 A1 | 1/2006 | Shau |
| 2007/0039020 A1* | 2/2007 | Cansler, Jr. ........ H04N 5/44513 725/37 |
| 2007/0041667 A1* | 2/2007 | Cox ................ G06F 17/30017 382/305 |
| 2007/0232355 A1 | 10/2007 | Labaton |
| 2008/0081666 A1 | 4/2008 | Masera et al. |
| 2008/0301737 A1 | 12/2008 | Hjelmeland Almas et al. |
| 2009/0254440 A1* | 10/2009 | Pharris ................ G06Q 20/102 705/17 |
| 2009/0281904 A1 | 11/2009 | Pharris |
| 2009/0284482 A1 | 11/2009 | Chin |
| 2010/0053169 A1 | 3/2010 | Cook |
| 2010/0082481 A1 | 4/2010 | Lin et al. |
| 2010/0198691 A1* | 8/2010 | Yates ................ G06Q 10/101 705/14.58 |
| 2010/0205069 A1* | 8/2010 | Hodson et al. ................ 705/27 |
| 2010/0211452 A1 | 8/2010 | D'Angelo et al. |
| 2010/0211506 A1 | 8/2010 | Chang et al. |
| 2010/0250364 A1 | 9/2010 | Song et al. |
| 2010/0262449 A1 | 10/2010 | Monteforte et al. |
| 2011/0029370 A1 | 2/2011 | Roeding et al. |
| 2011/0099069 A1* | 4/2011 | Hoelz ................ G06Q 30/02 705/14.55 |
| 2011/0137797 A1* | 6/2011 | Stals ................ G06Q 20/02 705/44 |
| 2011/0154266 A1 | 6/2011 | Friend |
| 2011/0156867 A1 | 6/2011 | Carrizo |
| 2011/0196757 A1 | 8/2011 | Pacella |
| 2011/0214082 A1* | 9/2011 | Osterhout et al. ............ 715/773 |
| 2011/0238495 A1 | 9/2011 | Kang |
| 2012/0089425 A1* | 4/2012 | Borucki ................ 705/5 |
| 2012/0123877 A1* | 5/2012 | Buick ................ G06Q 30/0277 705/14.73 |
| 2012/0130790 A1 | 5/2012 | Lyons et al. |
| 2012/0130888 A1 | 5/2012 | Cooke et al. |
| 2012/0130889 A1 | 5/2012 | Lyons et al. |
| 2012/0131094 A1 | 5/2012 | Lyons et al. |
| 2013/0066749 A1 | 3/2013 | Cooke et al. |
| 2013/0179336 A1 | 7/2013 | Lyons et al. |

FOREIGN PATENT DOCUMENTS

| | | |
|---|---|---|
| EP | 1 587 014 A1 | 10/2005 |
| EP | 2128809 A1 | 4/2008 |
| JP | 2002-099716 A | 4/2002 |
| JP | 2006-155476 A | 6/2006 |
| KR | 10-2004-0082225 A | 9/2004 |
| KR | 10-2006-0024257 A | 3/2006 |
| KR | 10-2008-0107475 A | 12/2008 |
| KR | 10-2009-0029290 A | 3/2009 |
| KR | 10-2009-0101864 A | 9/2009 |
| KR | 10-2010-0031436 A | 3/2010 |
| KR | 10-2011-0085561 A | 7/2011 |
| WO | 20111014292 A1 | 2/2011 |

OTHER PUBLICATIONS

Wakabayashi, Daisuke: "Latest Japanese vending machines tell you what you want," The Australian Sep. 7, 2010, ProQuest #749604395, 4pgs.*

Office Action issued by the U.S. Patent and Trademark Office in the U.S. Appl. No. 13/299,514, dated Apr. 5, 2013, U.S. Patent and Trademark Office, Alexandria, VA. (9 pages).

Extended European Search Report dated Apr. 16, 2014, issued by the European Patent Office in corresponding European Patent Application No. 11841749.2 (7 pgs).

Office Action issued by the U.S Patent and Trademark Office in the U.S. Appl. No. 13/299,680, dated May 22, 2014, U.S. Patent and Trademark Office , Alexandria, VA (7 pgs).

Office Action from Chinese Patent Office dated Aug. 1, 2012, issued in related Chinese Patent Application No. 200980144532X, with English translation thereof.

Office Action from Mexican Patent Office dated Aug. 2, 2012, issued in related Mexican Patent Application No. MX/a/2011/002531, with English translation thereof.

Notification of Transmittal of the International Search Report (Forms PCT/ISA/220 and PCT/ISA/210) and the Written Opinion of the International Searching Authority (Form PCT/ISA/237) dated Apr. 29, 2013, in the corresponding International Application No. PCT/US2013/021190. (12 pages).

Office Action dated Sep. 12, 2013, issued by the European Patent Office in the corresponding European Patent Application No. 11841749.2. (10 pages).

Office Action issued by the U.S. Patent and Trademark Office in the U.S. Appl. No. 13/299,514, dated Aug. 26, 2013, U.S. Patent and Trademark Office, Alexandria, VA. (18 pages).

Notification of Transmittal of the International Search Report (Forms PCT/ISA/220 and PCT/ISA/210) and the Written Opinion of the International Searching Authority (Form PCT/ISA/237) dated Jul. 2, 2012, issued in corresponding International Application No. PCT/US2011/061433. (20 pages).

http://news.cnet.com/8301-1023_3-57402997-93/google-looks-to-patent-tech-that-listens-to-calls-to-promote-ads/?part=rss&subj=news&tag=2547-1_3-0-20&tag=nl.e703, Google advertisement on the Internet entitle "Google looks to patent tech that listens to calls to promote ads", Apr. 3, 2012, (4 pages).

Office Action issued by the U.S. Patent and Trademark Office in the U.S. Appl. No. 13/299,774, dated May 24, 2013, U.S. Patent and Trademark Office, Alexandria, VA. (26 pages).

U.S. Office Action dated Nov. 6, 2012, issued in related U.S. Appl. No. 13/299,774.

U.S. Office Action dated Dec. 7, 2012, issued in related U.S. Appl. No. 13/062,403.

1st Office Action issued by the U.S. Patent and Trademark Office in U.S. Appl. No. 13/555,795, dated Feb. 27, 2015, U.S. Patent and Trademark Office, Alexandria, VA.

1st Office Action issued by the U.S. Patent and Trademark Office in U.S. Appl. No. 13/299,732, dated Feb. 27, 2015, U.S. Patent and Trademark Office, Alexandria, VA.

* cited by examiner

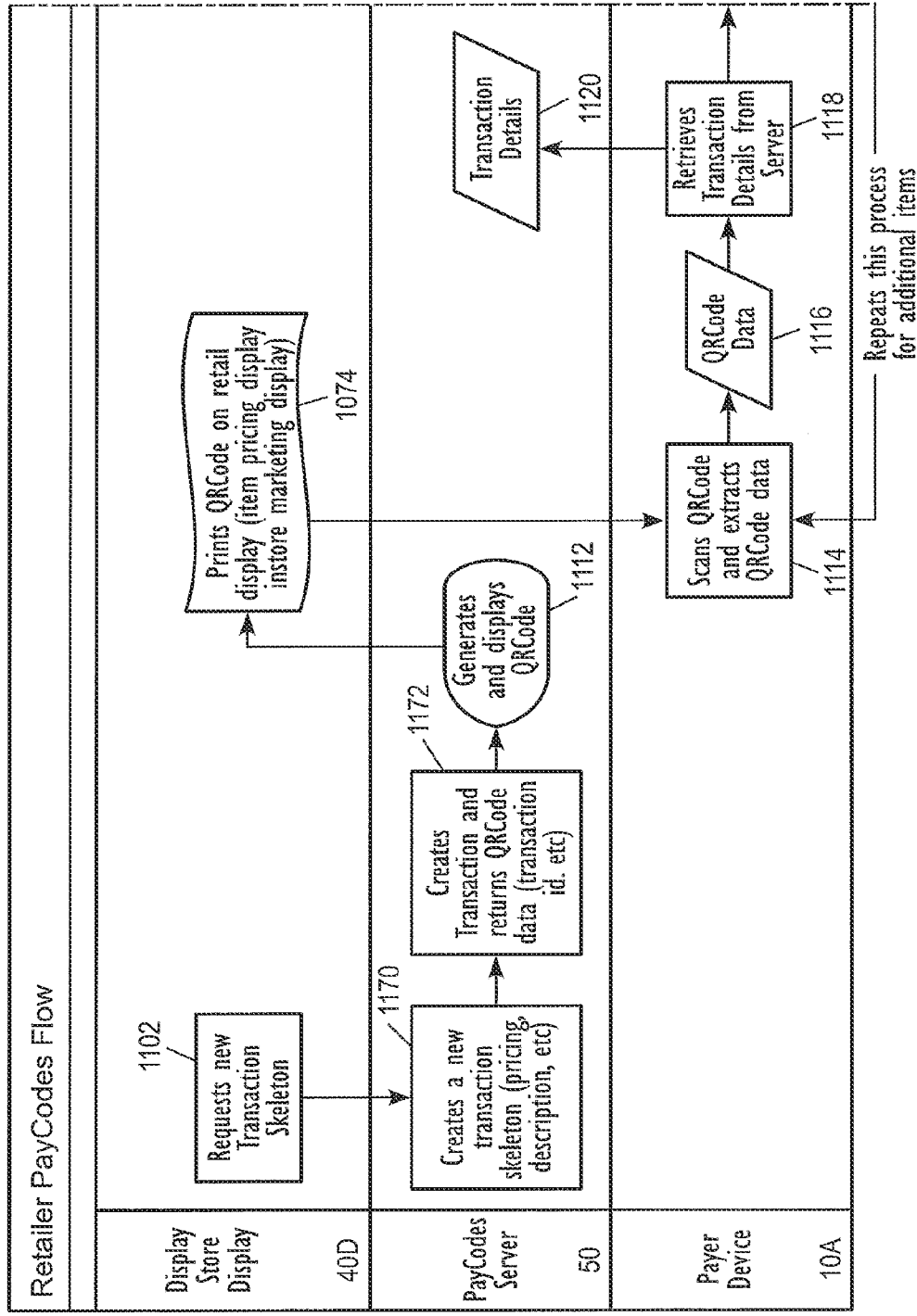

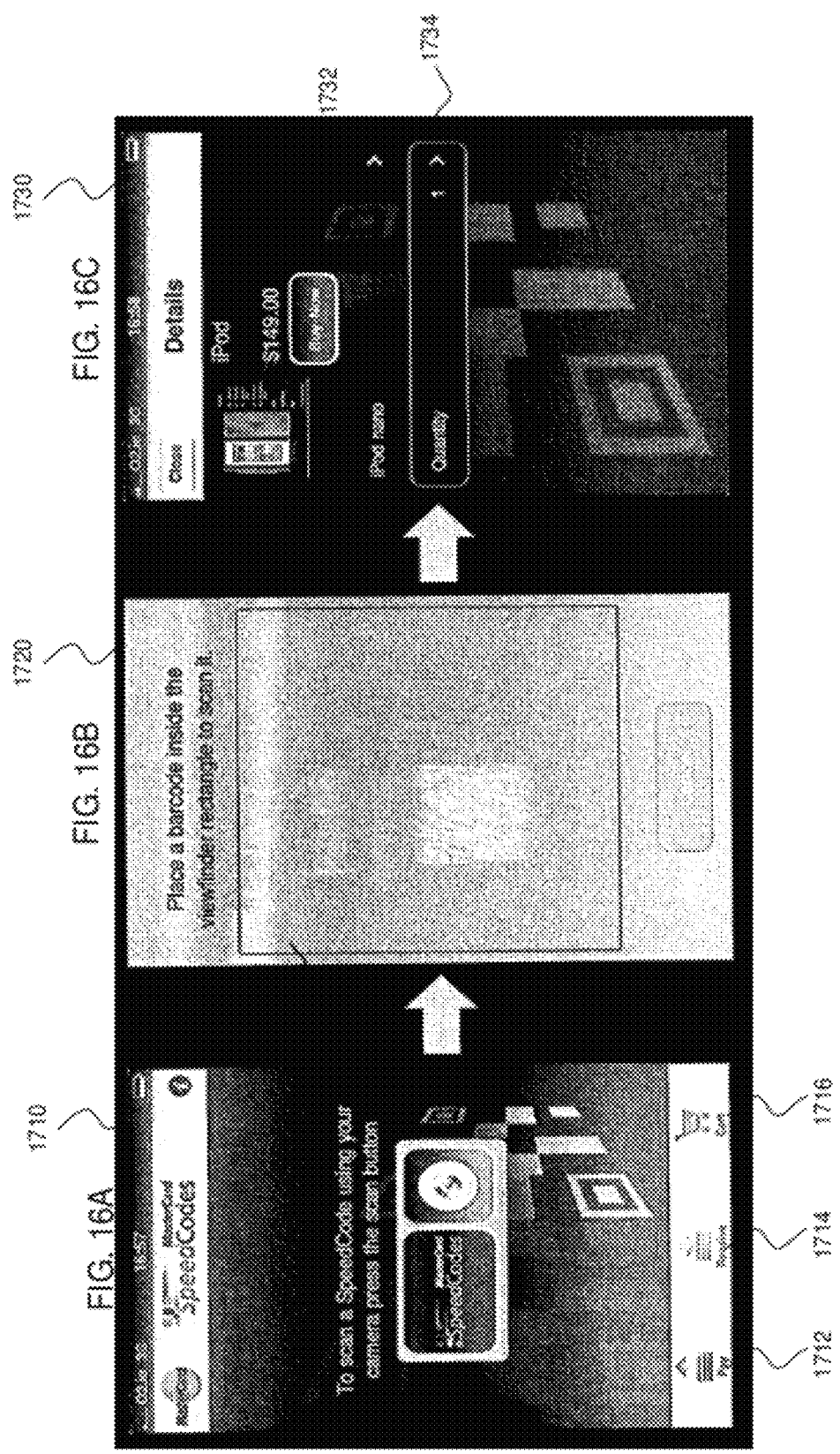

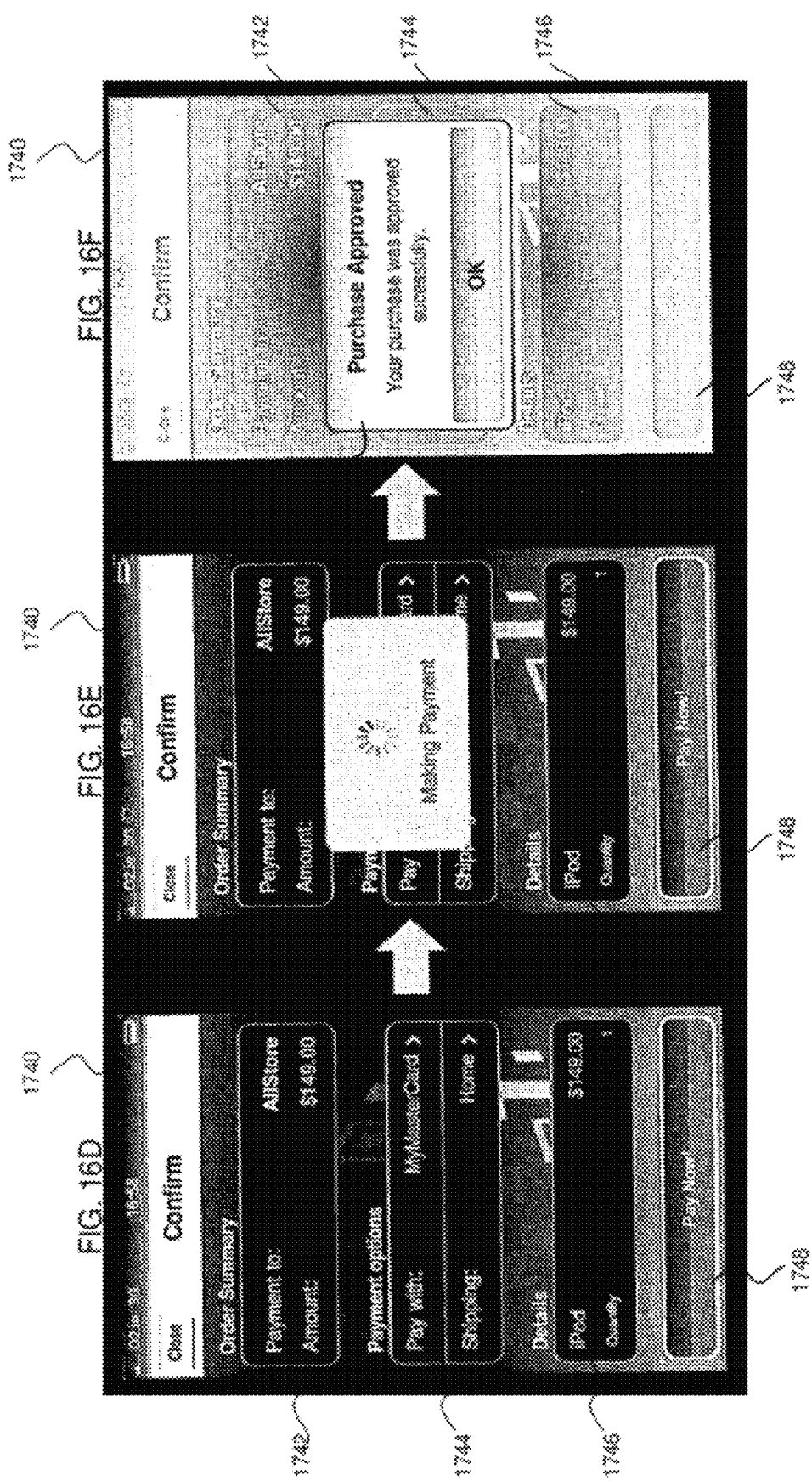

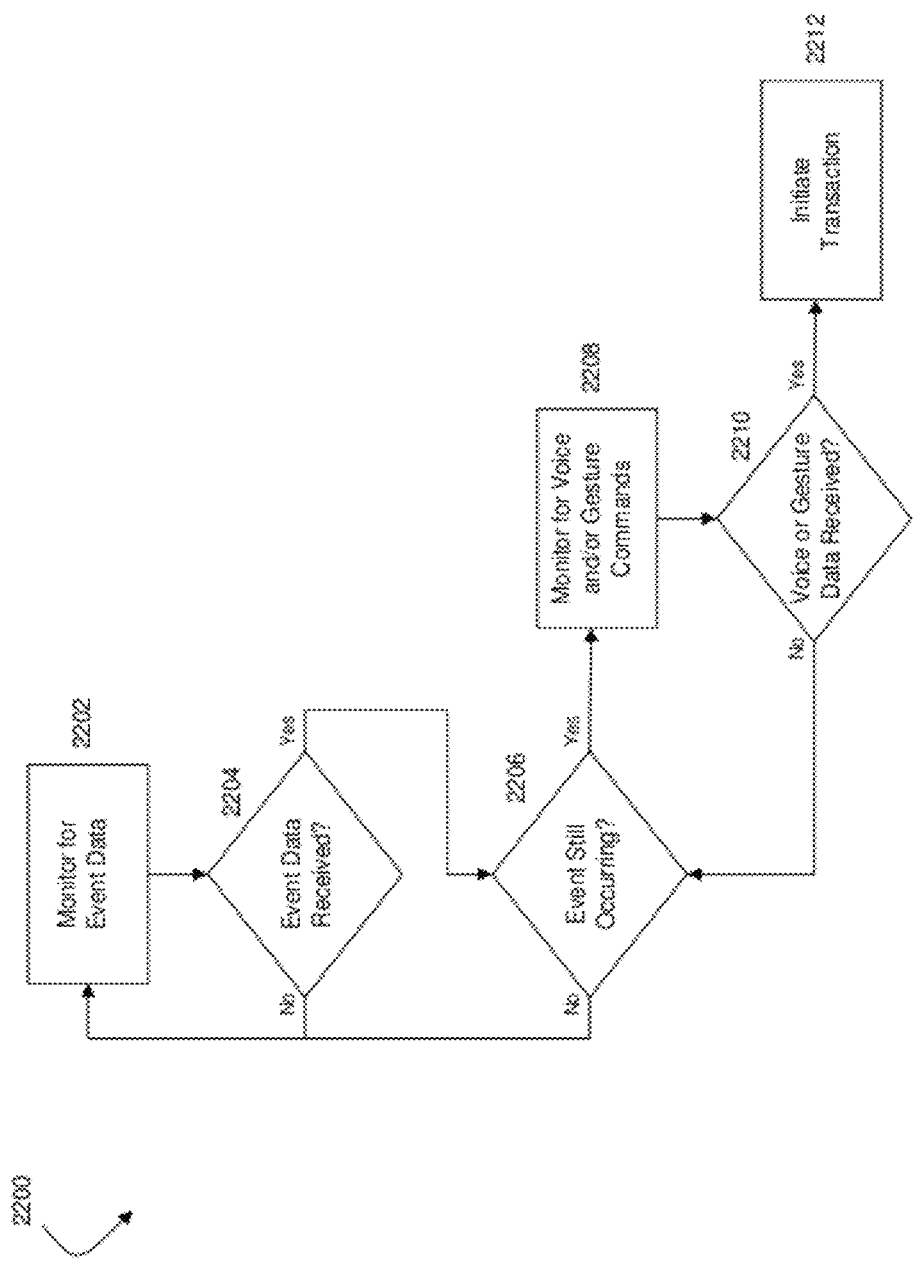

METHOD AND SYSTEM FOR CONSUMER TRANSACTIONS USING VOICE OR HUMAN BASED GESTURE ACTIONS

RELATED APPLICATIONS

This application claims the priority benefit of commonly assigned U.S. Provisional Application No. 61/415,529, "Financial Card Method, Device and System Utilizing Bar Codes to Identify Transaction Details," by Garry Lyons et al., filed Nov. 19, 2010; U.S. Provisional Application No. 61/479,134, "Financial Card Method, Device and System Utilizing Bar Codes to Identify Transaction Details," by Garry Lyons et al., filed Apr. 26, 2011; and U.S. Provisional Application No. 61/534,832, "Method and System for Purchasing Products Advertised on Multi-Media Using Voice and/or Gesture-Based Commands," by Alan Cooke et al., filed Sep. 14, 2011. The subject matter of all of the foregoing is herein incorporated by reference in its entirety.

FIELD

The present disclosure relates to electronic financial transactions, specifically through the use of voice or human based gesture actions.

BACKGROUND

There is market pressure for finding more convenient ways to reach out to consumers and to initiate a financial transaction with the consumer. There is also market pressure for finding more convenient ways to conduct financial transactions between individuals and businesses once a transaction has been initiated.

Consumers may be in situation where they are viewing internet- or television-based advertisements for a product they wish to purchase, but are not immediately able to do so. By the time the consumer is able to purchase the product, they may have forgotten the product they wished to buy or the merchant that was advertising. The consumer can also be at risk of making an incorrect purchase, such as choosing an incorrect model or brand of the product, or of paying too much or missing a special promotion by purchasing through a different merchant. Thus, there exists a need for a consumer to be able to quickly and easily initiate a financial transaction for the visually or multimedia advertised product.

SUMMARY

The present disclosure provides for a method and system of initiating a financial transaction through human voice and gesture based actions.

An exemplary method for initiating a consumer transaction includes transmitting video data from a processing device to a display device, monitoring the video for event data corresponding to a plurality of consumer products or services, receiving the event data in the processing device, and notifying a consumer on the display device of an eligible consumer transaction. The method further includes reading voice or human based gesture actions with a human interaction device, analyzing the voice or human based gesture actions, and initiating a consumer transaction for the plurality of consumer products or services if the voice or human based gesture actions conform to a predetermined set of requirements.

Another exemplary method includes transmitting video data from a processing device to a display device, monitoring for event data corresponding to a plurality of consumer products or services, receiving the event data in the processing device, and notifying a consumer on the display device of an eligible consumer transaction. Voice or human gesture based actions are read with a human interaction device and analyzed. If the voice or human gesture based actions conform to a predetermined set of interaction requirements, a machine-readable pay code in which transaction details for a specific transaction for the plurality of consumer products or services are encoded is transmitted to a payer device. The method further includes requesting the transaction details for the specific transaction from a pay code provider, receiving the transaction details on the payer device, and receiving indications of payer selected transaction options from a user of the payer device. The indications are transmitted to the pay code provider for conveyance to a payee, and an indication that completion of the transaction has been initiated by initiating payment from the payer to the payee is received. The payer device is a communications device enabled to read machine-readable code and specifically programmed to carry out the above transmitting, requesting, and receiving actions.

An exemplary system for initiating a consumer transaction includes a display device, a human interaction device configured to read and transmit voice or human based gesture actions, and a processing device. The processing device is configured to at least receive video data; transmit the video data to the display device, receive and analyze the voice or human based gesture actions, compare the voice or human based gesture actions with a predetermined set of requirements, and initiate a consumer transaction if the voice or human based gesture actions meet the predetermined first set of interaction requirements. The display device is also configured to receive the video data from the processing device and display the received video data.

Another exemplary system includes a payee, a pay code provider, a display device, a payer device, a human interaction device, and a processing device. The human interaction device is configured to read and transmit voice or human based gesture actions. The processing device is configured to at least receive video data; transmit the video data to the display device, receive and analyze the voice or human based gesture actions, compare the voice or human based gesture actions with a predetermined set of requirements, and transmit a machine-readable pay code in which transaction details for a specific transaction are encoded to the payer device if the voice or human based gesture actions meet the predetermined set of requirements. The display device is configured to receive the video data from the processing device and display the received video data. The payer device is configured to receive and read the machine-readable pay code, request the transaction details for the specific transaction from the pay code provider, and display the transaction details.

BRIEF DESCRIPTION OF THE DRAWING FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures:

FIGS. 11A and 11B are a flow diagram illustrating an exemplary retailer pay code flow;

FIGS. 16A-16F are diagrams illustrating a GUI of a payer device used for the pay code processing of FIGS. 15A-15C;

FIG. 21 is a flow diagram illustrating a method for initiating a consumer transaction via the system of FIG. 19 according to exemplary embodiments;

Figure 1B:
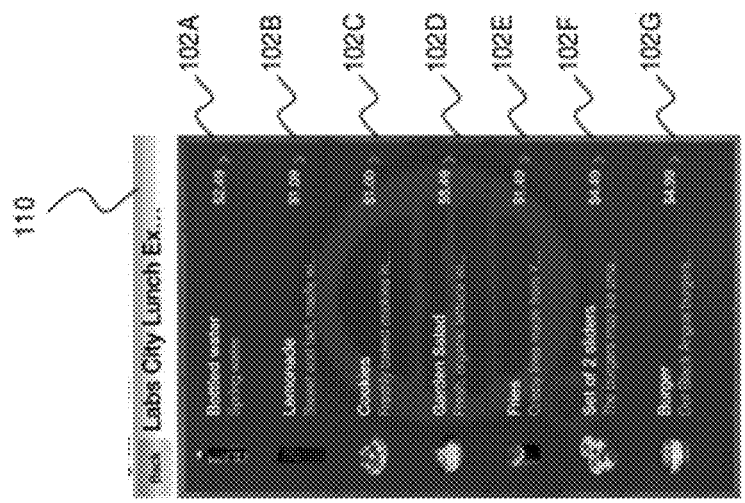
FIG. 1A-1E are a block diagram illustrating a top-level view a corresponding graphical user interface of a financial transaction system according to various exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definitions of Terms

Pay Code Arrangement—A method and computer-implemented system specifically programmed to carry out the electronic financial transaction methods disclosed herein, in which a machine-readable representation of data may be generated with transaction details (e.g., a transaction identification) that can be read by a payer device as part of a financial transaction.

Financial Transaction Account—Credit card accounts, debit card accounts, hybrid card accounts, accounts with utilities or other credit providers, demand deposits, other revolving lines of credit, home equity loans, and/or nearly any other source of funds.

Payer—An individual, business, or other entity that wishes to transfer funds to a payee for reasons including, but not limited to, paying a debt, purchasing goods, services, and/or charitable contributions, among others.

Payee—An individual, business, or other entity that receives funds transferred from a payer for reasons including, but not limited to, paying a debt, purchasing goods, services, and/or other charitable contributions, among others.

Pay Code—A machine-readable code used to identify a transaction and which may identify other transaction details, including, but not limited to, identification of one or more of: (1) the quality associated with the transaction, (2) the quantity associated with the transaction, (3) the size associated with the transaction, (4) the color associated with the transaction, (5) shipping information associated with the transaction, (6) the identity of the payer associated with the transaction, (7) the payee or a third party associated with the transaction, and (8) the financial account identification or a pointer that can be used to identify an account (e.g., a financial account), or nearly any other information that might be relevant to the parties or the transaction. A portion of the transaction details may be provided as part of the machine-readable code (e.g., attached to a transaction product or associated with the transaction product or transaction service) and other transaction details may be added by the payer or other entities during processing of the transaction.

Transaction skeleton—basic details of the transaction without a transaction identifier (ID) that may be represented in a barcode or on the pay code server. When the transaction ID is assigned, the transaction details then include the details for completion of a transaction.

Payer Device—computing devices including but not limited to hand-held computing devices such as smart phones, table computers, PDAs, personal computers and network terminals, that have the ability to read machine-readable data and communicate with other computers and/or humans through an interface.

Exemplary Payer Device Implementations

Payer devices (e.g., payer device 10B of FIGS. 1A-1E) can be nearly any type of device that has the ability to communicate with other computers and is capable of reading machine-readable representations of data, such as a bar code (e.g., QR code), RFID, acoustic signals or video signals, etc. Exemplary payer devices can include bar code scanners, personal digital assistants (PDAs) equipped with a camera, microphone or other sensing device, MP3 players equipped with a camera, microphone or other sensing device, cameras capable of communications with other computers, tablet computers and laptop computers with cameras, microphones, mobile telephones with a camera microphone, smart phones, etc.

Other types of readers can be used, such as smart phones that have been adapted to read RFID tags, and RFID readers with communication capabilities, for instance. In most instances, nearly any unique tag could be used, whether optical, radio frequency (RF), magnetic, video and/or even sound-based, particularly because each of these parameters (e.g., all of these physical parameters) can be measured on a current smart phone, such as the iPhone®. In some embodiments, an exemplary payer device may include a near field communication (NFC) chip, suitable for receiving data through near field communication.

Pay Code Implementations

In the present exemplary embodiments, the pay code may be a matrix barcode (or two-dimensional code) such as a QR code or other codes such as an EZcode, a high capacity color barcode, a ShotCode, a MaxiCode, a GTIN12 code and/or GTIN-13 code, etc. The matrix bar code may be readable by bar code scanners, mobile phones with a camera, and/or smart phones, for example. Exemplary QR codes may consist of black modules arranged in a square pattern on white background. The information encoded on the pay code can be text, a URL or other data.

Pay codes, in their most basic form, can include a transaction identifier (e.g., only a transaction identifier), although it is envisioned that many more details of the transaction may be encoded in the pay code. As such, a simple, one dimensional bar code may be used, but also any optical machine-readable representation of data could be used in conjunction with an optical imager (e.g., a camera) on a payer device. As yet another alternative, RF identification, or nearly any other machine-readable representation of data, could be used that might be presented to a payer device or an adaptor of the payer device. For example, optical machine-readable representations of data, which are currently available on most modern mobile phones equipped with a camera, may be used to capture and process the machine-readable representation of the data.

In some exemplary embodiments, a pay code may be used simultaneously with a near field communication (NFC) chip. A pay code that only includes a transaction identifier may be paired with a near field communication chip configured to transmit additional transaction information that a pay code may be unable to include (e.g., due to size limitations). As such, if a payer device is also equipped with a near field communication chip, when the payer device scans the pay code, it can also receive the additional transaction information from the paired NFC chip. The ability to obtain additional transaction information not included with the pay code can be beneficial at times when a pay code provider may be unavailable (e.g., when the payer device lacks a network connection).

Financial Transaction System Overview

Figure 1A:
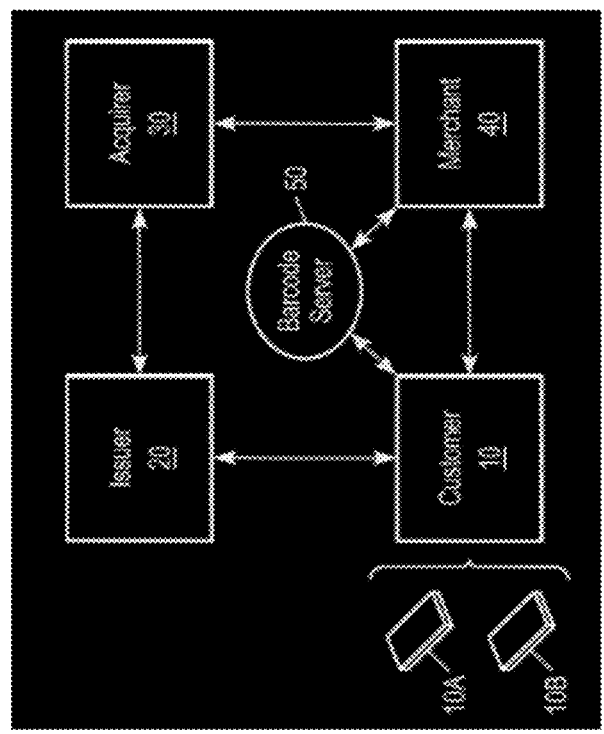

FIG. 1A is a block diagram illustrating a top level view of a financial transaction system according to various exemplary embodiments.

Referring to FIG. 1A, most credit card transactions involve four basic participants, although many other participants can be involved. The four basic participants are a customer (e.g., payer or user) 10 who may pay with a financial transaction card, an issuer 20 that may issue the financial transaction card, a merchant 40 that may sell products or services (hereinafter "product" or "products"), and an acquirer 30 that may collect payment for the merchant 40. In the present system, however, this terminology does not always apply. For instance, the merchant 40 may be another person to whom the purchaser is indebted. The purchaser may be someone who owes a debt, regardless of whether products or services are being purchased. The acquirer 30 may or may not be involved in certain transaction types. The present pay code arrangement may not involve the current financial transaction system, but is explained in the context of the current financial transaction system that has been modified to handle pay codes for ease of understanding.

As shown in FIGS. 1A-1E, a pay code server (or barcode server) 50 may be added to a traditional financial transaction card system. The pay code server 50 may be a stand-alone application (or system) or embedded in the processing (operations) by the issuer 20, the acquirer 30 or the merchant 40. The payer 10 may have a payer device 10A or 10B, such as a smart phone or mobile computer, among others as more fully explained herein.

FIGS. 1B-1E illustrate a graphical user interface (GUI) of a payer device 10A or 10B for performing a financial transaction in accordance with the system of FIG. 1A.

Figure 1E:
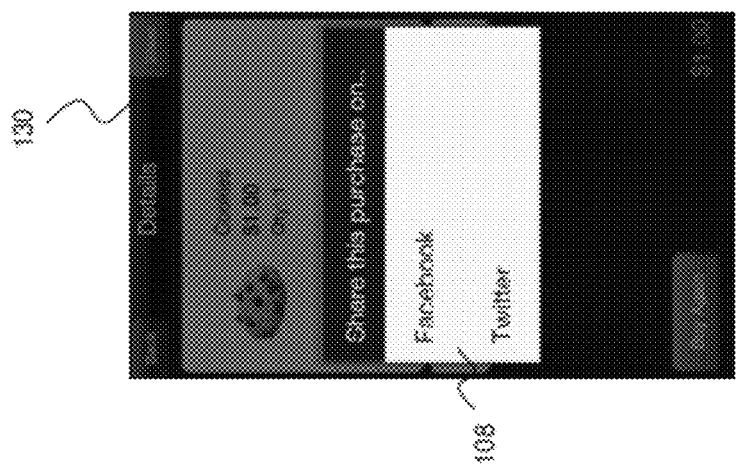

A payer 10 may visit a restaurant or other eating establishment (e.g., the merchant 20) and may use their payer device 10A or 10B to place their order. FIG. 1B illustrates a GUI on the payer device 10A, including a menu screen 110 that offers a plurality of menu item selections 102A-102G. The payer 10 may select any number of the menu items 102A-102G. FIG. 1C illustrates a checkout screen 120, that prompts the payer to place an order after selecting menu items 102A and 102C. The menu items 102A and 102C may provide additional details (e.g., quantity, type, etc.) for each item. The checkout screen 120 may also identify the payee 103 (e.g., the merchant 120). The payer 10 may select the payment method 104, for which the payer 10 wishes to pay for the transaction. The payment amount 105 may also be shown on the checkout screen 120. The payer 10 may initiate payment of the transaction by selecting the "pay now" button 106.

Figure 1D:
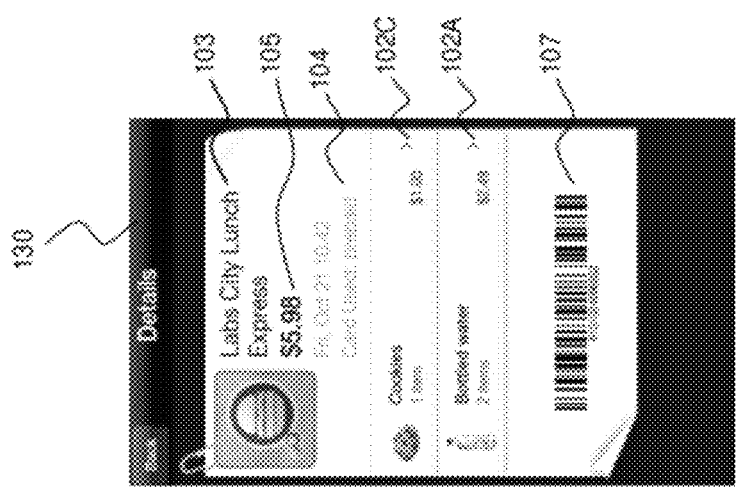
Figure 1C:
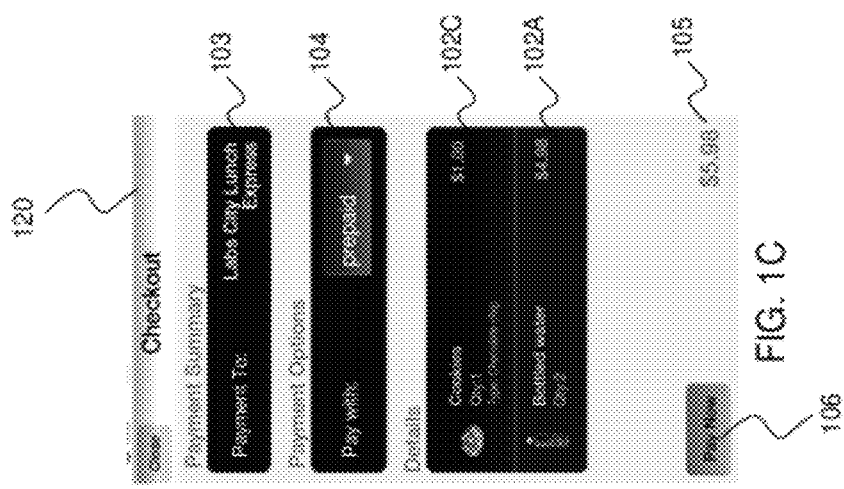

Upon initiating payment, the payer 10 may be presented with the details screen 130 on the payer device 10A, as illustrated in FIG. 1D. The details screen 130 may include, for example, information relating to the payer 103, the payment method 104, and the payment amount 105. The details screen 130 may also provide the payer 10 with a list of all of the purchase menu items (e.g., menu items 102A and 102C). A machine-readable barcode 107 may also be provided as part of the details screen 130. The machine-readable barcode 107 may be encoded with transaction information (e.g., a transaction ID, menu items, quantities of items, etc.). The merchant 120 may use a device, such as a payer device 10B, to read the machine-readable barcode 107 and obtain the transaction information. In one embodiment, the merchant 120 may read the machine-readable barcode 107 and decode the transaction information, which may be transmitted to or optically read at the merchant's point of sale (POS) system for automatic entry of the order and/or payment information.

In one embodiment, the payer 10 may select from one of the menu items (e.g., menu item 102C) from the details screen 130. Upon selection of the menu item, the payer 10 may be presented with a sharing prompt 108, as illustrated in FIG. 1E. The sharing prompt 108 may provide the payer 10 with options for sharing information about their purchase with others (e.g., on a social network, reimbursement/accounting software or services, day planner/journal/diary/and/or dietary/purchase tracking software or service, etc.).

Basic Pay Code Transactions

Figure 2A:
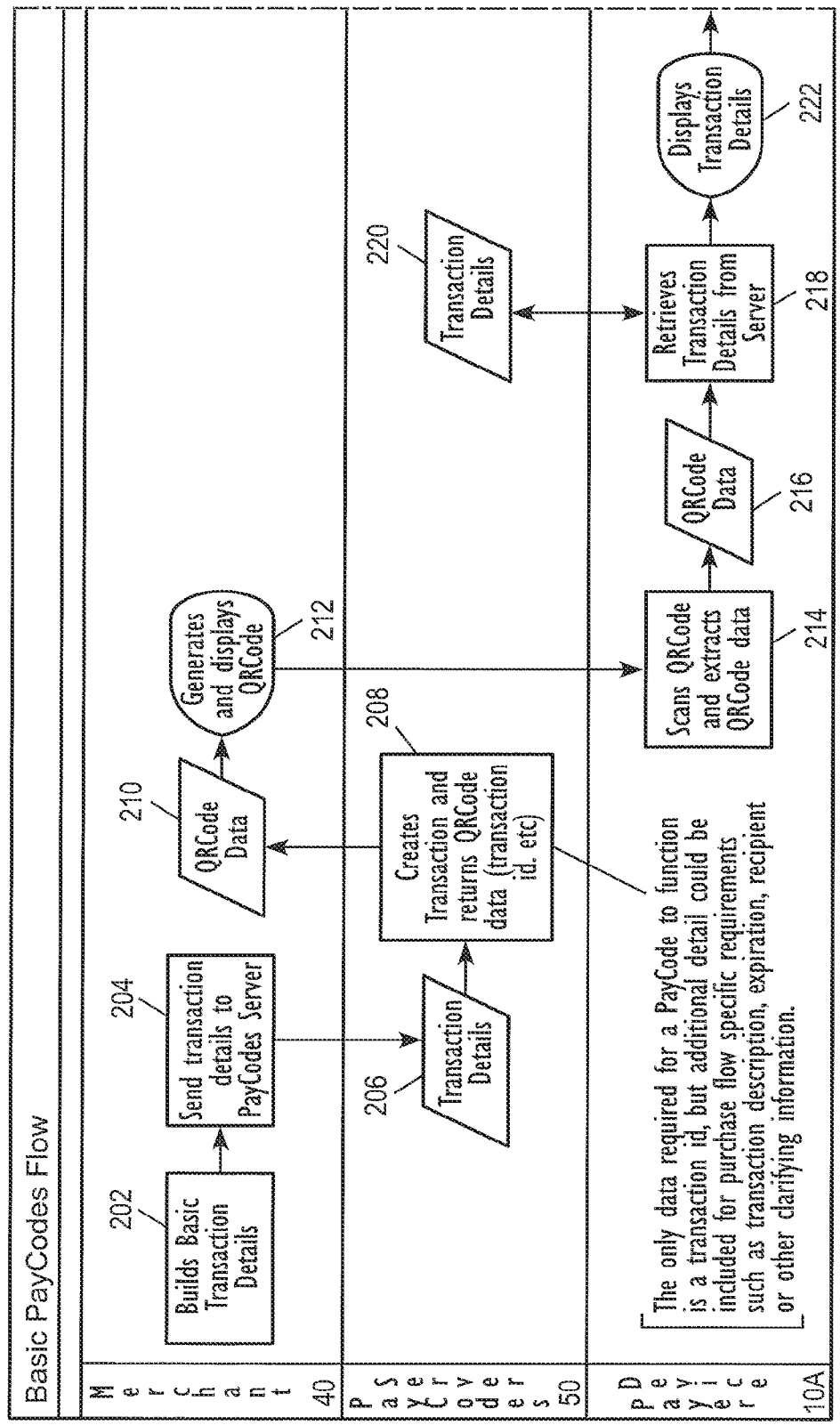
FIGS. 2A and 2B are a flow diagram illustrating an exemplary basic pay code flow.
Figure 2B:
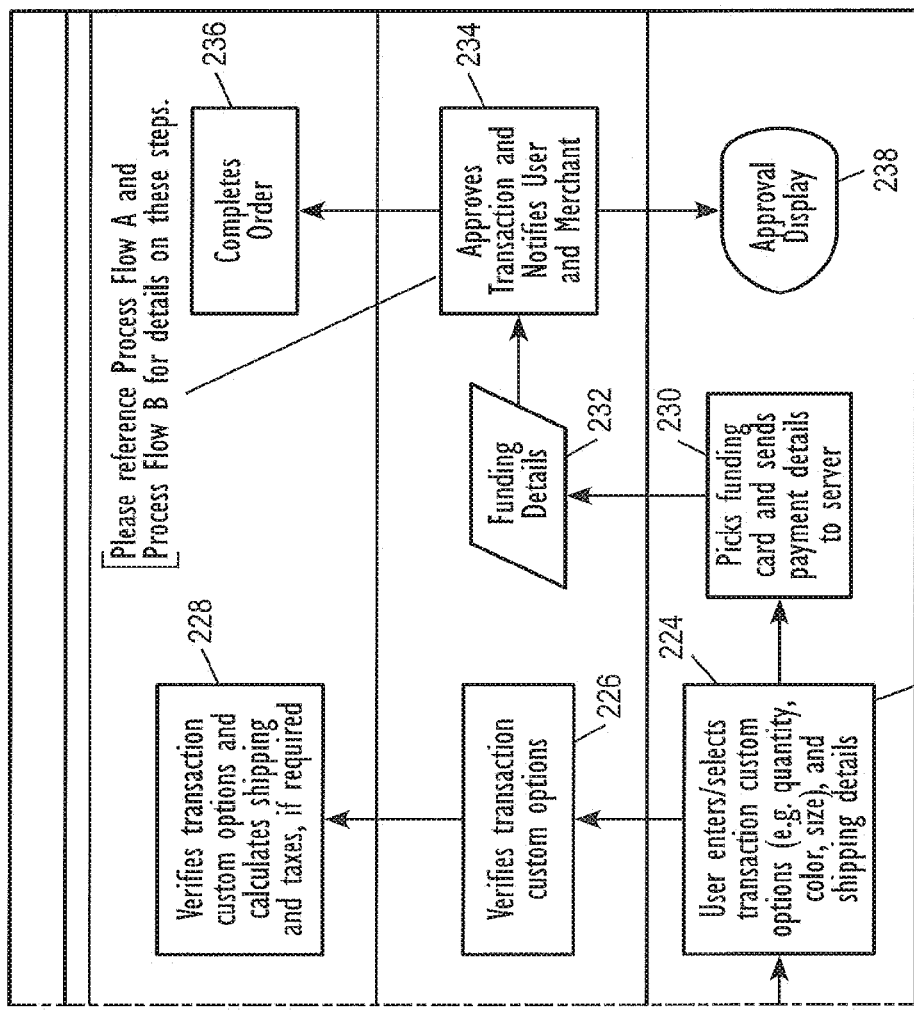

FIGS. 2A and 2B are a flow diagram illustrating an exemplary basic pay code flow.

As shown in FIGS. 2A and 2B, three entities may be involved in basic pay code transactions including the merchant 40, the pay code server 50 and the payer device 10A controlled by the payer 10. At block 202, the basic transaction details may be built (e.g., generated by the merchant 40). At block 204, the merchant 40 may send (e.g., communicate) the transaction details to the pay code server 50. At block 206, the transaction details may be received in (by) the pay code server 50 and, at block 208, the pay code server 50 may create an electronic record of the transaction. At block 210, the pay code server 50 may send (e.g., return) the pay code to the merchant 40. The pay code (e.g., a QR code) may include data such as a transaction ID, and/or other details (e.g., optional transaction details). The data (e.g., the only data) that may be required for the pay code is a transaction ID. Additional transaction details, information about the parties (or the transaction), financial accounts, and/or restrictions (e.g., policies on the use of the pay code or pricing, sales terms of the good or service associated with pay code, etc.), among others could be included together with the transaction ID for a particular pay code. For example, the transaction details may include: (1) one or more transaction descriptions (e.g., identity, quantity, payment terms, payment amount, merchant ID, merchant category, merchant code, etc.); (2) an expiration (e.g., a time in which the transaction should transpire to be valid); (3) a recipient or a sender; and/or (4) other clarifying information as is appropriate to a given circumstance, among others.

At block 212, the merchant 40 may receive the pay code data and may electronically generate and then may display the pay code data (e.g., present or otherwise makes the pay code available, such as on a bill) to the payer device 10A. In certain exemplary embodiments, when using an optical pay code reader, the pay code may be displayed on a screen or printed on paper, for example.

At block 214, the payer device 10A may scan, detect, image or read the pay code and may extract the pay code data. At block 216, the pay code data may be stored in the payer device 10A. At block 218, the pay code data (including the transaction ID) that is extracted may be used to query the pay code server 50 to retrieve transaction details (corresponding to (e.g., associated with) the transaction ID and/or other transaction data of the pay code) from the pay code server 50. At block 220, the transaction details may be supplied by the pay code server 50 to the payer device 10A in response to a request (query) from the payer device 10A. For example, the transaction ID or other transaction data extracted from the pay code by the payer device 10A may be matched to information stored in the pay code server 50. If a match results, the corresponding transaction details may be sent to the payer device 10A.

At block 222, the payer device 10A may display or present the transaction details. At block 224, the user (e.g., of the payer device) may enter or may select transaction custom options that may include transaction options such as quality, quantity, color, size and/or other product-specific or service-specific selections or options. The transaction custom options may also include shipping details such as shipping rates, shipping speed, and/or address information, among others. At block 226, the payer device 10A may send the preselected transaction custom options and/or the user-selected transaction custom options to the pay code server 50 that may verify the transaction custom options.

At block 228, the pay code server 50 may forward the received transaction custom option or options to the merchant 40, which may verify them and may calculate, for example, shipping fees and taxes, as appropriate. At the same time as the verification operation or by user option, the payer device 10A, based on the information from a transaction skeleton may provide the payer 10 with the option to fill-in shipping information for physical goods, quality or option items such as sizes, colors and locations, as explained above.

At block 230, the payer device 10A can be used to select a funding card or a funding source. For example, if the payer 10 has more than one funding source (e.g., credit cards, debit cards, hybrid cards or other sources of funding such as utility accounts, revolving credit lines, home equity loans, or nearly any other form or source of funds that are available to the payer), the payer 10 can select one funding card or source to be used for a given transaction through the payer device 10A. At block 232, the funding details may be forwarded to the pay code server 50.

In certain exemplary embodiments, the pay code server 50 may be dedicated to a particular funding source. In other exemplary embodiments, it will be apparent to one having ordinary skill in the relevant art that the pay code server may be integrated with other systems of the issuer 20 or acquirer 30 depending on the system implementation and may or may not include a dedicated pay code server 50.

At block 232, the pay code server 50 may identify funding details associated with funding the transaction, for example the issuer 20, the acquirer 30 and/or the account balance associated with the funding card, among others. At block 234, the identified funding details may be used to approve or disapprove the transaction and to notify the merchant 40 and the payer 10 via, for example, the payer device 10A such that the merchant 40 can complete the associated order. At optional block 238, the approval may be presented (e.g., displayed) on the payer device 10A.

In certain exemplary embodiments, the completion of the order may include removing, by the merchant 40, the product from inventory or scheduling, by the merchant 40, the service based on a validation code from the pay code server 50.

Figure 12:
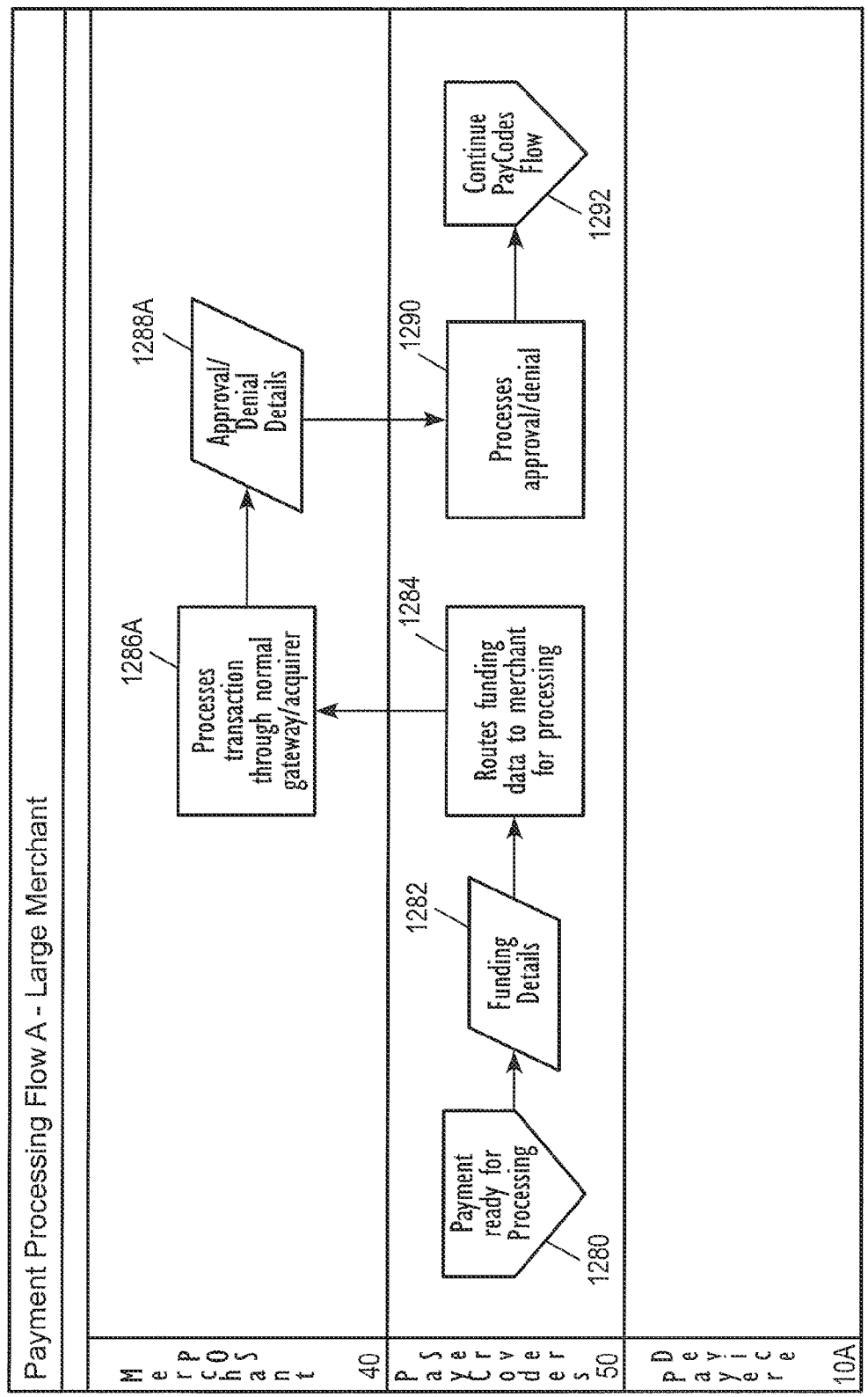
FIG. 12 is a flow diagram illustrating an exemplary payment processing flow for larger merchants.
Figure 13:
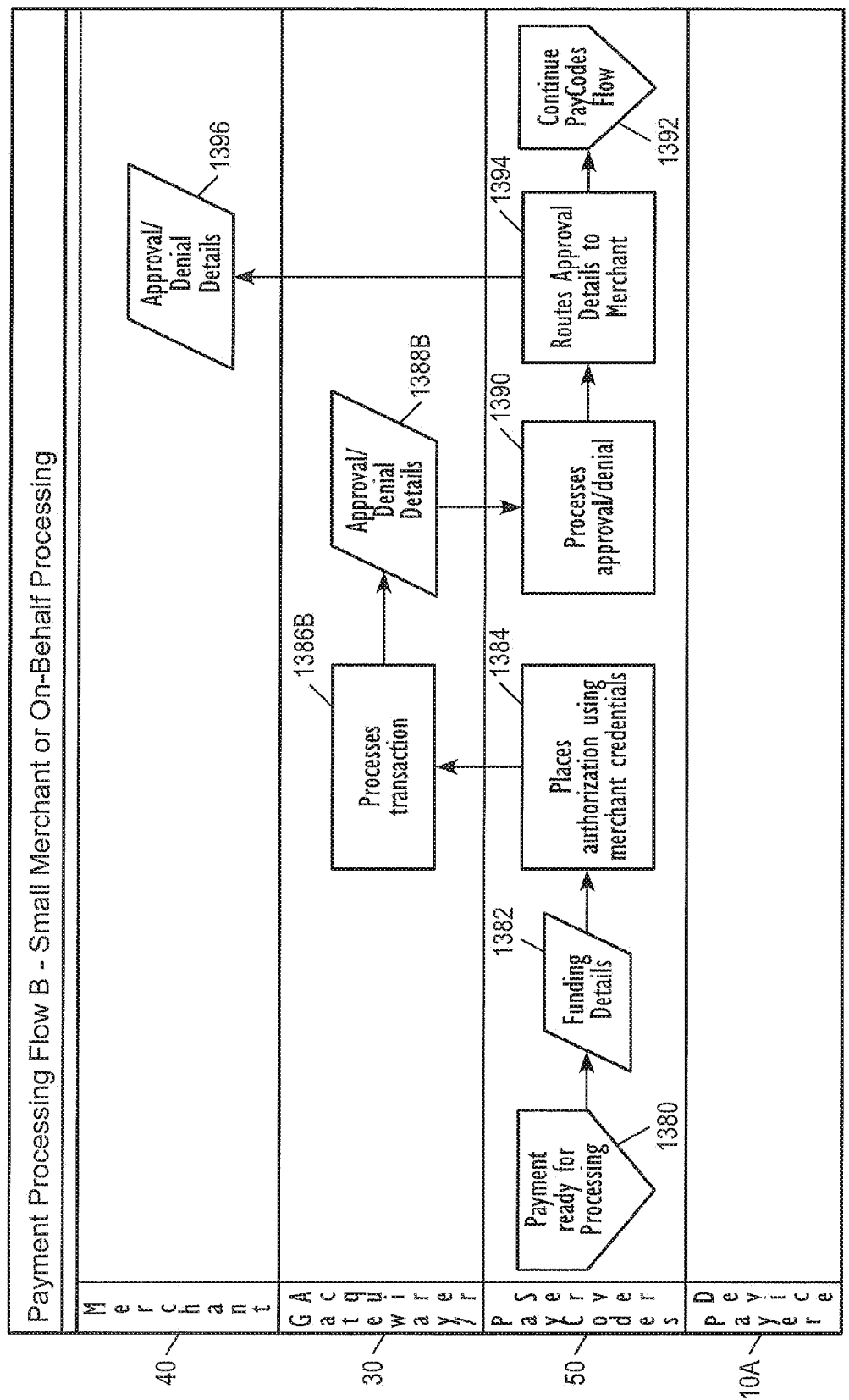
FIG. 13 is a flow diagram illustrating an exemplary payment processing flow for smaller merchants or on-behalf processing.
Figure 14:
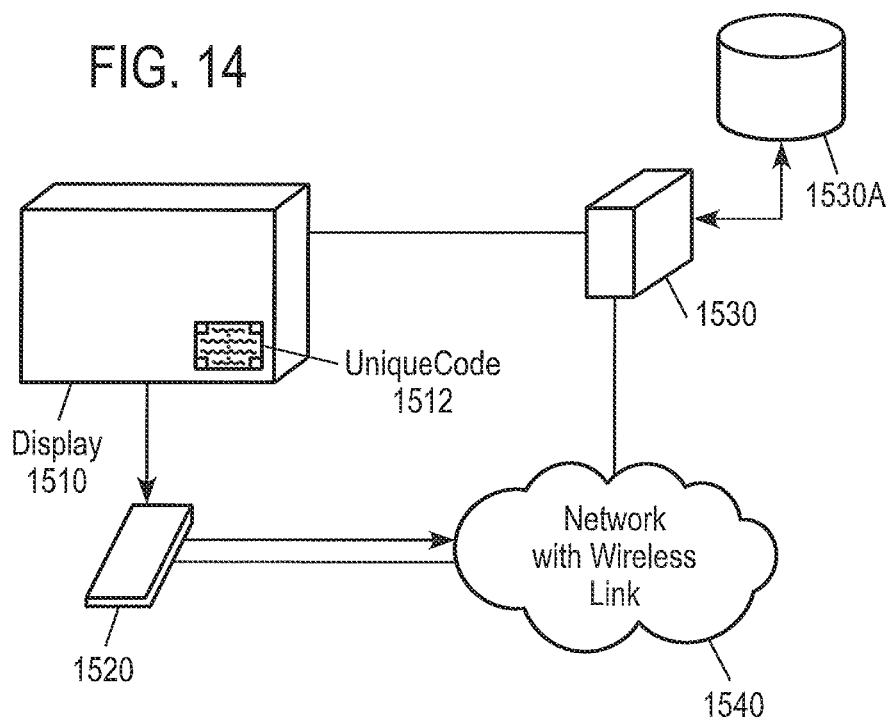
FIG. 14 is a block diagram illustrating exemplary computer architecture and exemplary data in accordance with various embodiments.

With respect to further details regarding the approval of the transaction and notification to the user 10 and/or the merchant 40, attention is directed to FIGS. 12, 13 and 14.

Although the basic pay code transaction flow has been disclosed, it is contemplated that various modifications and specific implementations of transactions using pay codes may be possible. FIGS. 3-5, 6A-6B, 7A-7C, 8A-8B, 9A-9B, 10, 11A-11B, and 22A-22B disclose exemplary transaction flows using such pay codes. It should be noted that these are merely exemplary transactions to which the present disclosure is not limited.

Person-to-Person Pay Code Transactions

Figure 3:
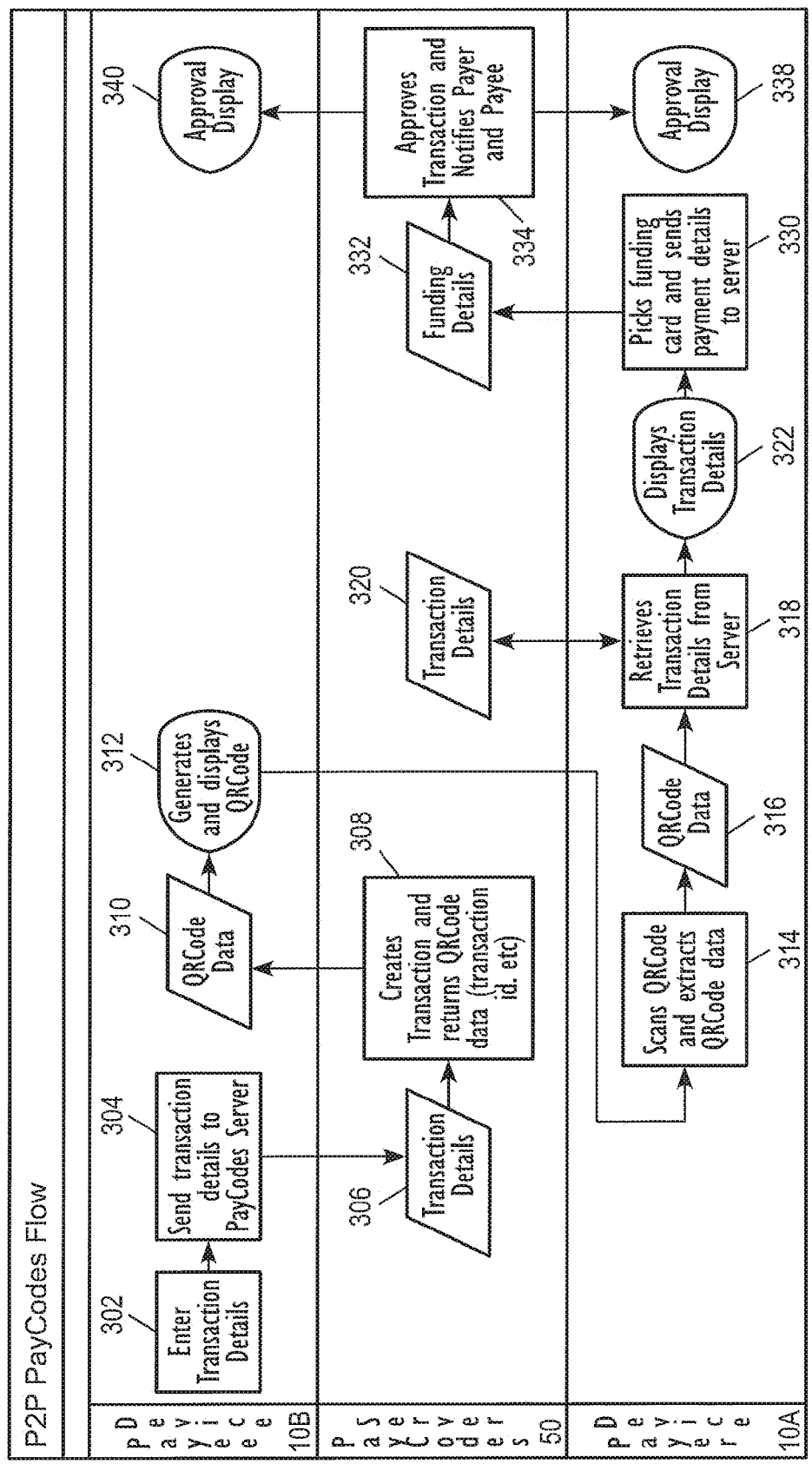
FIG. 3 is a flow diagram illustrating an exemplary person-to-person pay code flow.

FIG. 3 is a flow diagram illustrating an exemplary person-to-person (P2P) pay code flow.

The P2P pay code flow may include (e.g., involve) first and second payee devices 10A and 10B. As an exemplary scenario, two people might desire to settle a debt. The first person or payee, who is owed the debt by the second person or payer, may open a pay code application on a smart phone 10A and may enter the amount of debt (e.g., transaction details). This may be implemented as a transaction detail entry screen or "get paid" screen. The second person or payer also may open a pay code application on a second smart phone 10B to a "pay" screen. The payee's smart phone 10A may generate a screen with a pay code, for instance, a matrix barcode or QR code that may be readable by barcode scanners, mobile phones with a camera, or other smart phones, and may include transaction details. The payer may point the camera of the second smart phone 10B at the screen (e.g., display) of the first smart phone 10A and may image the displayed barcode. Once the displayed barcode is read, which may be almost instantaneous, the payer may choose which financial transaction card to pay with and may finalize the transaction. The payee may be alerted that the payment is complete via the pay code server 50.

As illustrated in FIG. 3, the P2P pay code flow may be as follows. At block 302, the payee device 10B may enter transaction details and, at block 304, may send the transaction details to the pay code server 50. At block 306, the transaction details may be received by the pay code server 50. The pay code server 50 may create an electronic record of the transaction, and, at block 308, may return pay code data (e.g., at least the transaction ID, as well as other optional information) to the payee device 10B. At block 310, the payee device 10B may receive the pay code data and, at block 312, may generate, and may display the pay code data and/or the pay code. At block 314, the payer device 10A can be used to scan the pay code to extract the pay code data. At block 316, the pay code data may be stored. At block 318, the pay code data may be used to retrieve transaction details from the pay code server 50.

At block 320, the transaction details may be provided by the pay code server 50 upon request (or in response to a request, e.g., a query) by the payer device 10A. At block 322, the payer device 10A may display or present the transaction details and, at block 330, may permit the payer an option to select or pick a funding card or funding source such that the payment details may be sent to the pay code server 50.

At block 332, the funding details may be generated by and may be stored in the pay code server 50. At block 334, based on the funding details, the pay code server 50 may approve or deny the transaction. At blocks 338 and 340, the pay code server 50 may notify the payer via the payer device 10A and the payee via the payee device 10B of the results of the approval process. For example, the payee device 10B may receive an approval display which indicates whether the transaction has been approved or denied and may optionally include transaction details and the payer device 10A may also receive an approval display which indicates whether the transaction has been approved or denied and may also optionally include transaction details.

It is contemplated that the payee may receive an approval message such that some or all transaction details may not be shared with the payee. For example, the payer may pre-establish the transaction details to be provided to the payer to maintain security of the transaction details. That is, the transaction approval process does not require the use of the payee's systems for transaction approval that may improve security of the payer's transaction and personal information (e.g., credit account information, payee name, payee signature, etc).

Although the pay code server 50 is described as providing transaction approval, it is contemplated that the pay code server may be in communication with the transaction approver for such approvals. It is also contemplated that the pay code server may be a service provider for one or a plurality of issuers and may incorporate approval policies specific to each issuer for such transaction approvals.

E-Commerce Pay Code Transactions

Figure 4:
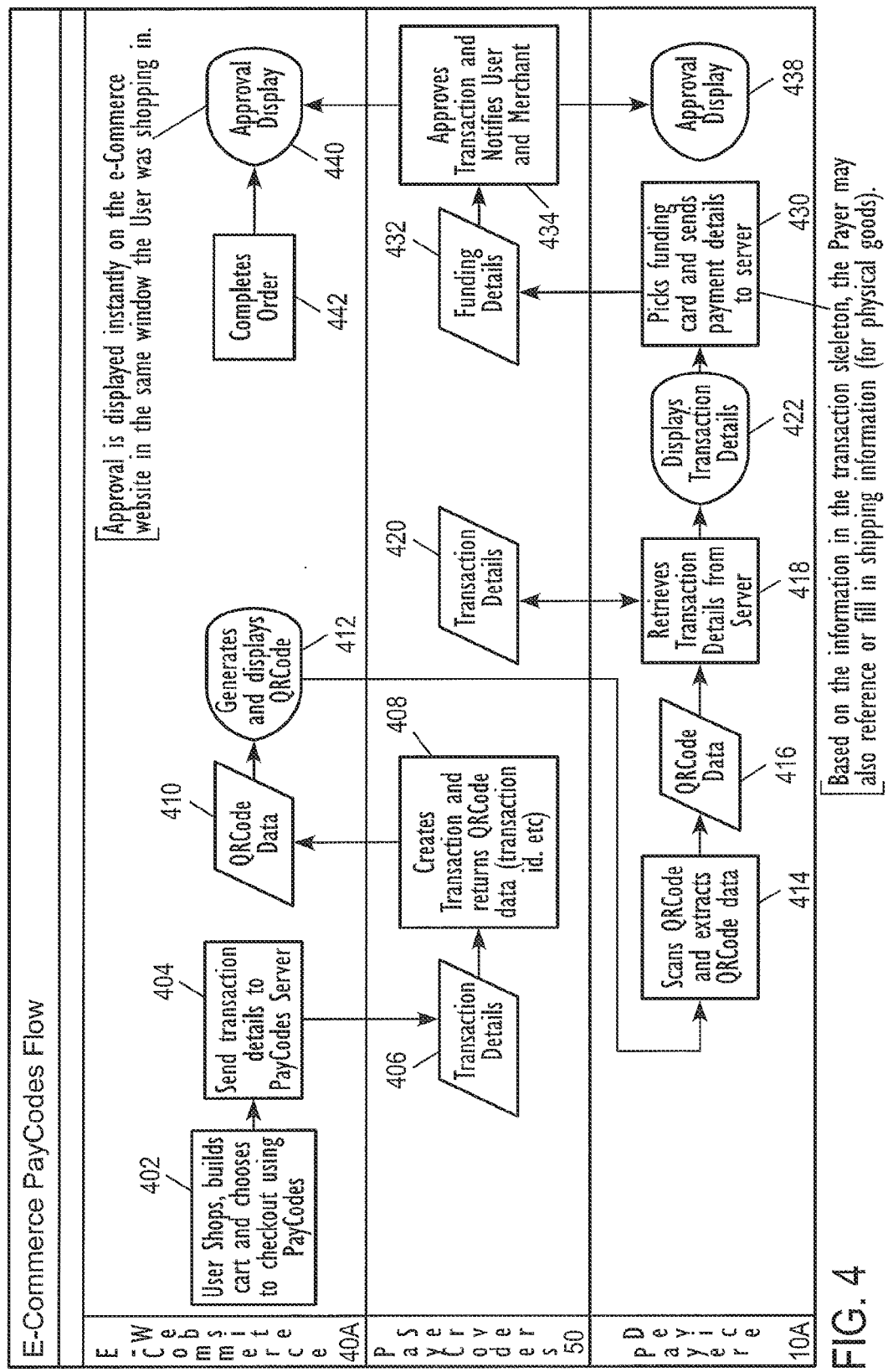
FIG. 4 is a flow diagram illustrating an exemplary e-commerce pay code flow.

FIG. 4 is a flow diagram illustrating an exemplary e-commerce pay code flow. As an example, a consumer may use a payer device 10A (or other computing platform) to shop via the Internet (online) with a retailer that may be a pay code enabled merchant 40. When checking out, the consumer may scan a convenient pay code (e.g., a barcode) that is generated on the screen of the payer device 10A by the merchant using a pay code application. Further details of how the mobile device may effectively and indirectly take control of a web application session is described below under the subheading "Remote Control of Web Applications". The e-commerce retailer can view that the transaction had been completed without requiring the potentially burdensome process of obtaining financial transaction card details.

Referring now to FIG. 4, in the exemplary e-commerce pay code flow, at block 402, a user shopping at an e-commerce website 40A, can build a checkout cart and may choose to check out using a pay code as a presented option on the e-commerce website 40A. At block 404, the e-commerce website 40A may send transaction details to the pay code server 50. At block 406, the transaction details may be received and stored by the pay code server 50 and, at block 408, they may be used to create an electronic record of the transaction. At block 410, the pay code server 50 may return the pay code data (e.g., at least transaction ID and perhaps other optional data) to the e-commerce website 40A. At block 412, the received pay code data may be used to generate and to display the pay code and may be sent to the payer device 10A. At block 414, the payer device 10A may scan the pay code and may extract the pay code data. At block 416, the extracted pay code data may be stored and, at block 418, may be used to retrieve transaction details from the pay code server 50.

At block 420, the transaction details may be retrieved by the pay code server 50 and returned (e.g., sent) to the payer device 10A. At block 422, the payer device 10A may optionally display (e.g., present) the transaction details. Based on information in the transaction skeleton, the payer 10 may also reference from other electronic sources or data and may fill in manually or automatically the referenced data, such as shipping information for physical goods, or other transaction details to facilitate the transaction. At block 430, the payer device 10A may also be used by the consumer to select the funding card or the funding source and to send the payment details to the pay code server 50. At block 432, the received funding details may be used to approve or deny the transaction and the result of this approval process may be sent to the payer device 10A, as well as to the merchant 40A. At block 438, the payer device 10A may display the denial or the approval along with some optional transaction details. At block 442, the merchant 40A in the same timeframe (e.g., simultaneously) may complete the order, if approved, and, at block 440, may display the approval or denial on the e-commerce website 40A.

In certain exemplary embodiments, the approval may be displayed instantly (e.g., in real-time or near real-time) on the e-commerce website 40A, and in the same window (or display) as the user was using for online shopping.

Quick Payment Pay Code Transactions

Figure 5:
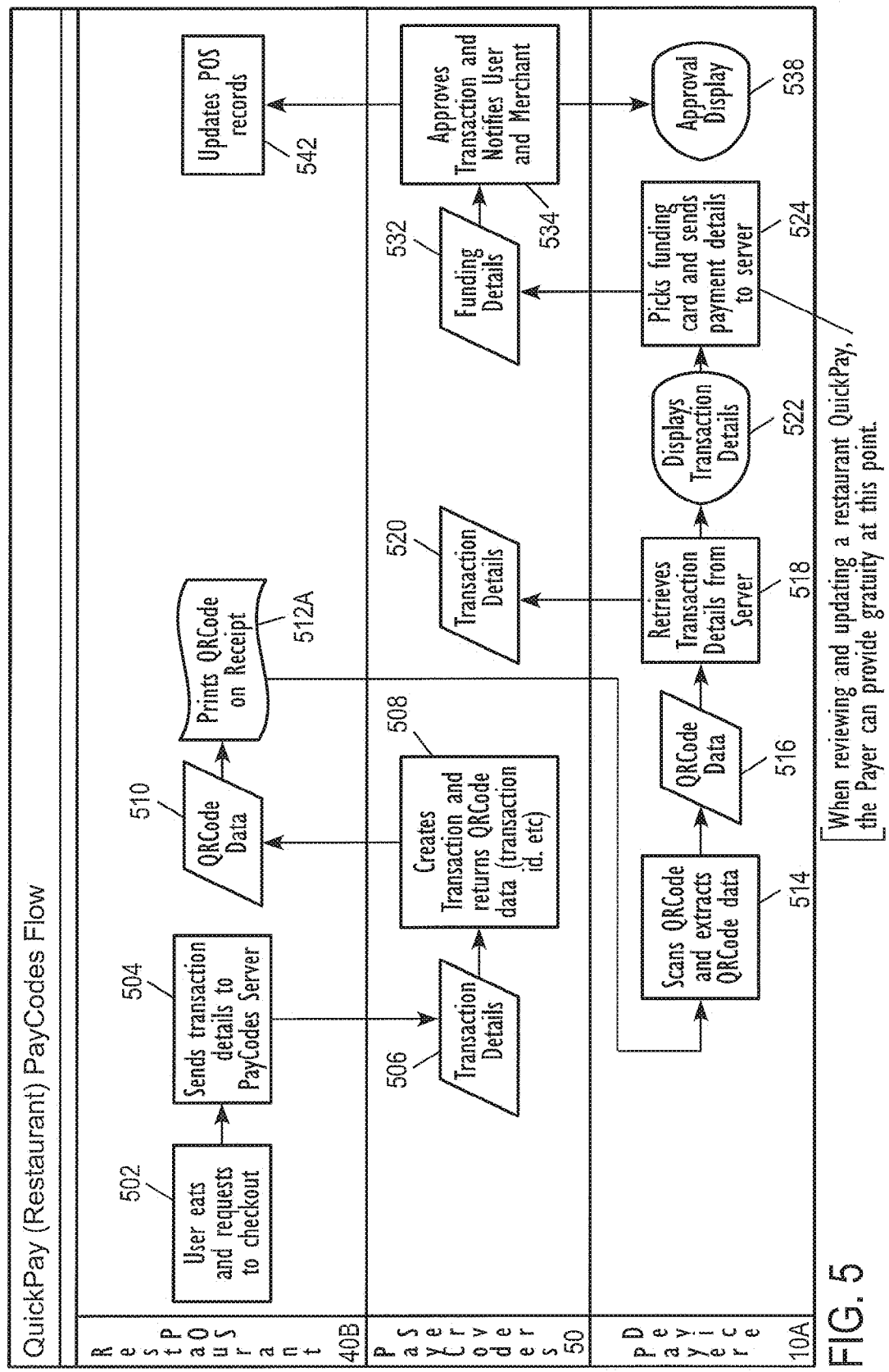
FIG. 5 is a flow diagram illustrating an exemplary quick payment pay code flow.

FIG. 5 is a flow diagram illustrating an exemplary quick payment pay code flow.

In accordance with an exemplary embodiment, in a full service restaurant a customer of the restaurant can eat his meal and then pay the bill or, in other more informal restaurants, the bill may be paid when the food is ordered or served. The server may display a receipt that may be printed on paper for review. Optionally, the bill may be displayed on a display device that may be coupled to or a part of a transaction terminal, a portable device and/or a payer device used for ordering food. The display device may be part of a food management system (e.g. order taking and billing system) which may be used to carry out the general business of the restaurant. Instead of carrying out the transaction using a conventional credit or debit card, which might involve waiting for the server to return with a payment slip or the like, the customer as the payer may use, for example, a smart phone to complete the transaction.

For example, the payer may scan a barcode associated with the transaction (for example, from the display or a printed bill), may add a tip for the waiter and may choose (e.g., select) via user selections a funding card, which is to be used. The payer may confirm the transaction, as well. The restaurant's food management system can check to confirm that the proper payment was made and clear the transaction.

Many restaurants are now using portable, wireless devices to take orders, which may simultaneously inform the kitchen staff of the order selected by the customer and may establish the transaction in the restaurant's food management computer system. In this implementation, the server could display the same electronic device when the screen shows the pay code. In this way, the customer can review the bill, can confirm the bill details and then can scan the pay code assuming there is no dispute.

It is contemplated that these types of electronic devices can be distributed to the customers (patrons). For instance, the patrons can review the menu, make their selections without necessarily involving the server, and once the meal has been provided, the patrons may make a payment for the meal using the pay code and, for example, the patron's smart phone (or wireless device), thus minimizing the impact of time and complexity of the payment process on the server. The patron may at the same time (e.g., simultaneously) build the electronic record of the transaction without substantial human intervention other than the patron's use of the smart phone or a wireless device.

Referring now to FIG. 5, at block 502, a customer may eat at a restaurant and may request to checkout. At block 504, the restaurant point of sale system (POS) 40B may send transaction details to the pay code server 50. At block 506, the transaction details may be received and stored by the pay code server 50 and, at block 508, the transaction details may be used to create an electronic record of the transaction. At block 510, the pay code server 50 may return (e.g., send) the pay code data (e.g., at least transaction ID and perhaps other optional data) to the POS 40B. At block 512A, the received pay code data may be used to generate and to display and/or print the pay code. The pay code may be scanned by the payer device 10A or may be electronically sent (e.g., communicated) to the payer device 10A. At block 514, the payer device 10A may scan the pay code and may extract the pay code data. At block 516, the extracted pay code data may then be stored and, at block 518, may be used to retrieve transaction details from the pay code server 50.

At block 520, the transaction details may be retrieved by the pay code server 50 and returned (e.g., sent) to the payer device 10A. At block 522, the payer device 10A may optionally display (e.g., present) the transaction details. Based on information in the transaction skeleton, the payer 10 may also reference from other electronic sources data and may fill in manually or automatically the referenced data (such as the amount of the tip for the waiter) to facilitate the completion of the transaction. At block 524, the payer device 10A can also be used by the customer to select a funding card and may send the payment details to the pay code server 50. At block 532, the received funding details may be used to approve or deny the transaction, at block 534, and the result of the approval process may be sent to the payer device 10A and/or the POS 40B. At block 538, the payer device 10A may display the approval along with some optional transaction details. At block 542, the POS 40B may simultaneously complete the order and may update its records.

Open Tab Pay Code Transactions

Figure 6A:
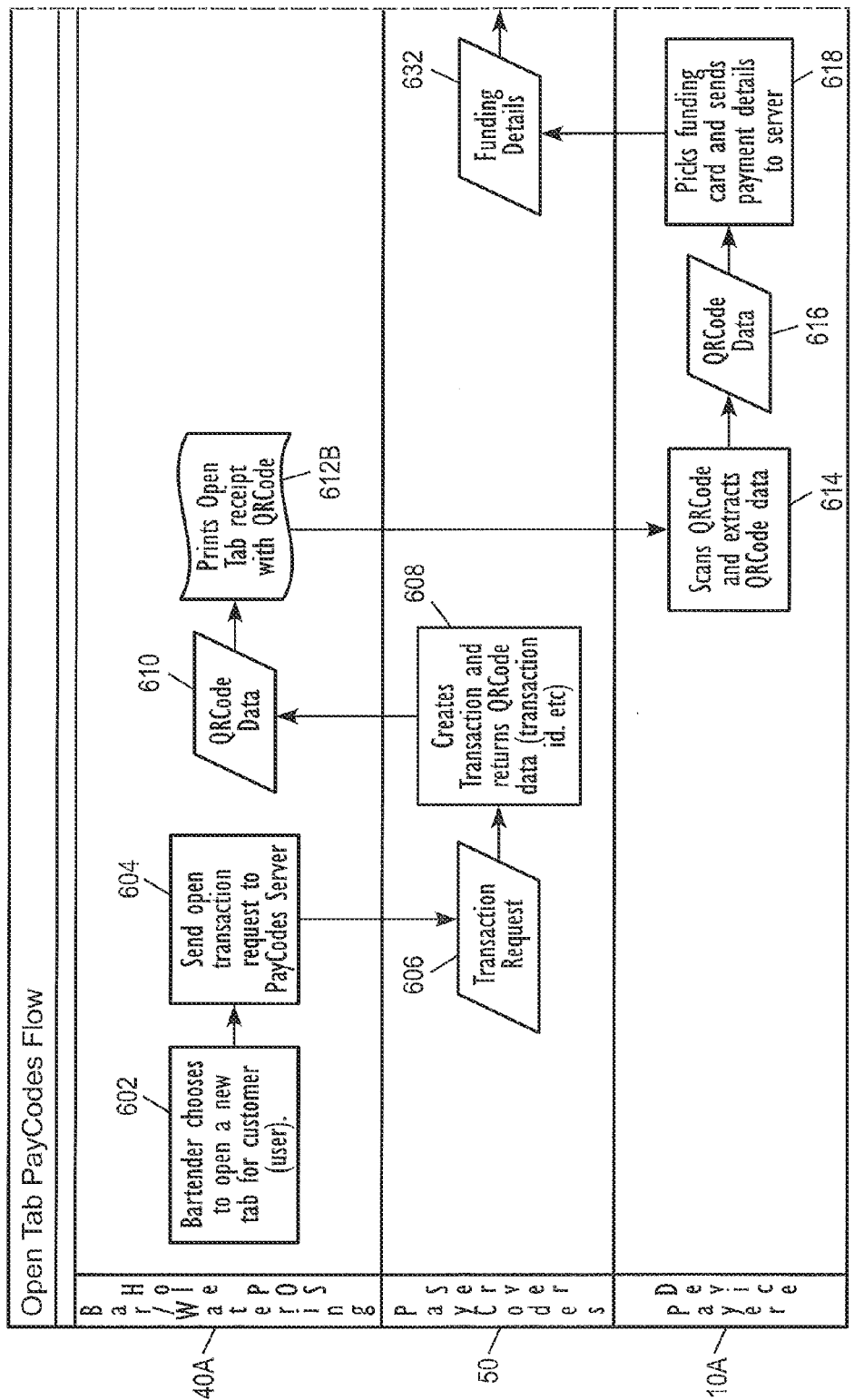
FIGS. 6A and 6B are a flow diagram illustrating an exemplary open tab pay code flow.
Figure 6B:
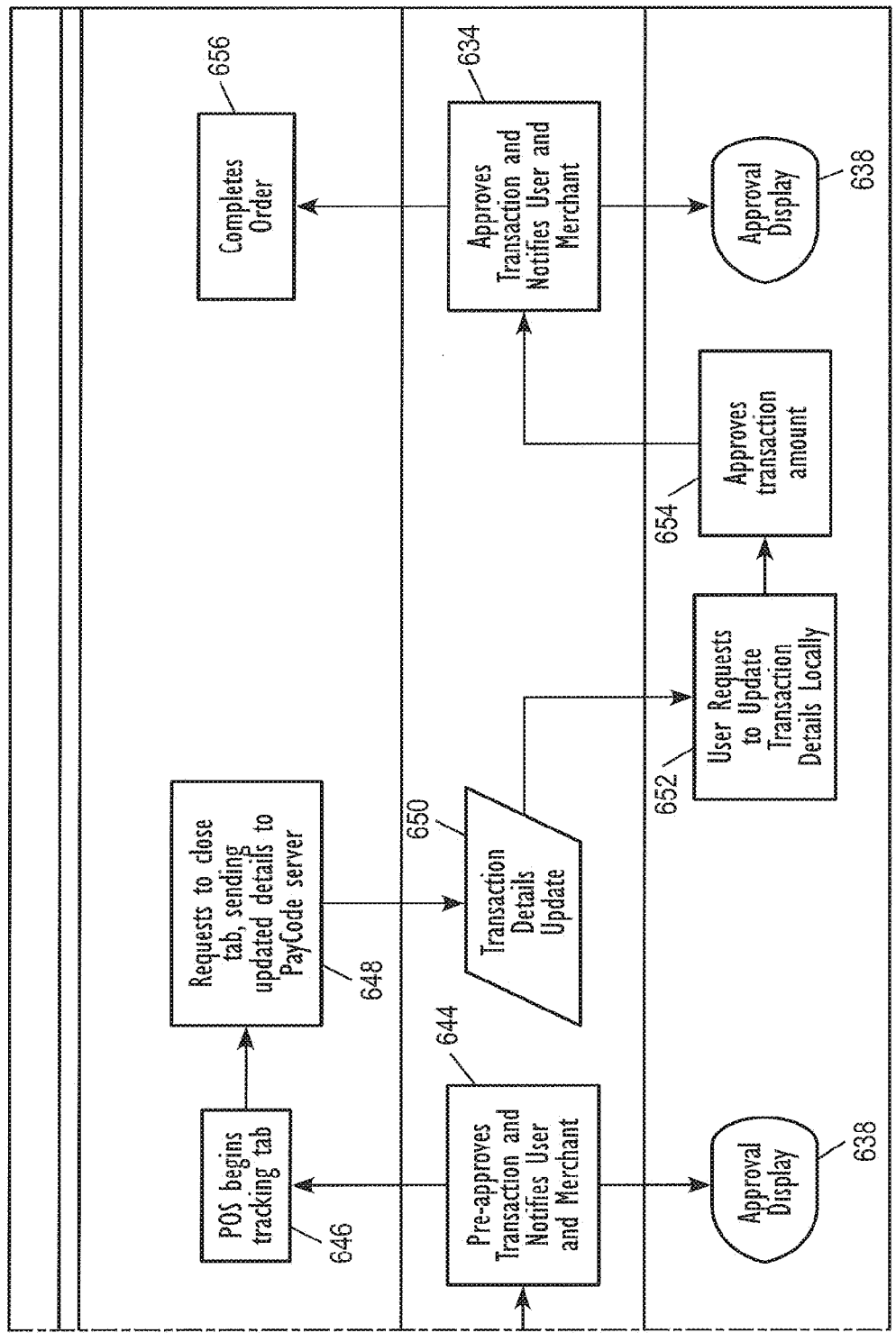

FIGS. 6A and 6B are a flow diagram illustrating an exemplary open tab pay code flow.

As shown in FIGS. 6A and 6B, at block 602, a bartender or other service provider may choose to open a new tab (or transaction) for a customer at an establishment (e.g., a bar, a gaming establishment, hotel, etc.). At block 604, a point-of-sale system (POS) 40A of the establishment may send an open transaction request to the pay code server 50.

At block 606, the pay code server 50 may receive the transaction request and, at block 608, may create and store an electronic record of the transaction. At block 610, the pay code server 50 may return the pay code data to the POS 40A. At block 612B, the pay code data (e.g., a bar code, such as a QR code) may be used by the printing of an open tab receipt with the pay code data printed thereon. At block 614, the patron 10 of the establishment (e.g., bar) may use the payer device 10A to scan the pay code printed on the open receipt to extract the pay code data. At block 616, the pay code data may be stored on the payer device 10A.

At block 618, the patron 10 of the establishment may select a funding source using the payer device 10A. At block 632, the pay code server 50 may receive the funding details and, at block 644, the pay code server may approve (e.g., pre-approve) the electronic transaction and may notify the patron 10, the merchant 40, and/or the POS 40A. At block 638, the payer device 10A may display the approval (or denial). Substantially at the same time as the display of the approval, at block 646, the POS 40A may initiate tracking of the bill (tab). At block 648, the POS 40A can send a request to close a tab, and send the updated details to the pay code server 50. At block 650, the transaction details may be updated in the pay code server 50 and may, based on a request from the payer device 10A, send the updated transaction details to the payer device 10A.

At block 652, the patron 10 or user using the payer device 10A may receive and update the transaction details locally, which may involve rescanning of the printed pay code from the receipt or transmission of the transaction details to the payer device 10A. The update may be implemented through user input via interface keys on the payer device 10A. For example, the update may be initiated by pressing a button requesting the update or otherwise inputting such a request. At block 654, the user of the payer device 10A can approve the transaction amount. The pay code server 50 may approve or disapprove the transaction in accordance with exemplary operations shown in FIGS. 12-14, for instance. The pay code server 50 may notify the patron 10 and/or the merchant POS 40A of the approval or disapproval action. At block 656, the merchant POS 40A can complete the order and may close out the bill or tab. At block 638, the payer device 10A can present, display or show the approval to let the patron 10 know (confirm) that the bill has been paid and that the patron 10 may now be free to leave.

Multiple Payer Pay Code Transactions

Figure 7A:
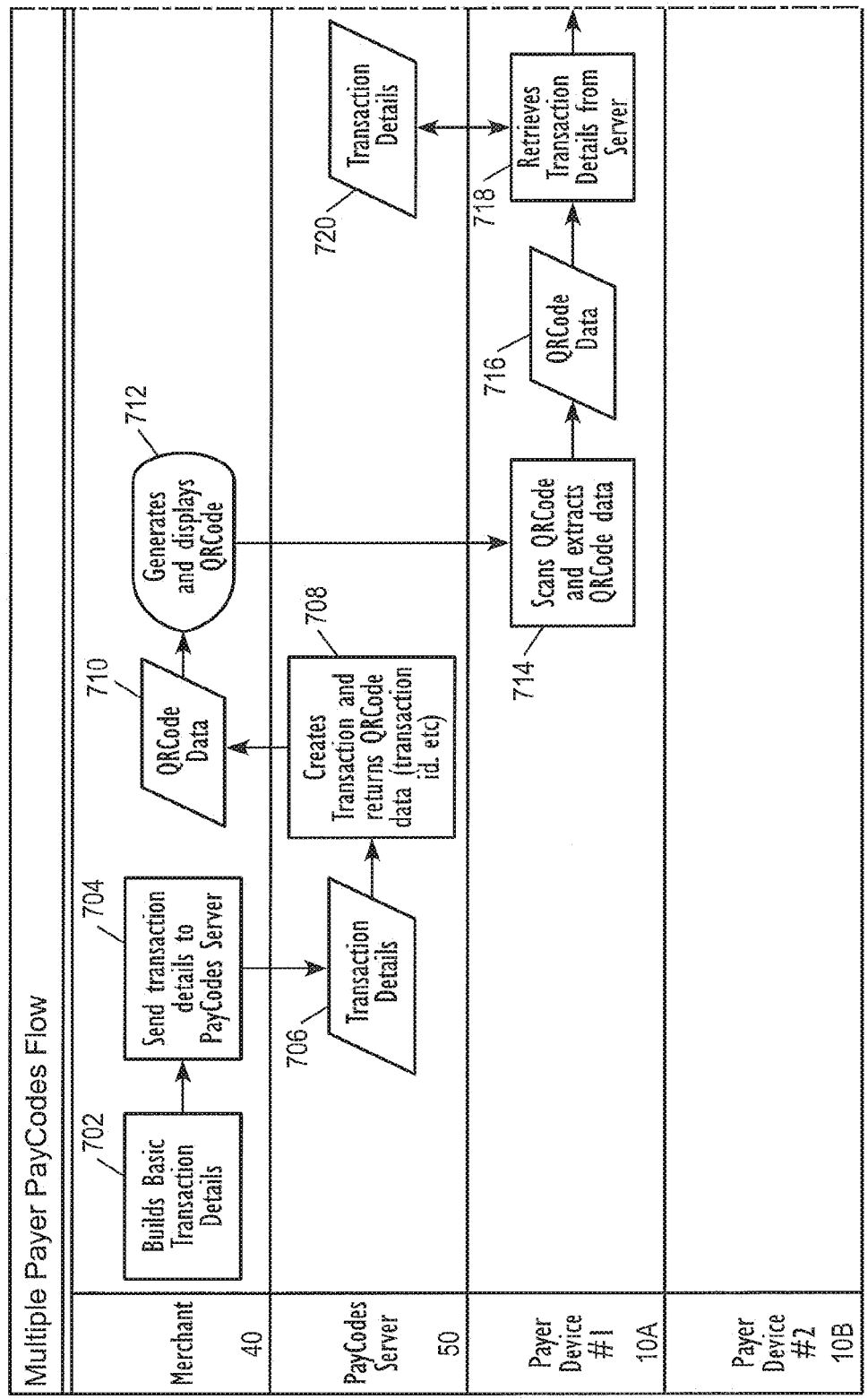
FIGS. 7A-7C are a flow diagram illustrating an exemplary multiple payer pay code flow.
Figure 7B:
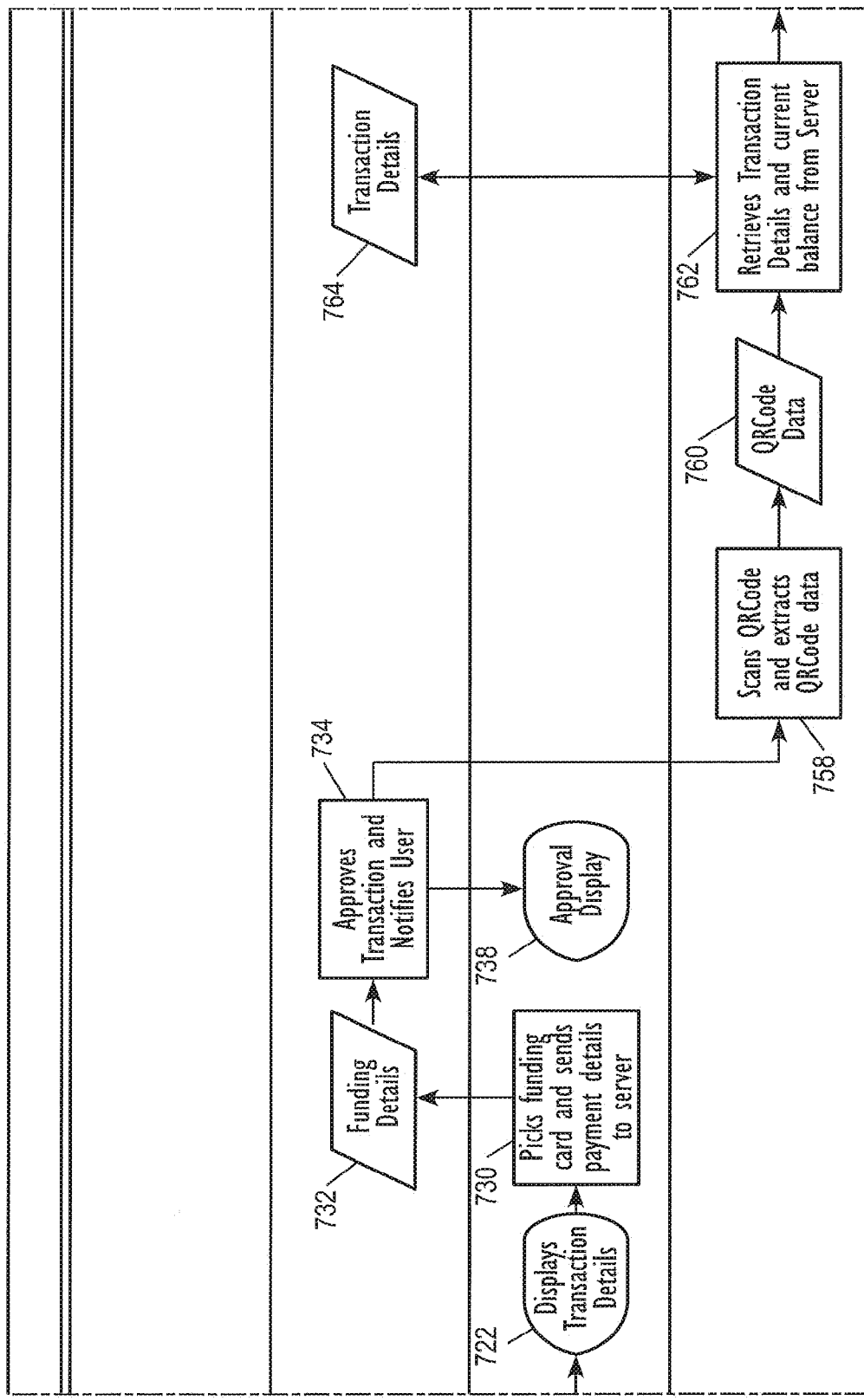
Figure 7C:
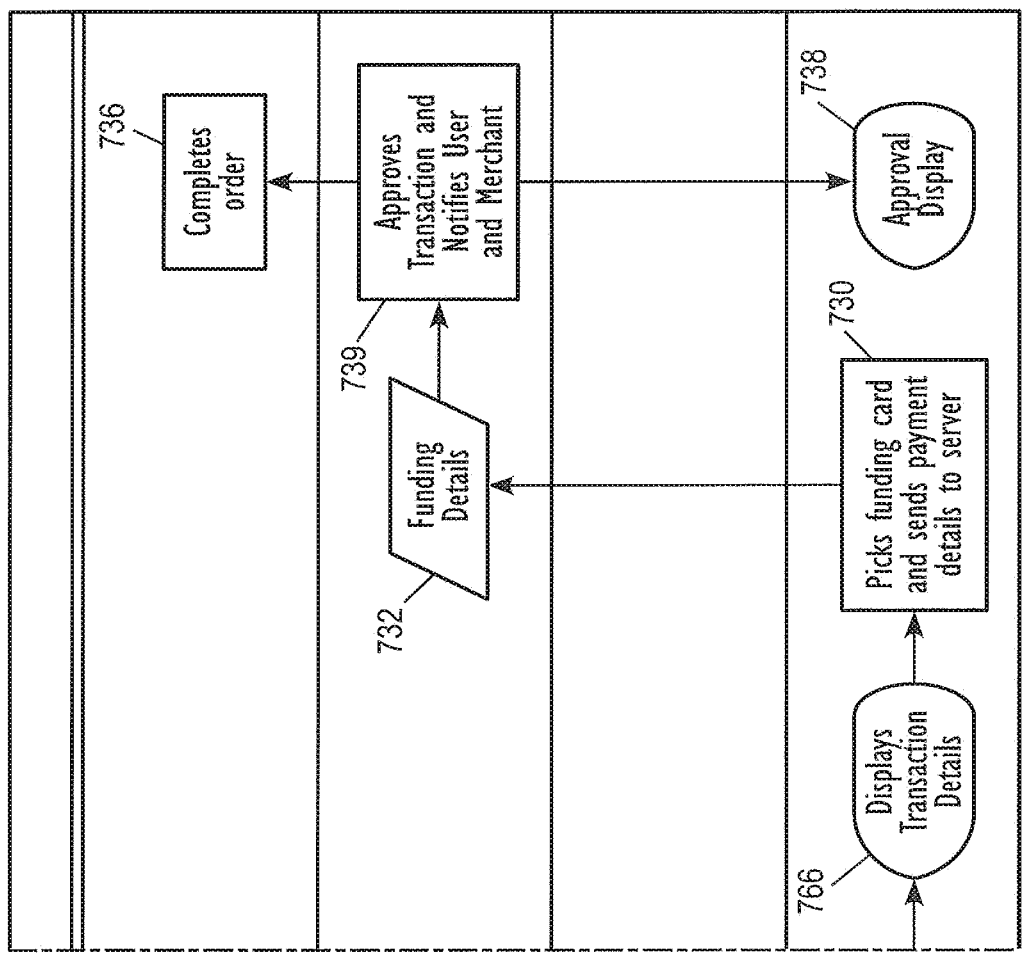

FIGS. 7A, 7B, and 7C are a flow diagram illustrating an exemplary multiple payer pay code flow.

Referring now to FIGS. 7A, 7B and 7C, an exemplary sequence may include (involve) the merchant 40, the pay code server 50 and the payer devices 10A and 10B. At block 702, the merchant 40 can build basic transaction details and, at block 704, the merchant 40 can send those transaction details to the pay code server 50. At block 706, the transaction details may be stored at the pay code server 50. At block 708, the transaction details at the pay codes server 50 may be used to create an electronic record of the transaction and the pay code server 50 may return the pay code data (e.g., transaction ID, etc.) to the merchant 40. At block 710, the pay code data may be stored at the merchant 40 and, at block 712, the pay code data may be used to generate and to display the pay code (e.g., bar code).

At block 714, a first payer device 10A may scan one or more pay codes and may extract the pay code data, which may be stored in the first payer device 10A, at block 716. At block 718, the pay code data may be used to retrieve details from the pay code server 50, which may be stored, at block 720, in the pay code server 50, as transaction details. At block 722, the first payer device 10A may generate a display of the transaction detail. At block 730, the first payer device 10A may provide the user with the option to select the funding card or the funding source and may send the payment details to the pay code server 50. At block 732, the funding details may be generated and at block 734, they may be used in an approval process to approve or deny the corresponding transaction. The user of the first payer device 10A may be notified accordingly. At block 738, the first payer device 10A, having received the result of the approved process, may display the approval result.

At block 758, the second payer device 10B may scan the pay code and may extract the pay code data and, at block 760, the pay code data may be stored in the second payer device 10B. At block 762, the pay code data may be used to retrieve transaction details and a current balance from the pay code server 50. At block 764, the transaction details may be sent to and stored in a database at the pay code server 50. At block 766, the second payer device 10B may display the received transaction details and, optionally, may permit the user 10 to select the funding card or the funding source. At block 730, the second payer device 10B also may send the payment details to the pay code server 50 and, at block 732, the funding details may be stored in the pay code server 50. At block 739, the pay code server 50 may approve or deny the transaction and may notify the user of the second payer device 10B and the merchant 40 of the approval result. At block 738, the approval or denial may be displayed to the user through the second payer device 10B. At block 736, at or about the same time as the display to the user of the second payer device 10B, the merchant 40 may complete the order.

As is understood from the multiple payer process, the first and second users can "split the tab" by having one user paying for a part of the transaction from its funding source and the second user then paying for the balance of the transaction on the second user's funding source. This may be advantageous for splitting tabs or any other circumstance where more than one person is motivated to pay part of a total bill.

Although two payers 10 are disclosed, it is contemplated that any number of payers may split the total bill (e.g., tab).

Poster-Based Pay Code Transactions

Figure 8A:
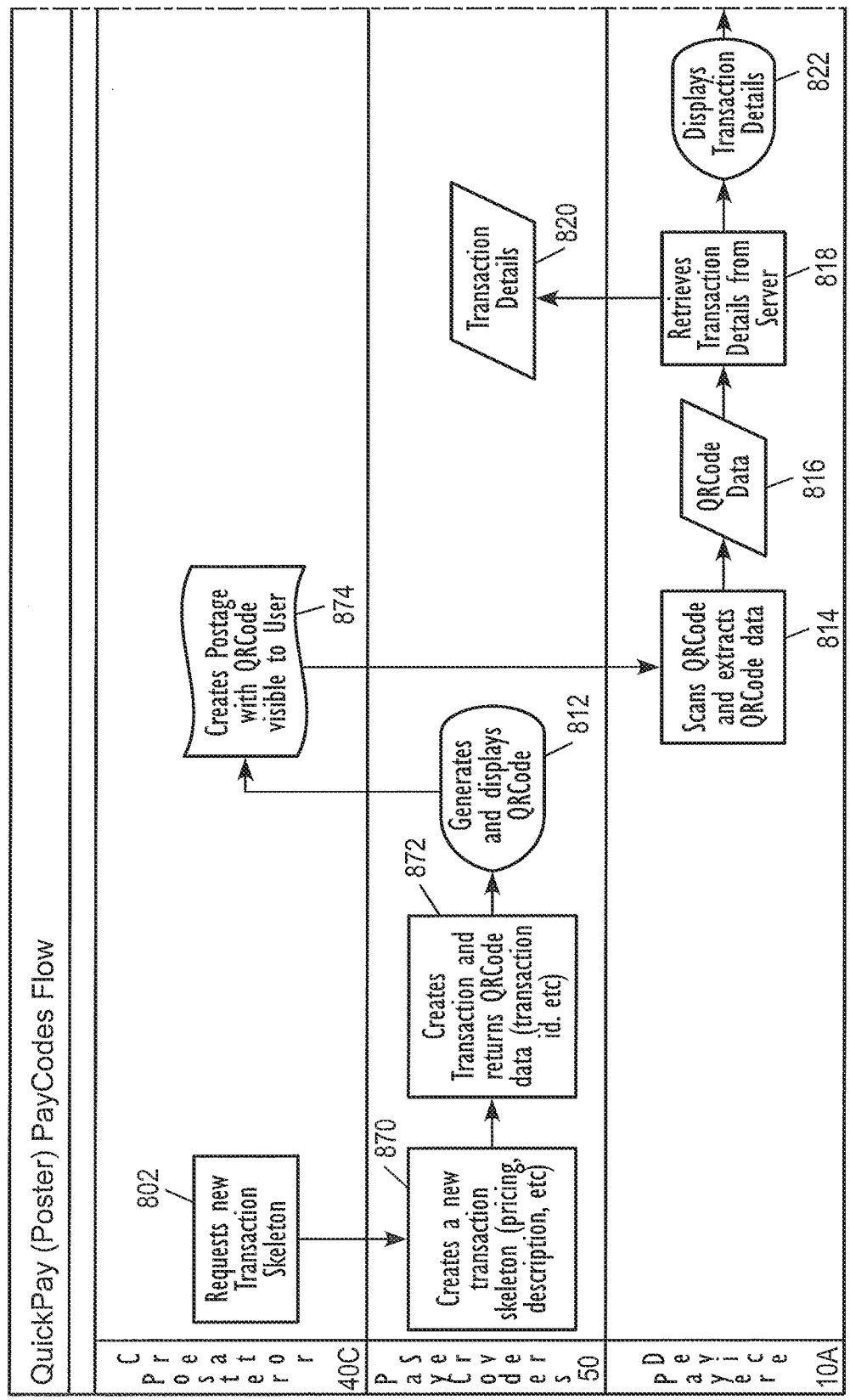
FIGS. 8A and 8B are a flow diagram illustrating an exemplary poster-based pay code flow.
Figure 8B:
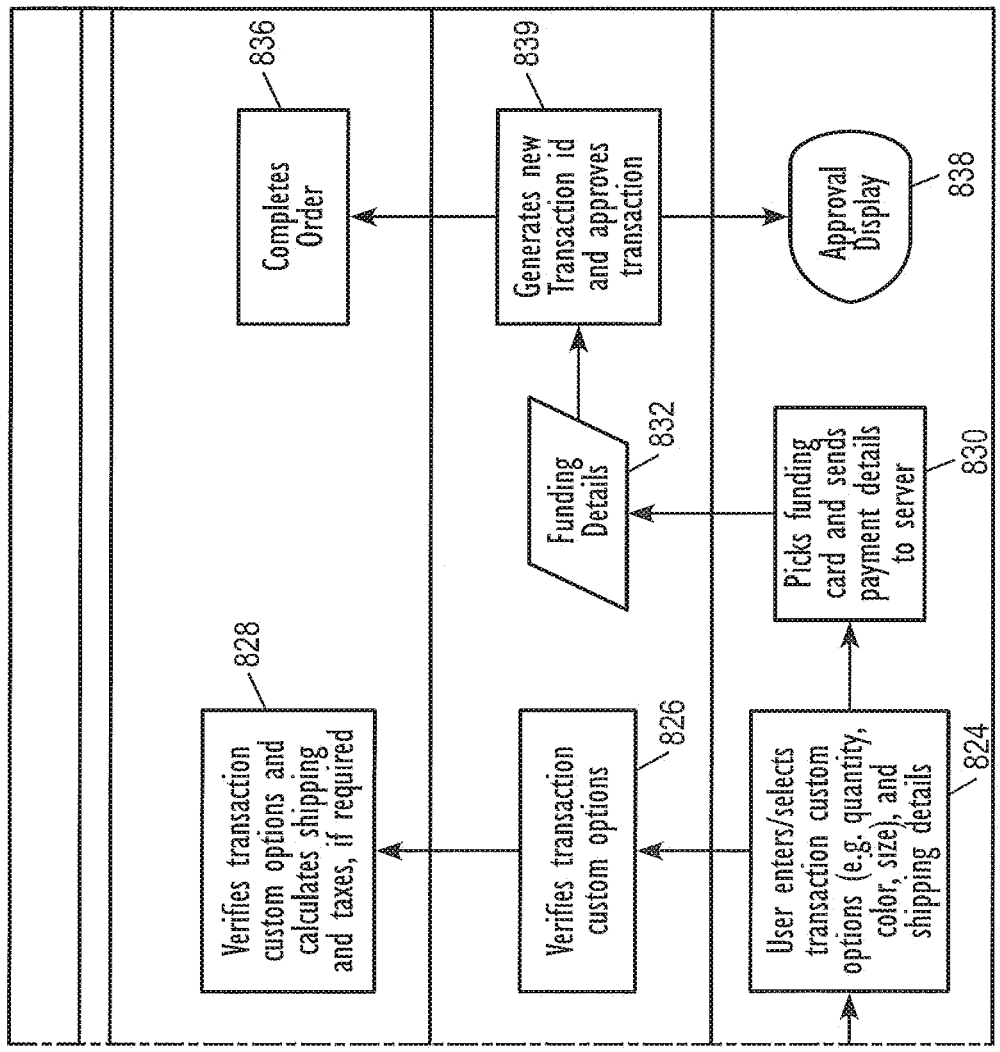

FIGS. 8A and 8B are a flow diagram illustrating an exemplary poster-based pay code flow.

As shown in FIGS. 8A and 8B, at block 802, a poster creator 40C can send a request for a new transaction skeleton from the pay code server 50. At block 870, the pay code server 50 may create a new transaction skeleton (e.g., pricing and/or description, among others). At block 872, the pay code server 50 may create an electronic record of the transaction, may return the pay code data (transaction ID, etc.) to the poster creator 40C, and may create and display the pay code data. At block 874, the pay code data may be visually shown, or transmitted to the poster creator 40C, which may create a poster with the pay code (e.g., bar code) visible to the user.

In this exemplary scenario, rather than the pay code representing a unique transaction, it may encode a transaction skeleton or may identify a transaction skeleton stored in the pay code server 50. The merchant 40 may convey through the poster details of the transaction what the merchant 40 desires included in the transaction should a customer 10 choose to buy the good or service being advertised. It is contemplated that the poster creator 40 may be a merchant who prints posters or directs a commercial printer to print the posters on the merchant's behalf. It is also contemplated that a near field communication chip may operate simultaneously with the pay code, to convey additional data to the customer 10 if payer device 10A includes a near field communication chip.

At block 814, the payer device 10A may scan the skeleton pay code and may extract the pay code data and, at block 816, the pay code data may be stored. At block 818, the pay code data may be used to retrieve transaction details from the pay code server 50. At block 820, the transaction details may be stored in a database of the pay code server 50, but can also be encoded in the pay code, or in a near field communication device. At block 822, the payer device 10A may display the transaction details and, at block 824, the user 10 may enter and/or may select custom transaction options (e.g., quality, color, size, etc.) and shipping details, for instance. At block 826, the pay code server 50 may receive from the payer device 10A the custom transaction options and may also verify the custom transaction options. At block 828, the poster creator 40C may receive from the pay code server 50 the custom transaction options, may verify the custom transaction options, and may calculate costs for shipping and taxes, as required.

At block 830, the user 10 can select the funding card or funding source and can send payment details to the pay code server 50 and, at block 832, the funding details may be stored in the pay code server 50. At block 839, the system may generate a unique transaction ID that may tie the purchase to a specific user. Up to that point, there is no requirement to generate a transaction ID because there is no confirmed intent to buy the good or service. The transaction skeleton may be uniquely identified in the system. As such, the transaction skeleton is not a unique transaction yet, but rather the unique item, cart or container having particular details to copy into a new transaction at the payer's request. The pay code server 50 may also approve or deny the transaction in accordance with, for instance, the process flows of FIGS. 12-14. At block 838, the payer device 10A can display the result of the approval process and, at block 836, if approved; the poster creator 40C can complete the order.

Although the pay code skeleton is disclosed for use with posters, it is contemplated that pay code skeletons may be used with any printed advertisement of a good or a service to for example, identify the model or general service being offered and the details thereof prior to a completed transaction. In one exemplary embodiment, the pay code skeleton may be used with an advertisement on a website.

In certain exemplary embodiments, the pay code skeleton may be used to identify a product or service for sale and may enable, for example, the review of detailed offers (advertisements) at: (1) the payer device; (2) an electronic display in visual range of the payer device; and/or (3) an acoustic device in acoustic range of the payer device. In one embodiment, it may be used in conjunction with an acoustic stimuli-based distribution, as described below. The payer device may also direct the presentation of the detailed offer (video or acoustic) to the various devices based on location information from a global positioning system (GPS) or by using device-to-device wireless communications.

Television-Based Pay Code Transactions

Figure 9A:
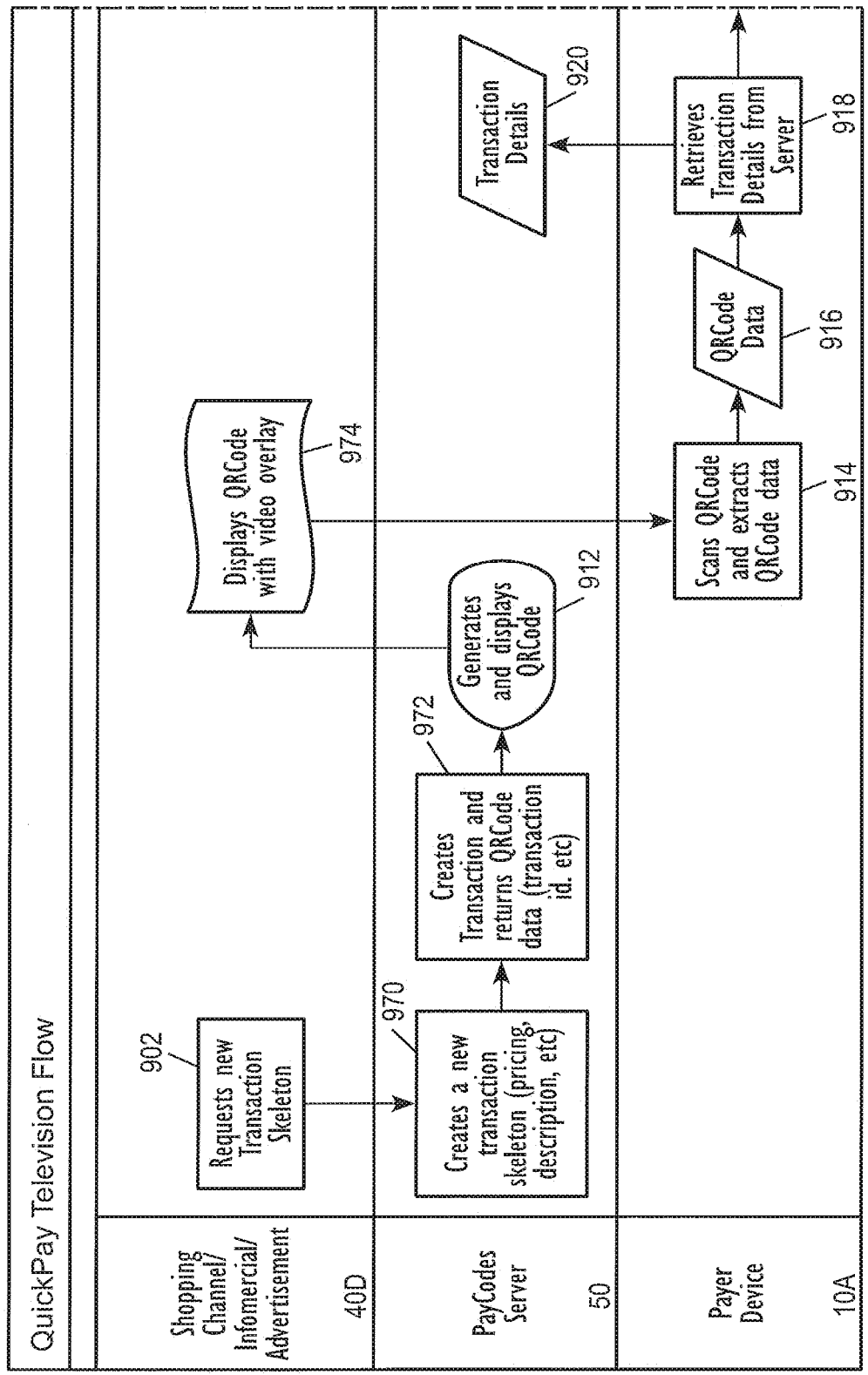
FIGS. 9A and 9B are a flow diagram illustrating an exemplary television-based pay code flow.
Figure 9B:
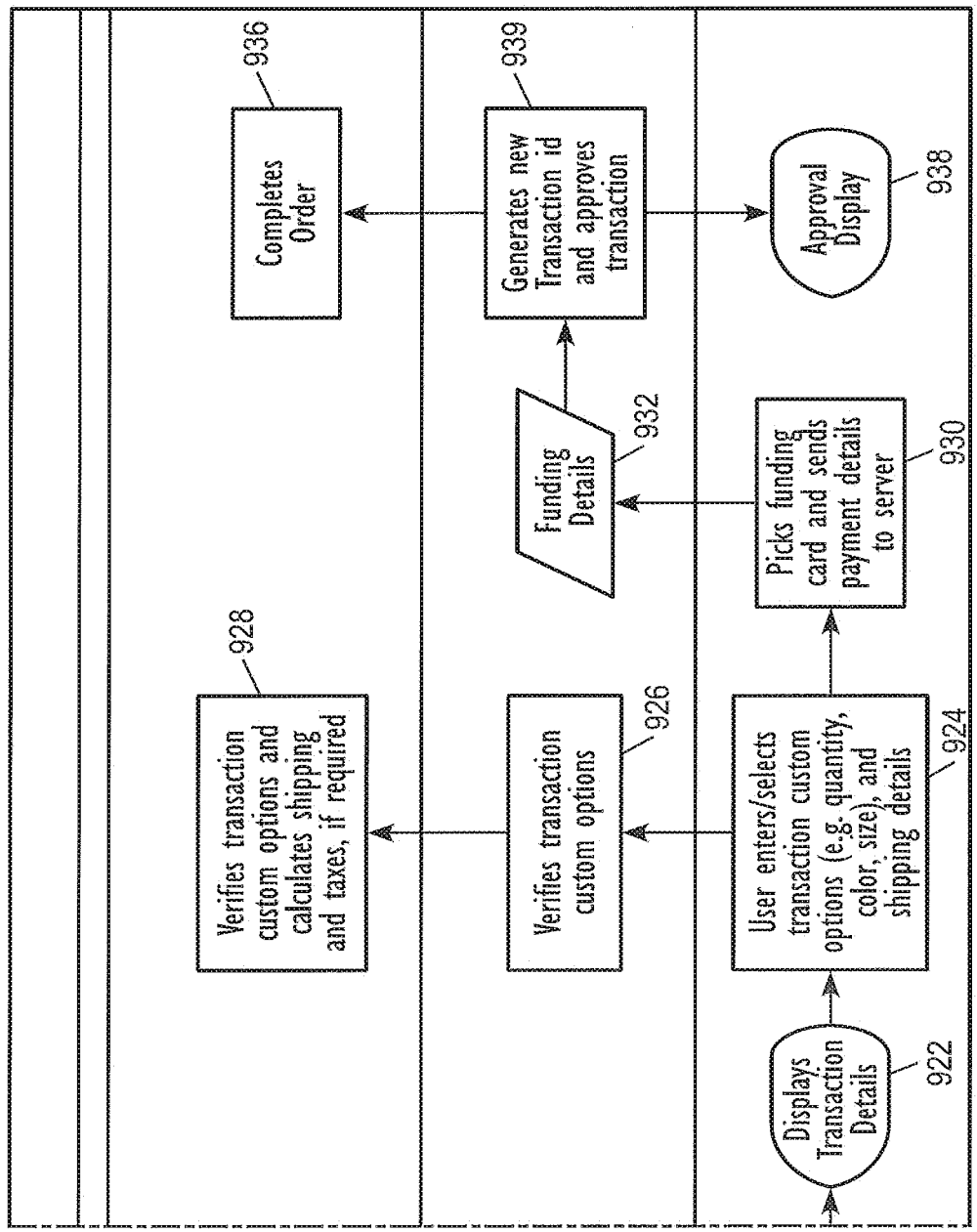

FIGS. 9A and 9B are a flow diagram illustrating an exemplary television-based pay code flow.

As shown in FIGS. 9A and 9B, at block 902, a shopping channel and/or an infomercial/advertisement provider 40D can request a new transaction skeleton. At block 970, the pay code server 50 may create a transaction skeleton (including, for example, pricing, description, etc.). At block 972, the pay code server 50 may create an electronic record of the transaction and may return the pay code data (such as the transaction ID and/or other transaction details, among others) and, at block 912, may generate and may display the pay code data and/or may transmit it to the shopping channel, infomercial or advertisement provider 40D.

At block 974, the shopping channel or infomercial/advertisement provider 40D may display the pay code (e.g., bar code) with a video overlay so that the pay code may be displayed by the payer device 10A. In one embodiment, the pay code may be encoded as event data in a video (e.g., in a vertical blanking interval) as described below. At block 914, the payer device 10A may scan the pay code and may extract the pay code data and, at block 916, the pay code data may be stored in the payer device 10A. In one embodiment, the pay code data may be extracted through voice or human based gesture actions, as described below. At block 918, the payer device 10A may be used to retrieve transaction details from the pay code server 50. The transaction details may be previously stored in a database at the pay code server 50, at block 920. At block 922, the payer device 10A can display the received transaction details and, at block 924, the payer device 10A can permit the user to enter or select transaction custom options (such as quality, color, size, shipping details, etc.).

At block 926, the pay code server 50 may verify transaction custom options. At block 928, the shopping channel/infomercial or advertisement provider 40D may also verify the transaction custom options and may calculate shipping and taxes, as appropriate (or required). At block 930, the user 10 of the payer device 10A may pick (e.g., select) a funding card or funding source and may send the details to the pay code server. At block 932, the funding details may be stored and, at block 939, the funding details may be used to generate a new transaction ID and/or approve or deny the transaction. At block 936, the shopping channel or infomercial/advertisement provider 40D can, if approved, complete the order and, at block 938, the result of the approval process (e.g., approval or disapproval of the transaction) may be displayed on the payer device 10A.

Although the pay codes are disclosed as being displayed in a video overlay, it is contemplated that any technique enabling the presentation or transfer of an image of the pay code from a video signal to a payee device may be used. For example, a set-top box may enable the transfer of image data (e.g., the pay code skeleton) inserted into a blanking interval of the video signal to the payer device via wired or wireless communications for display on the payer device. In one exemplary embodiment, the transfer of the pay code skeleton to the payer device is triggered by human voice or gesture based commands, which may be read, for example, by a human interaction device.

Multiple Recipient Pay Code Transactions

Figure 10:
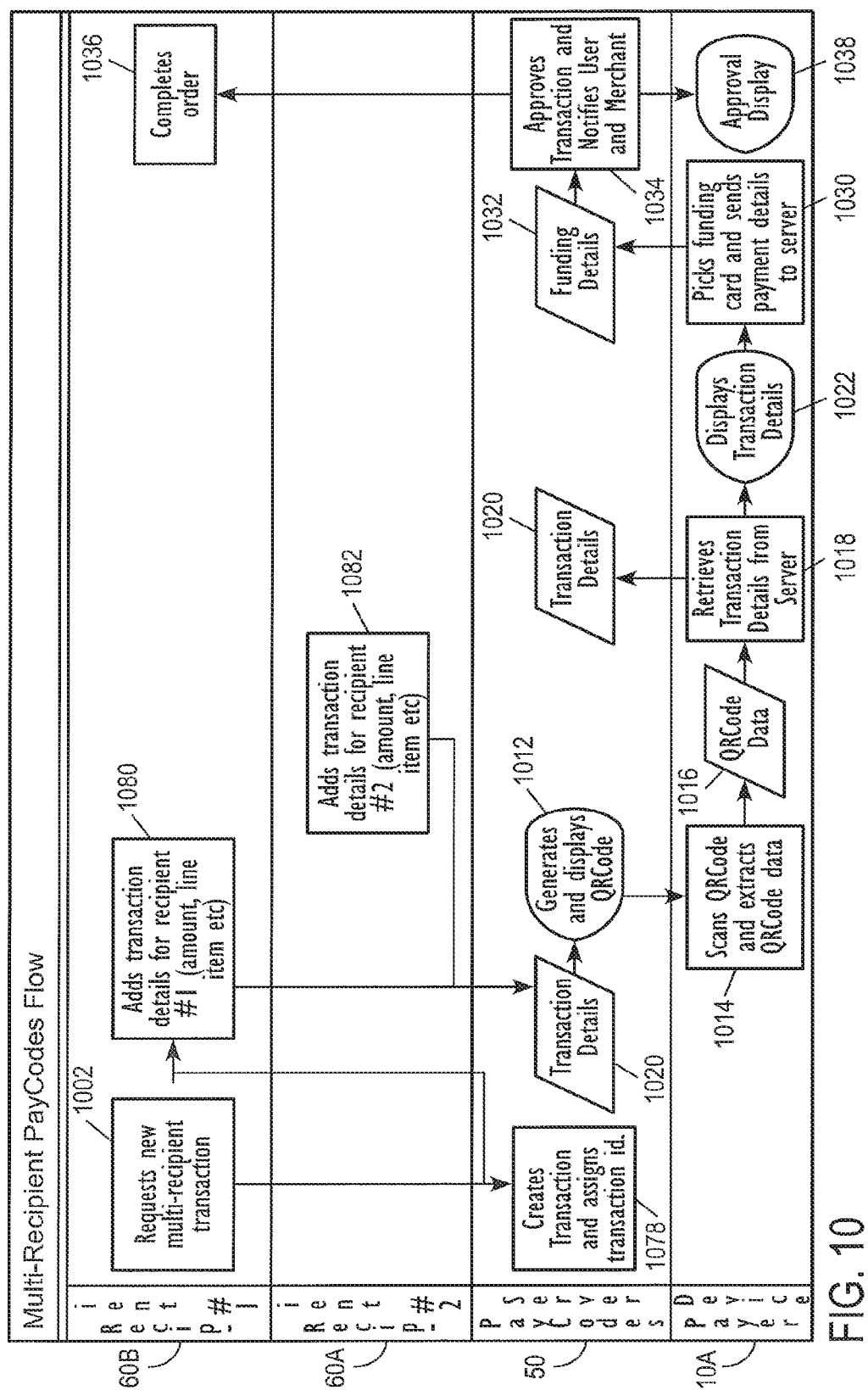
FIG. 10 is a flow diagram illustrating an exemplary multi-recipient or payee pay code flow.

FIG. 10 is a flow diagram illustrating an exemplary multiple recipient or payee pay code flow.

As shown in FIG. 10, first and second users of a service can be recipients 60A and 60B. For instance, at block 1002, the first recipient 60B may request a new multi-recipient transaction from the pay code server 50. At block 1078, the pay code server 50 may create an electronic record of the transaction and may assign a transaction ID. At block 1080, the first recipient 60B can add transaction details, such as an amount, a line item, etc. At block 1020, the transaction details may be received from the pay code server 50 and may be stored in a database associated with the pay code server 50. Additionally, at block 1082, the second recipient 60A can add transaction details for herself, such as an amount, a line item, etc. At block 1012, the pay code server 50 may generate and may display the pay code.

At block 1014, the payer device 10A can scan the pay code and may extract pay code data. At block 1016, the pay code data can be stored. At block 1018, the payer device 10A may retrieve transaction details from the pay code server 50. At block 1022, the payer device 10A may display (e.g., present) the transaction details. At block 1030, the payer device 10A may offer the ability to pick (e.g., select) the funding card or source and may send the payment details to the pay code server 50. At block 1032, the funding details may be used to approve or deny the transaction in the manner shown in FIGS. 12-14. At block 1034, the pay code server 50 may notify both the user 10 and the recipients of the result of the approval process. At block 1038, the result of the approval process (approval or denial) may be displayed or presented by the payer device 10A and the first recipient 60B such that, at block 1036, if approved, the first recipient 60B can complete the order. In some embodiments, the result may also be displayed or presented to the second recipient 60A such that, if approved, the second recipient 60A can complete the order.

Three examples of this form of transaction may include:

A user may shop on an e-Commerce site such as etsy.com where multiple merchants post their goods (e.g., wares). The user may build a cart of items that the server may keep track of for the individual merchants that require payment. The user may be presented with a single transaction confirmation screen and may be notified that the transaction may appear as several charges on their bill. The pay code server 50 may notify each merchant of the purchase and may initiate the multiple transactions (individual purchases) on the user's behalf.

In a physical mall setting, a shopper may not want to carry around bags and boxes of purchases. Rather, the shopper may initiate an electronic cart and may walk around the mall or series of stores. In this exemplary scenario, the shopper may build the electronic cart by collecting pay code skeletons from goods and/or service offerings and may complete the transaction at their leisure with shipping instructions (such as shipping location) for the goods or services, for example.

Real-estate, automobile purchases, and other relatively complex transactions that involve multiple players are another type of multi-recipient transaction, e.g., a transaction in which a payer may confirm payments to several payees (e.g., title companies, closing agents, insurance agents, government authorities, former owners, etc.)

Retailer Pay Code Transactions

Figure 11B:
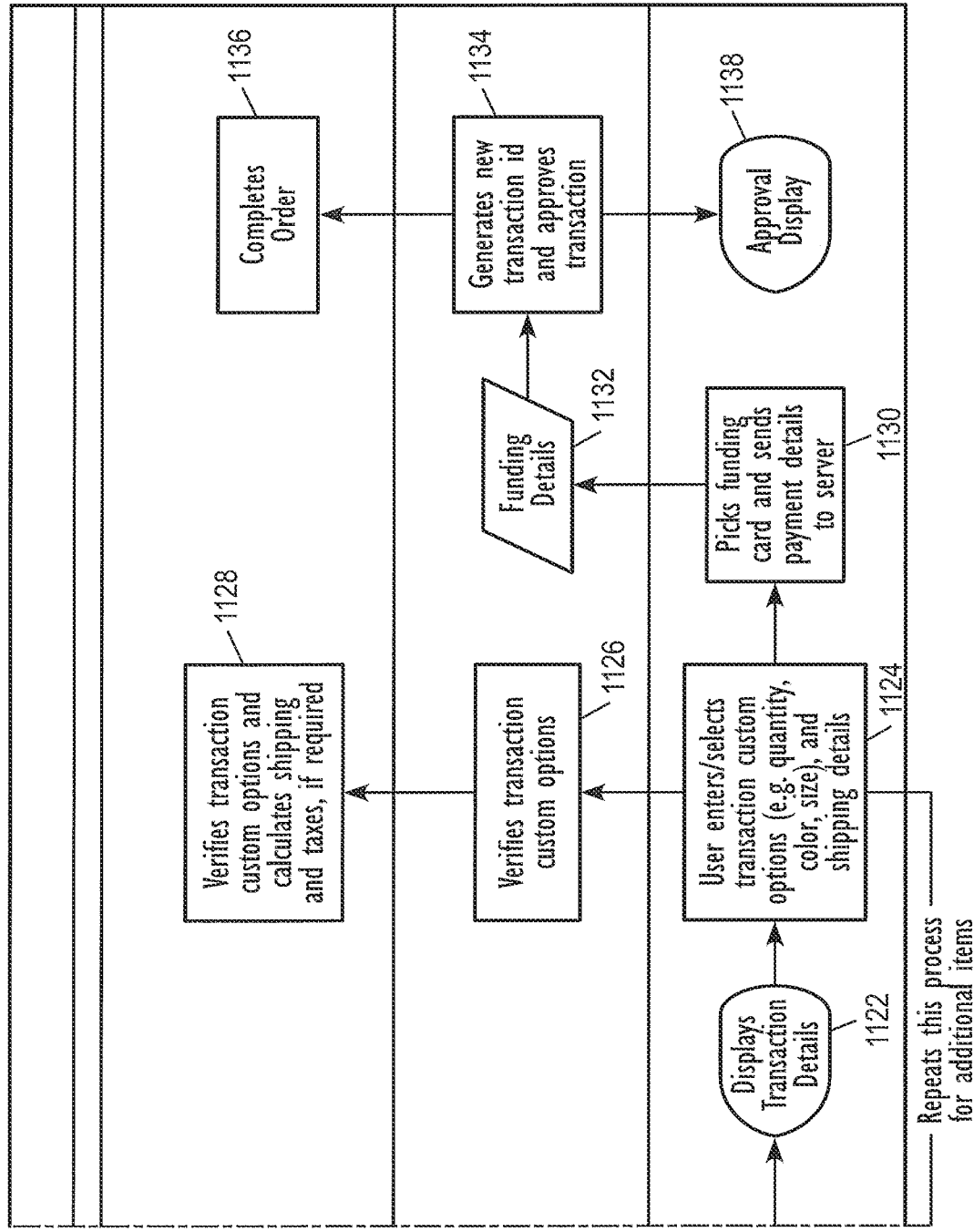

FIGS. 11A and 11B are a flow diagram illustrating an exemplary retailer pay code flow.

Referring to FIGS. 11A and 11B, a retail store may have a display 40D, for example, viewable by customers (e.g., in a window or in the retail store). At block 1102, the retail store may request a new transaction skeleton of the pay code server 50. At block 1170, the pay code server 50 may create a new transaction skeleton and at block 1172, the pay code server 50 may create an electronic record of the transaction. The pay code server 50 may also return the pay code data (e.g., the transaction ID, etc.) and at block 1112, may optionally generate and display the pay code (e.g., bar code). At block 1074, the retail store 40D may print or may generate and print the pay code on a retail display (e.g., an item pricing display, an in-store marketing display or any other display for displaying product or service information).

At block 1114, the payer device 10A can scan the pay code and may extract the pay code data. At block 1116, the pay code data may be stored and used, at block 1118, to retrieve transaction details from the pay code server 50. At block 1120, the transaction details may be stored in the pay code server 50 and may be returned to the payer device 10A such that, at block 1122, the transaction details may be displayed on (e.g., presented by) the payer device 10A. At block 1124, the payer 10 may enter and/or select transaction custom options (e.g., the quality, color, size, shipping details, etc.). At block 1126, the transaction custom options may be verified in the pay code server 50 and, at block 1128, the transaction custom options may be verified in the retail store. The retail store may also calculate shipping and taxes, if appropriate.

At block 1130, the payer device 10A may permit the user to select or pick a funding card or source and can send the payment details (or funding details) to the pay code server 50. At block 1132, the funding details may be used to generate a new transaction ID and, at block 1134, may carry out the approval process for the transaction. At block 1136, the information may be conveyed to the retail store or store display 40D, which, if approved, may complete the order. At block 1138, the user 10 via the payer device 10A, may display the result of the approval process.

Delayed Payment Pay Code Transactions

Figure 22A:
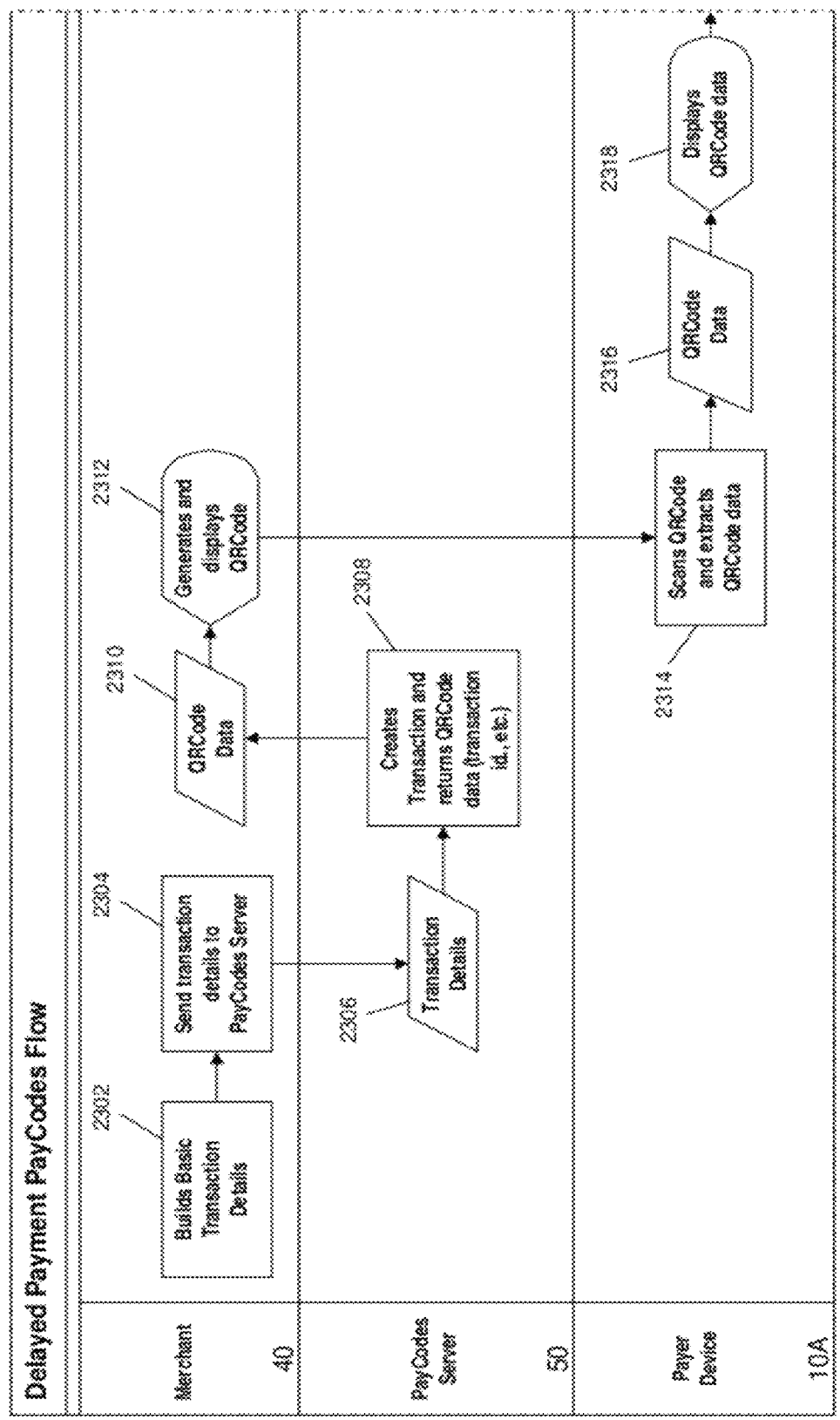
FIGS. 22A and 22B are a flow diagram illustrating an exemplary delayed payment pay code flow.
Figure 22B:
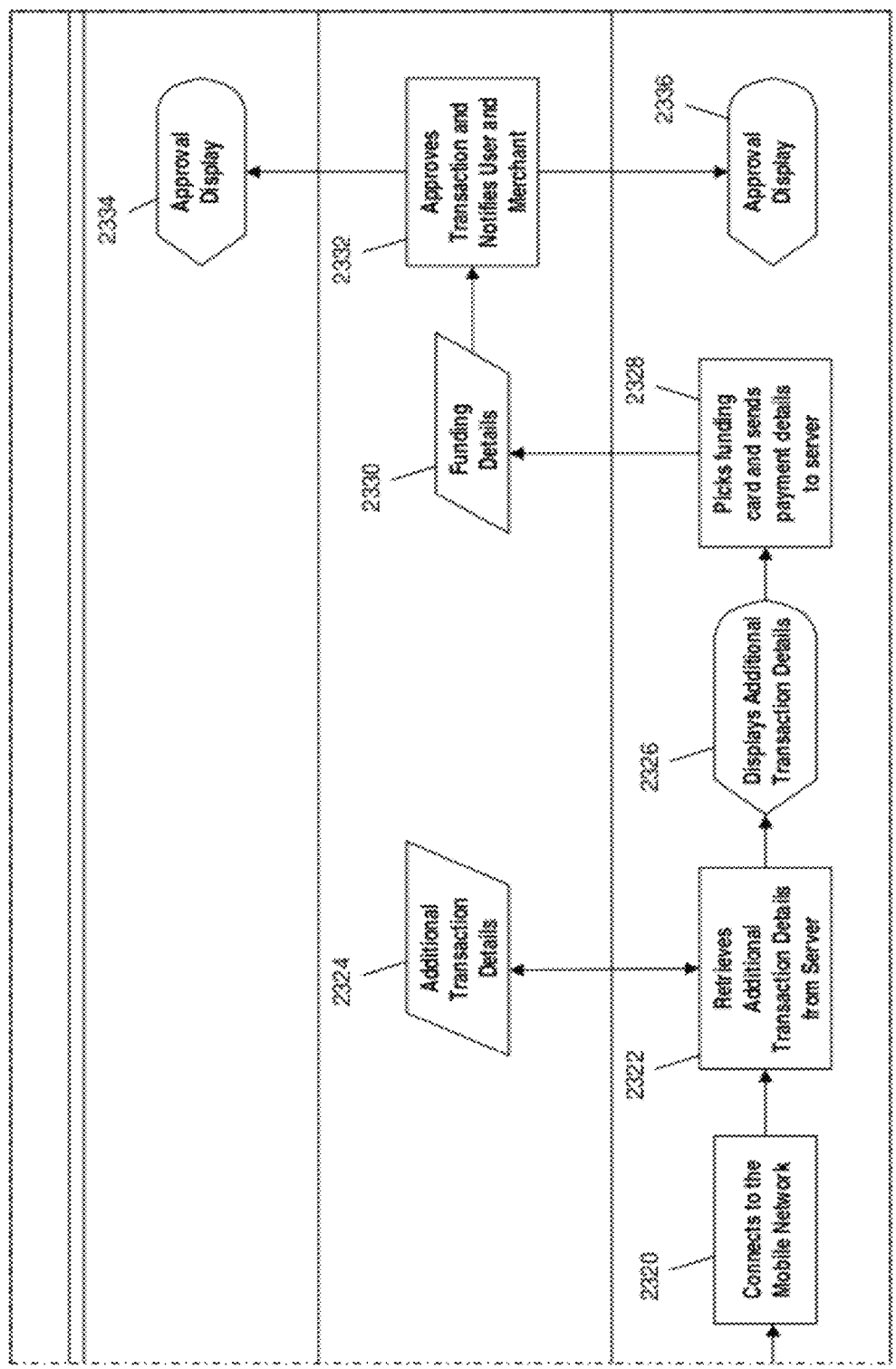

FIGS. 22A and 22B are a flow diagram illustrating an exemplary delayed payment pay code flow.

Referring now to FIGS. 22A and 22B, an exemplary sequence may include (involve) the merchant 40, the pay code server 50 and the payer device 10A. At block 2302, the merchant 40 can build basic transaction details and, at block 2304, the merchant 40 can send the transaction details to the pay code server 50. At block 2306, the transaction details may be stored at the pay code server 50. At block 2308, the transaction details at the pay codes server 50 may be used to create an electronic record of the transaction and the pay code server 50 may return the pay code data (e.g., transaction ID, etc.) to the merchant 40. In an exemplary embodiment, the pay code data may include basic transaction data (e.g., product information, purchase price, etc.) In another exemplary embodiment, information for a transaction ID can be stored (e.g., on the device, such as in an application database, or in a chip accessed using near field communication). At block 2310, the pay code data may be stored at the merchant 40 and, at block 2312, the pay code data may be used to generate and to display the pay code (e.g., bar code).

At block 2314, the payer device 10A may scan one or more pay codes and may extract the pay code data, which may be stored at block 2316. At block 2318, the payer device 10A may generate a display of the pay code data, including any included basic transaction data. At block 2320, the payer device 10A connects to a network (e.g., a mobile network), and thereby retrieves additional details from the pay code server 50, at block 2322, which may be stored, at block 2324, in the pay code server 50, as additional transaction details. At block 2326, the payer device 10A may generate a display of the additional transaction details. At block 2328, the payer device 10A may provide the user with the option to select the funding card or the funding source and may send the payment details to the pay code server 50. At block 2330, the funding details may be generated and at block 2332, they may be used in an approval process to approve or deny the corresponding transaction. The user 10 and merchant 40 may be notified accordingly. At block 2334, the merchant 40, having received the result of the approved process, may display the approval result, which may also be displayed to the user 10, at block 2336.

As is understood from the delayed payment process, a payer who views an advertisement or otherwise wishes to make a purchase for a product when lacking a network connection, can initiate a transaction by reading (e.g., scanning) a pay code and then proceeding with the transaction after a network connection has been established.

A user may view a poster advertising tickets for a concert event in an underground transit system. The user can scan a pay code on the poster using the payment application on their mobile device without network connectivity. The user can see information about the concert on their mobile device that was encoded in the pay code via optical, aurial or in a nearby near field communication (NFC) chip as described elsewhere. As the user establishes connectivity to their mobile network, the tickets become available to purchase on the mobile device display, or can be referenced from the user's activity history. The product information is updated from the pay code server so that the latest information, pricing, availability, etc., is presented to the user before payment is confirmed.

For example, a driver may be at a remote gas station and scan a pay code at the gas pump to initiate payment for gas. The driver can enter an amount to pay as displayed on the pump, and the payment application on their mobile device can schedule to make the payment when network connectivity is re-established. The merchant gas station can capture time and other details (e.g., license plate) that can be submitted to the pay codes server when network connectivity is re-established, in order to reconcile the payment. When the driver enters an area and establishes connectivity to their mobile network, the scheduled payment is processed and the driver is notified.

As another example, a consumer is flying in an airplane from one destination to another may be prohibited from connecting to a mobile network. The consumer may browse a product catalog available on the airplane that advertises goods or services, and, using the payment application on their mobile device, scan pay codes for any of the goods or services that the consumer wishes to purchase. When the consumer's airplane lands and network connectivity is established with the mobile device, product information for each of the scanned goods or services can be presented to the consumer, who may then confirm transaction details and payment, or an option offered for this done automatically by the mobile device.

Payment Processing

FIG. 12 is a flow diagram illustrating an exemplary payment processing flow diagram for larger merchants. FIG.

13 is a flow diagram illustrating an exemplary payment processing flow diagram for smaller merchants or for on-behalf processing. FIG. 14 is a block diagram illustrating an exemplary computer architecture and exemplary data in accordance with various embodiments for remote control of website content by a user device using machine-readable pay codes.

Referring to FIGS. 12-14, exemplary payment processes will be explained with reference to payer device 10A, the pay code server 50 and the merchant or merchant POS 40 with the optional inclusion of a gateway or acquirer 30. These details, which are shown in FIGS. 12 and 13, correspond to the approval transaction process flow, for example, of the basic pay code flow of FIGS. 2A and 2B, at block 234.

Large Payment Processing

As shown in FIG. 12, at block 1280, the funding details and the transaction details may be presented in an electronic communication, as a payment ready for processing by the pay code server 50. At block 1282, the pay code server may extract the funding details from the electronic communication. At block 1284, the funding data may be routed to the merchant 40 for processing. At block 1286A, the merchant 40 may process the transaction through the normal gateway/acquirer 30 that may be external or internal to the merchant 40. At block 1288A, the approval or denial details may be generated and may be sent back (returned) to the pay code server 50 and may be sent within the merchant 40 to complete the order, if approved, as shown in FIGS. 2A and 2B, at block 236 and to display the approval or denial on the payer device 10A (FIGS. 2A and 2B, at block 238). At block 1290, the pay code server 50 may receive a process approval indication or denial indication, and may continue the pay code flow (e.g., allowing the merchant 40 to complete the order, if approved, and to display the approval/denial, as shown in FIGS. 2A and 2B).

Small Merchant or "On Behalf" Payment Processing

FIG. 13 shows a variation of a process flow of FIG. 12 and this process flow may be more suitable for the current method of payment processing for small merchants or "on behalf" processing (as conventionally referred to in the art). The modifications that occur to the legacy of payment processing may include, at block 1380, that the pay code server 50 may receive payment transaction data ready for processing, at block 1382, the funding details may be extracted and, at block 1384, the pay code server 50 may place an authorization request using the merchant's credentials.

In certain exemplary embodiments, the merchants may issue credentials (e.g. username and/or password) with which they authenticate with their gateway or acquirer 30. The pay code server 50 may support the credentials as appropriate. At block 1386B, the gateway or acquirer 30 may process the transaction and, at block 1388B, the gateway or acquirer 30 may generate the approval/denial details. At block 1390, the pay code server 50 may receive and process approval/denial indication and, at block 1394, may route the approval details to the merchant 40. At block 1396, the merchant 40 may receive the approval/denial details and, at block 1392, the pay code server 50 may continue on with the pay code flow as indicated, for example in FIGS. 2A and 2B at block 234, for sending information to allow the merchant 40 to complete, if approved, the order in FIGS. 2A and 2B at block 236. At block 1380, the approval/denial result at block 238, if appropriate may be displayed.

Remote Control of Web Applications

As explained above with respect to the on-line payment scenario of the e-commerce pay code transactions shown in FIG. 4, the mobile device effectively and indirectly may take control of a web application session that may or may not be linked to the transaction. For example, a user may go to a website through a URL (e.g., remotecontrolme.com) via a PC, Mac, TV or a screen from a store window, for instance. The website (e.g., remotecontrolme.com) may present a unique pay code. The unique pay code does not have to be part of any payment or purchase process, and hence, for this section, the pay code is described as a unique code, and the payer device is described as a user device, but otherwise they may be the same. An app (e.g., application software) on the user device 10A (e.g., remotecontrolme app) may scan or may read the unique code effectively allowing the user device 10A to setup an alternate session to control navigation and features run on the PC, TV and/or screen from the store window to control its content. As one example, the content on the PC, TV, or screen from the store window may not be controlled through the user interface of these devices, but rather through the remote actions of a user device 10A via the remotecontrolme app. In essence, a user device 10A can act as a wireless mouse controlling a display belonging to a merchant, or advertiser or another, in shop windows, or electronic billboards, etc. This may be particularly advantageous in areas where the audience/users are "captive" such as public transportation, planes, taxis, waiting rooms, etc.

The method of indirect control of a website from the website provider's perspective may involve displaying a unique machine-readable code unique to a specific display device displaying contents from the website through a server. The unique machine-readable code may be readable by a user (e.g., communication) device 10A. The user device 10A may be able to communicate with the server through a communication path (e.g., over WiFi or a mobile telephone network connected to the server, with or without intermediary communication paths such as the Internet). The communication may not involve (e.g., may be exclusive of) an input device associated with the display.

For example, the server may receive commands to control content displayed from the user device. The process may include a unique code server, or the unique codes may be provided by the same server as the website server. The commands may include the identity of the display device via the displayed unique machine-readable code read by the user device 10A or via direct wireless communications with the display device. The website server may change the content displayed on the display device based on the unique machine-readable code. By creating a website that can generate a unique session identity code similar to a pay code, the server that provides the website may poll the unique code server 50 (or a different server) for instructions from the user device 10A. The unique code app may scan the unique code and may provide payment information, but this mechanism is not limited to financial transactions. The merchant server that may be polling can recognize a payment has been fulfilled and can present receipt-type data.

Although the remote control of a website by a user device is described with reference to financial transactions, it is not limited to financial transactions and it is contemplated that many other types of transactions are possible. For example, by displaying a unique code on the website that is readable by a code-enabled device, rather than the conventional user interfaces such as keyboards or mice and/or touch screens associated with the display that displays the unique code, the user device 10A can effectively take over control of the website or monitor through the internet such that the website may send display signals to the PC, TV or screen in a store window via the remote control of the user device.

This process has many applications far beyond financial transactions. For instance, specific product information (including advertisements) can be generated at the direction of the user device 10A. Of course, the information is not limited to products but any content that is appropriate under the circumstances can be remotely controlled via unique codes scanned by the user device 10A. Alternatively or additionally, additional security features can be established through the remote control of the website via this arrangement involving the user device 10A reading the unique code displayed on the merchant display device. For example, product or service offering (e.g., information) may be displayed without the user providing information directly to the store.

Referring to FIG. 14, a display 1510, which may be a screen in a merchant's shop, a television in a consumer's home, a PC and/or nearly any other type of display device, may display a unique code 1512. The unique code 1512 may be generated through conventional interactions with a display device (e.g., the keyboard and mouse of a PC) or by generation of a unique code depending on the content displayed on the display device, which might change over time. The consumer's device 1520 which might be a smart phone, camera-enabled telephone or nearly any other device capable of wireless communications, and may be enabled to read the unique code 1512 (e.g., optically or through any other means for which the consumer device 1520 may be capable of reading the unique code 1512). The consumer device 1520 may transmit the unique code information that has been read through a network 1540.

The network 1540 may be broadly understood to include one or more wireless links but is not limited thereto. For instance, the network 1540 may include a cellular network or a wireless link such as via Wi-Fi or Bluetooth® that might be a dedicated network or connected to the internet, for instance. The network 1540 may be conventional. The wireless network may communicate with the third party server 1530 that may be attached to a database 1530A in any conventional manner. The third party server 1530 may be a merchant server that provides either the website content, the screen in the store or the content displayed on a TV. The TV may be a cable-based TV, a fiber optic-based TV or a satellite-based television, for instance. The display content may be a shopping network or nearly any other mechanism for advertising including product placement within television shows or movies.

Once the user device 1520 has read the unique code 1512 and transmitted it through the network (e.g., wireless network) 1540 to the server 1530, the user device 1520 can then be used to control the content of the display 1510. For instance, the user device 1520 may be used as a mouse to scroll around the display. The user device 1520 may also be used as an air mouse, where movement of the actual user device 1520 results in relative movement of a mouse in the display 1510, e.g., through included accelerometers, gyroscopes, etc. The user device 1520 may also be used as an input device such as a keyboard as long as the display 1510 can be uniquely identified. For instance, the user device 1520 may send out command signals through the network 1540 to the server 1530 that may in turn change the content of the display 1510 on the user's PC via the internet, or the display on a cable TV through the cable TV's service provider or to the display in a shop window which may be through a closed network or through the internet or any other communication mechanism. That is, the user device 1520 can control a display 1510 via a server or other network mechanism 1530 that otherwise is unassociated and unlinked through a communication protocol identified and established using the unique code 1512.

In this system, the unique code may identify a particular transaction on a webpage or website display by a first party. The user device 1520 of a second party equipped with a reader capable of reading the unique code may communicate data taken from the unique code and may convey it back to the first party together with additional information identifying the transaction and, optionally, other information about the second party (e.g., identity, time, location, account information, communication protocols, security measures, etc.). The user device 1520 can also be used by the second party to control the contents of the display provided by the first user.

As an example, a consumer (the second party) could be viewing a display screen in a shop window of a store of a merchant (the first party). When the consumer views something she likes, she may scan a pay code (e.g., a QR code) displayed with the product information from the consumer's smart phone. The smart phone can be programmed to provide menu options and may have an input key board such that the consumer can select additional information about the product, such as price and product details. This information may be conveyed through a mobile network to the store's servers, which then, having information from the QR code, can identify the particular screen in the shop window, and may send the requested information for display. The user can also use the smart phone to securely purchase the item, complete with the user's selection of a funding source and shipping details. In this way, the user does not have to interact with the input devices in the store. For example, such purchase may occur from a store display inside the store while the user 10 is outside the store.

This may be helpful when online shopping using someone else's computer, such as in a coffee shop, where access to the computer may not be limited to a particular person, and the auto-fill of information is not present or represents a security risk. The use of the user's smart phone bypasses this risk while still providing the convenience of having all the information the user might want or need to provide. The transaction also may minimize input by the user and may enable secure one-click shopping using a strange computer through this process.

Graphical User Interface for Pay Codes

Figures 15A, 15B:
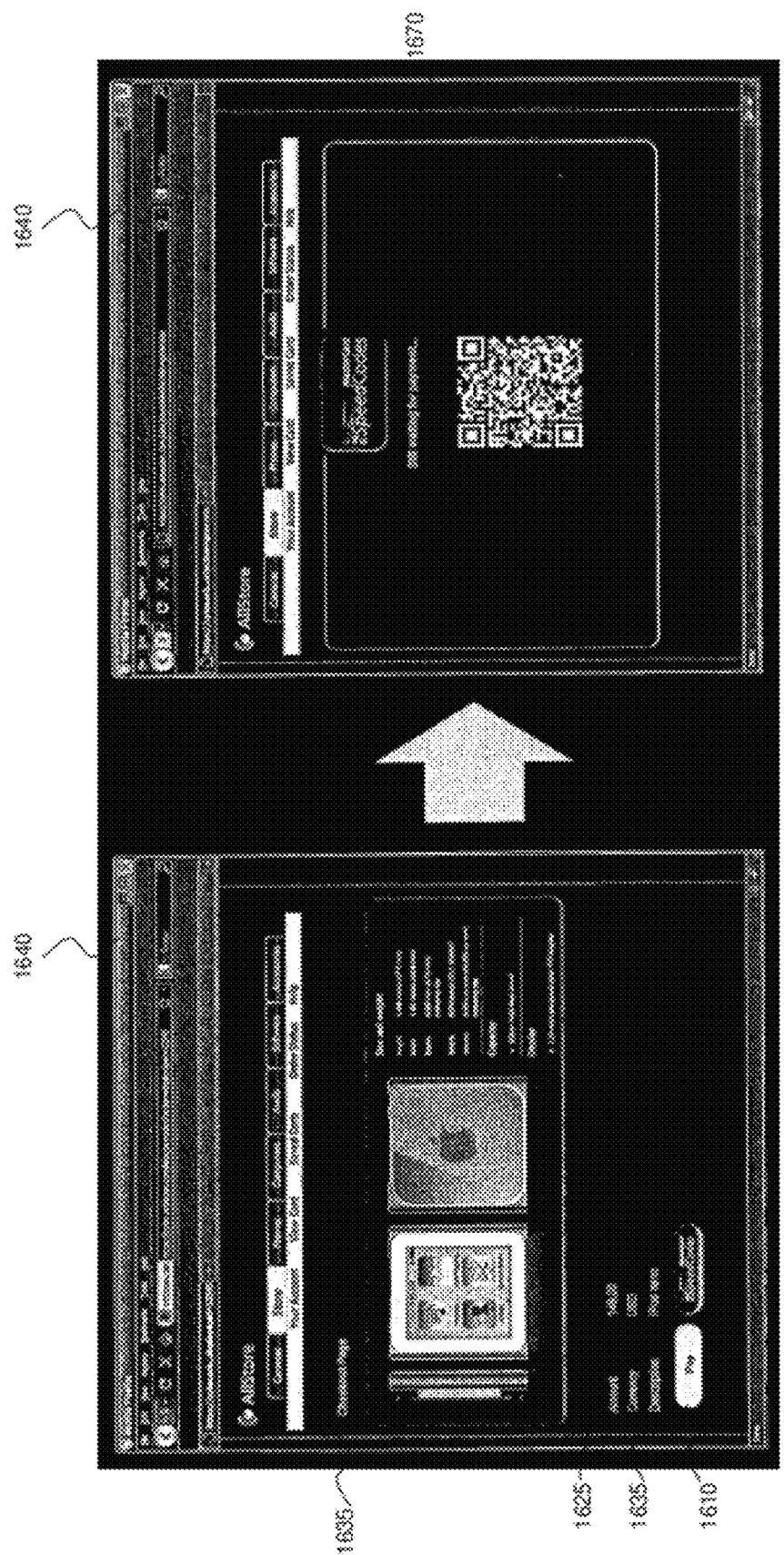
FIGS. 15A-15C are diagrams illustrating a graphical user interface (GUI) for pay code processing.
Figure 15C:
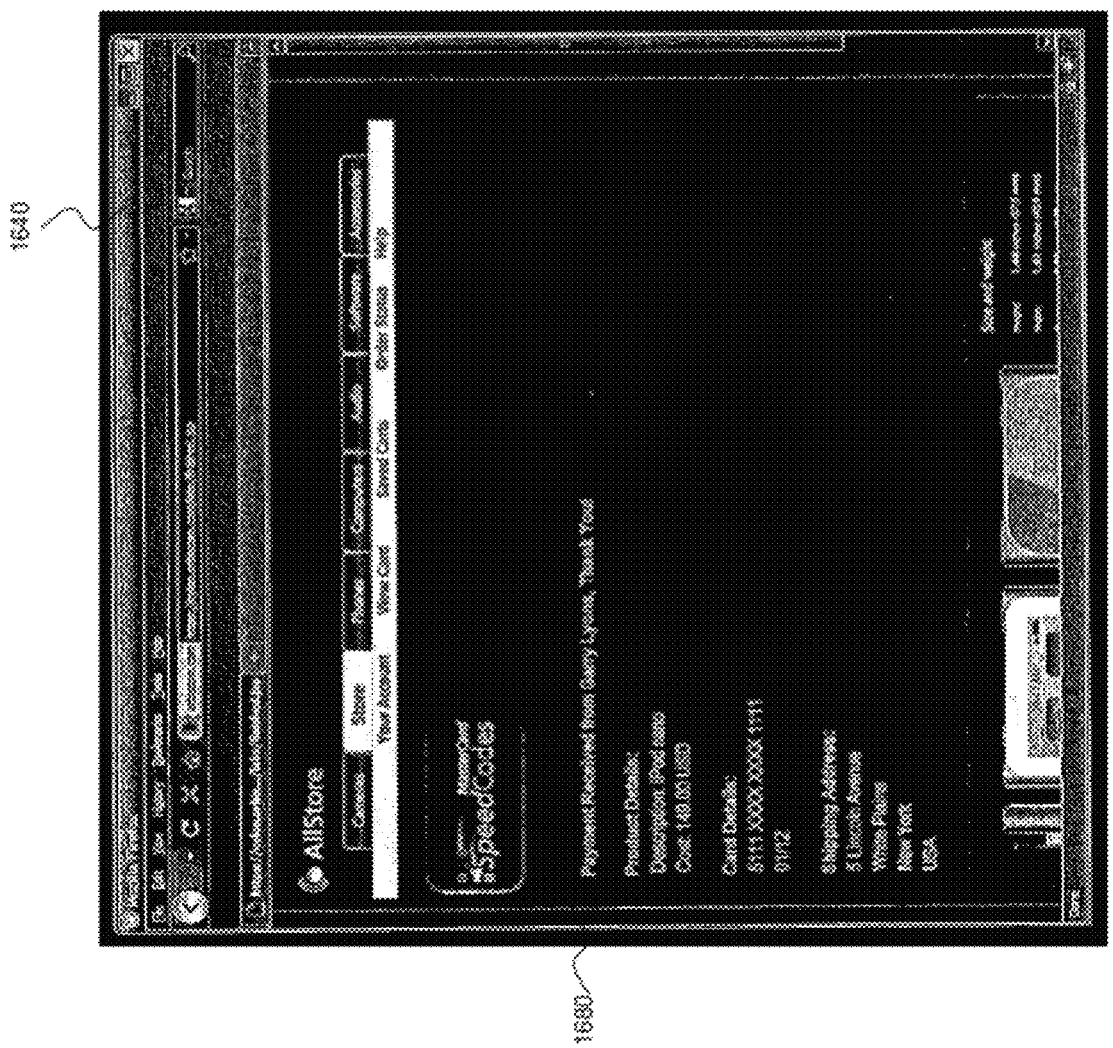

FIGS. 15A-15C illustrate a graphical user interface (GUI) including a pay code used in a checkout operation for purchasing a consumer good using a payer device 10A.

FIGS. 16A-16F illustrate a graphical user interface (GUI) of the payer device 10A used for the purchase in FIGS. 15A-15C.

Referring to FIGS. 15A-15C and 16A-16F, after a product (e.g., a consumer good or service) is selected for purchase, the GUI of a computer display 1640 may display a first web page 1630 that may include first and second selectors 1610 and 1620. The first selector 1610 may enable payment via a first mode using conventional checkout methods including payment by a credit card, a debt card, PayPal, etc. The second selector 1620 may enable payment using a pay code and a communication device (e.g., the payer device 10A). The web page 1630 may include the first selector 1610, the second selector 1620, a price indicator 1625, a currency type indicator 1635 and/or product details 1645. For example, responsive to selection of the second selector 1620, a second web page 1670 may be display presenting a pay code 1650 for purchase of the product.

After the purchase of the product is completed, a third web page 1680 may be displayed on the computer display

1640. The third web page may include a confirmation of the purchase including transaction details such as (1) the product details 1685 (e.g., a product description, the product cost, the currency type associated with the transaction, etc.); (2) the card details 1686 (e.g., a credit card account, the expiration date associated with the card, security number, etc.) and/or (3) shipping details 1687 (the shipping address, any special handling details, etc.).

The user 10 may use the payer device 10A with a pay code mobile application (mobile app) loaded or some other purchasing application. The payer device 10A may include a GUI display and an imaging device, such as a camera. The mobile app may provide in the GUI display first through fourth selectable display windows 1710, 1720, 1730 and 1740. The first selectable display window 1710 may enable scanning of the pay code 1650 directly from the second web page 1670 or via a printout of the second web page 1670. The second selectable display window 1720 may enable the user 10 to position or reposition the payer device 10A (e.g., imaging device) to properly set the pay code 1650 in the image for proper scanning. The third selectable display window 1730 may enable viewing of the product details. The fourth selectable display window 1740 may enable confirmation of transaction details and/or confirmation of payment approval.

The first selectable display window may include a pay icon 1712, a receive icon 1714, and a cart icon 1716. The selection of the pay icon 1712 may enable viewing of the fourth selectable display window 1740. The selection of the receive icon 1714 may enable scanning of the pay code 1650. The selection of the cart icon 1716 may enable viewing of the third selectable display window 1730 showing product details of items in the cart (e.g., based on the pay code 1650 of products or services that have been scanned). The second selectable window 1720 may include a cancel icon 1722 enabling the cancelation of the scanning process and/or a scanning icon (not shown) that may enable scanning of the pay code 1650 or rescanning of the pay code 1650, when the pay code image is outside of the view finder 1725.

Responsive to imaging of the pay code 1650, the second selectable display window 1720 may be displayed that enables the user 10 to position or reposition the payer device 10A (e.g., imaging device) to properly set the pay code 1650 in the image for proper scanning.

The third selectable display window 1730 (or details screen) on the payer device 10A may enable the user 10 to view the product details 1732, may provide a user input area 1734 for a user to enter the quantity of the product to be purchased. In some embodiments, the quantity may default to one. After the user 10 inputs the quantity, the user 10 may choose to buy the product by selecting a "Buy Now" icon or via other selection means.

Responsive to selection of the "Buy Now" button, a fourth selectable display 1740 (or the confirmation screen) of the GUI may be displayed, which may provide (e.g., present): (1) a portion of the transaction details in a order summary area 1742; (2) a second portion of the transaction details in a details area 1746; (3) one or more payment options available to purchase the product in a payment option area 1744; and/or (4) one or more possible shipping locations options in the payment option area 1744. The payment and shipping options may be preset by the user 10 prior to purchase of the product or may be established or overwritten for completion of the purchase of the product using the payment option area 1744. In one exemplary embodiment, the user 10 has selected to ship the product to his home address and to use his MasterCard® account to pay for the purchase of the product. Responsive to selection of the payment by the user 10 via the "Pay Now" icon 1748, the payment may be made via the payer device 10A and pay code server 50 and confirmation of the payment may appear on the payer device 10A as one or more overlays 1750 on the fourth selectable display window 1740.

In some exemplary embodiments, it is contemplated that the pay code may alternatively be transferred via wireless communication such a WiFi or Bluetooth. In some exemplary embodiments, discounts may be available if goods or services are purchased using pay codes, or goods and services may be offered exclusively to customers using pay codes.

Although operation of the payer device GUI is described using a pay code scanned from a web page, it is contemplated that the pay code may be provided for scanning from any number of different mechanisms. For example, pay codes may be placed on advertisements, product containers, invoices, bills, movie or entertainment posters, etc. It is further contemplated that the payer device GUI may work with any pay code as long as it identifies the transaction details (e.g., the transaction skeleton and/or transaction ID). In some exemplary embodiments, the GPS or WiFi location services offered by smart phones and the like can be used, as well as additional information about the user, e.g., when ordering a taxi or other delivery type service to the current location of the user, through another party's web site, for instance.

As described herein, for example, the systems described above may be embodied in software (e.g., a plug-in or standalone software), in a machine (e.g., a computer system, a microprocessor-based appliance, etc.) that includes software in memory, or in a non-transitory computer-readable storage medium configured to carry out the transaction schemes (e.g., in a self contained silicon device, a solid state memory, an optical disc, a magnetic disc, etc.).

Distribution of Data to Mobile Device Prompted by Acoustic Stimuli

Figure 17:
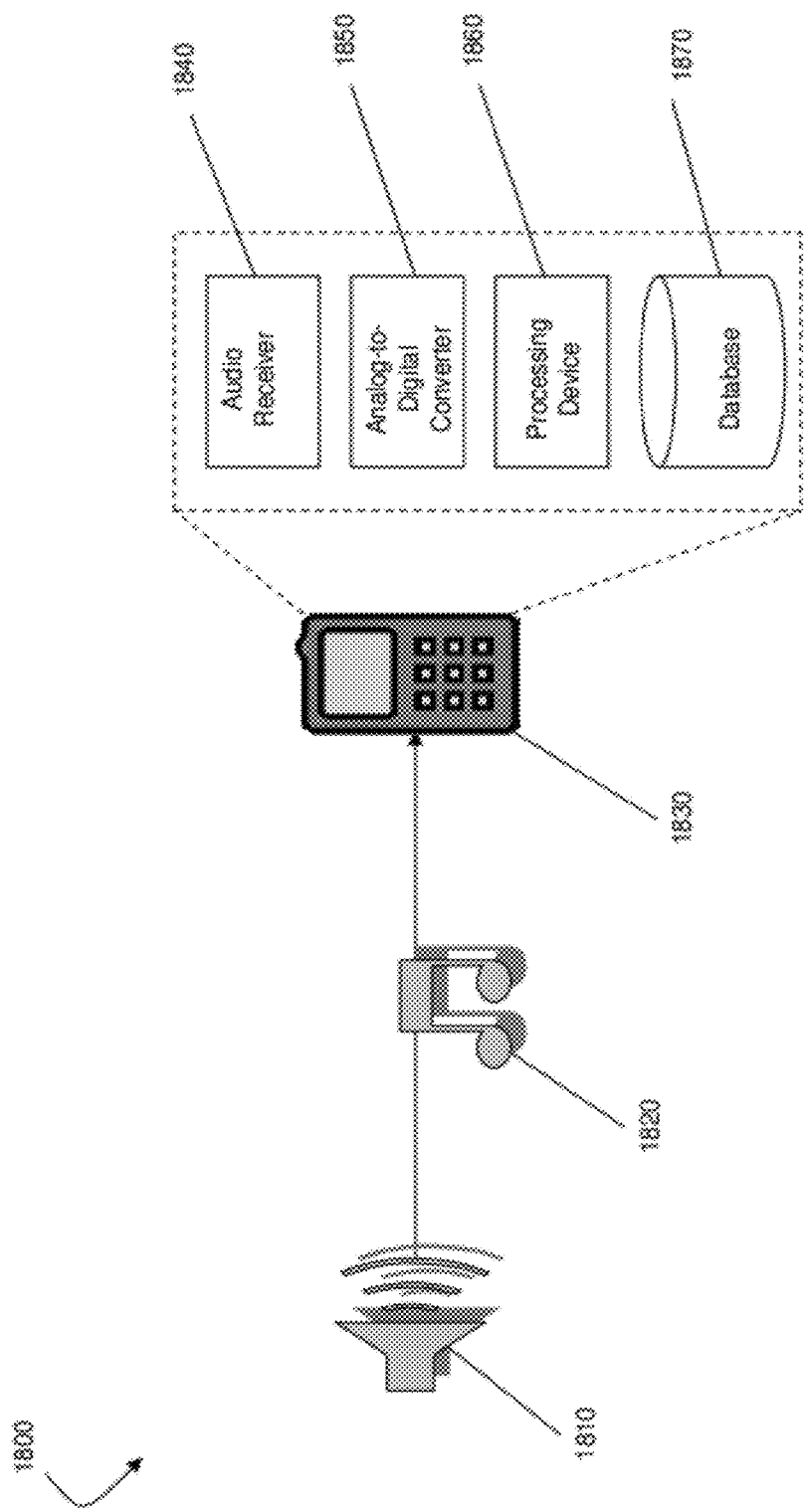
FIG. 17 is a block diagram illustrating an exemplary system for context-based data distribution according to exemplary embodiments.

FIG. 17 illustrates a block diagram of an advertising system 1800 for distributing context based advertising on a mobile device prompted by acoustic based stimuli, according to an exemplary embodiment of the present disclosure. Herein, "acoustic" is intended to include its broadest meaning with respect to sound, both audible by humans and beyond human hearing, both at frequencies above and below normal human prescription. The advertising system 1800 includes an acoustic emitting device 1810, acoustic signal 1820, and acoustic receiving device 1830.

The acoustic emitting device 1810 is configured to emit a high frequency acoustic stream. A high frequency acoustic steam is a stream of sound that is outside the audible spectrum of a human, or greater than 21,000 Hz. The acoustic emitting device 1810 may be any device capable of transmitting a suitable high frequency acoustic stream, such as a radio, television, computer, or a mobile device, for instance. The acoustic signal 1820 is emitted from the acoustic emitting device 1810. In an exemplary embodiment, the acoustic signal 1820 may be embedded into a visual or acoustic based advertisement, such as a poster or window display. In accordance with an exemplary embodiment, the acoustic signal may include encoded data, such as a unique reference to a product or a stream of binary data. In one exemplary embodiment, the encoded data is a pay code representation of a transaction skeleton as described above. Any method of data encoding that is suitable for the transfer of data as an acoustic signal can be used, such as amplitude-shift keying or frequency-shift keying, for example.

The acoustic receiving device 1830 is configured to recognize the acoustic signal 1820 through the included acoustic receiver 1840. The acoustic receiving device 1830 can be any device capable of performing the functions as discussed herein, such as a mobile device or laptop computer, for example. In an exemplary embodiment, the acoustic receiving device is a cellular phone and/or smart phone, which in some embodiments, may also be capable of reading machine-readable representations of data, such as a bar code. The included acoustic receiver 1840 is any device capable of recognizing the acoustic signal 1820, such as a microphone. The acoustic receiving device 1830 also includes an analog-to-digital converter 1850, a processing device 1860, and a database 1870.

The analog-to-digital converter 1850 converts the recognized acoustic signal from an analog signal into a digital signal. The processing device 1860 then analyzes the converted acoustic signal and decodes the encoded data in the acoustic signal. The processing device 1860 can include any device capable of performing the functions discussed herein, such as a central processing unit (CPU) or a plurality of CPUs. In one exemplary embodiment, the decoded data itself is displayed on the acoustic receiving device 1830. The decoded data can include product information, news items, coupons, special offers, or any other information that could benefit a consumer. In one exemplary embodiment, the decoded data is a machine-readable code representation of data, such as a bar code (e.g., a QR code) containing a transaction skeleton for a financial transaction. The acoustic receiving device 1830 may also be used in order to carry out the corresponding financial transaction as described above.

In one exemplary embodiment, the decoded data is a unique reference to a product stored in the database 1870. The database 1870 can be included in the acoustic receiving device 1830, but may also be external to the device and accessed via a communication network such as a local area network (LAN) or the Internet. The database 1870 may contain product information, such as a product summary, product specifications, retail price, sizing information, etc. In an exemplary embodiment, the database 1870 contains merchant and purchasing information corresponding to the product. The information included in the database 1870 corresponding to the product may be displayed to the consumer on the acoustic receiving device 1830.

Exemplary Method of Acoustic-Based Distribution

Figure 18:
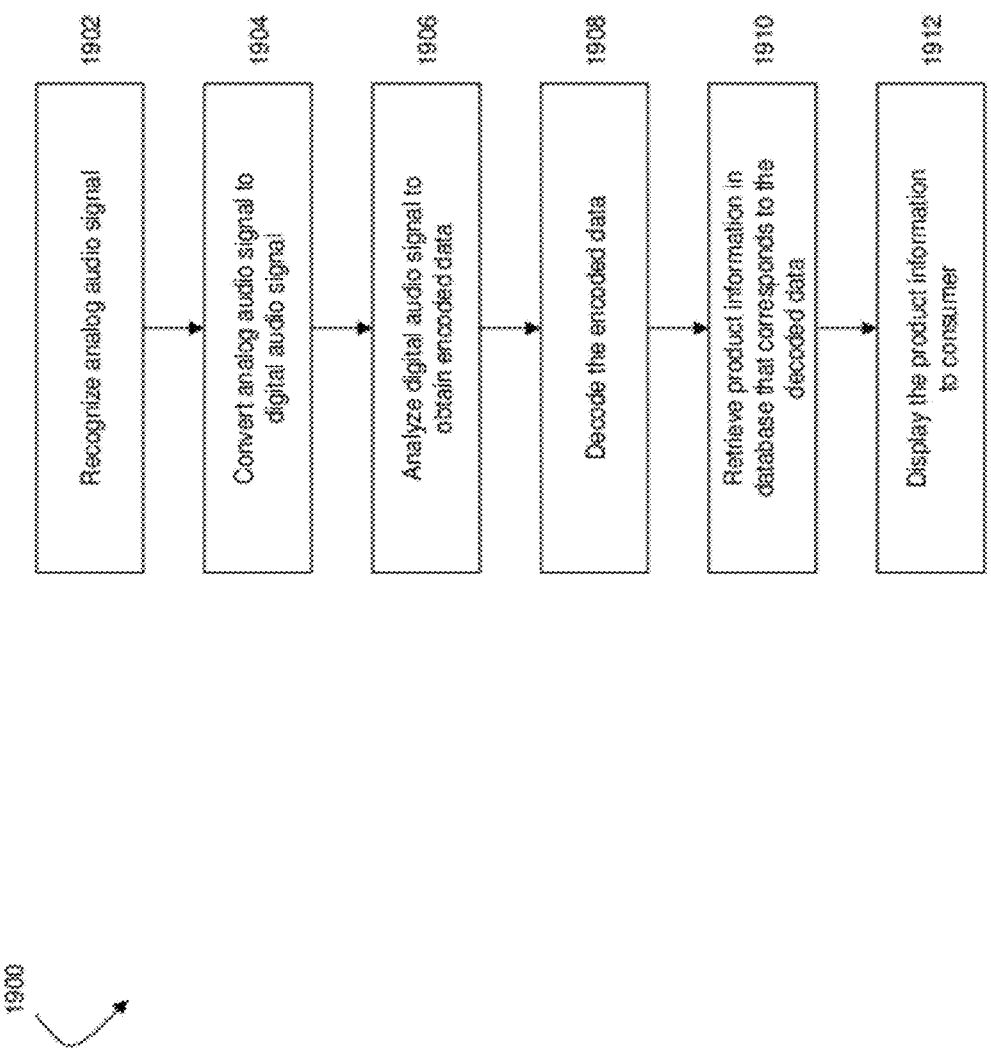
FIG. 18 is a flow diagram illustrating a method for context-based data distribution via the system of FIG. 17 according to exemplary embodiments.

FIG. 18 is a flowchart that illustrates a method 1900 for distributing context based advertisements on a mobile device via the system of FIG. 17, according to an exemplary embodiment of the present disclosure.

In step 1902, the acoustic receiving device 1830 recognizes an analog acoustic signal. The analog acoustic signal contains a high frequency acoustic stream of at least 21,000 Hz, outside the audible spectrum of a human. In step 1904, the analog-to-digital converter 1850 converts the analog acoustic signal to a digital acoustic signal. In step 1906, the processing device 1860 analyzes the digital acoustic signal to obtain encoded data, and decodes the data in step 1908. Encoding schemes such as amplitude-shift keying or frequency shift keying can be used. In accordance with an exemplary embodiment, the data decoded in step 1908 can be a unique reference to a product. In one exemplary embodiment, the data decoded is a machine-readable code representation (e.g., a QR code) of a transaction skeleton.

In step 1910, the decoded data is used to locate product information in a database 1870 and retrieve the information. The information may include, for example, a product description, a product summary, merchant information, retail price for the product, etc. In an exemplary embodiment, the information allows the consumer to immediately purchase the product from a predetermined merchant or to choose from a list of merchants who sell the product. In another exemplary embodiment, a financial transaction is initiated based on a transaction skeleton represented in the decoded data. Product information retrieved may also include coupons, special offers, news items, or other information that may be beneficial to a consumer. In step 1912, the information is displayed (e.g., presented) to the consumer on the acoustic receiving device 1830.

In one exemplary embodiment, in step 1912 a financial transaction can be initiated based on the information retrieved from the database 1870. For example, the consumer's mobile device may initiate a transaction from a specific merchant for a specific product as specified in the database 1870, e.g., by connecting to a transaction website on which the product can be purchased. In one exemplary embodiment, if the database 1870 contains only product information, the consumer's mobile device may display a list of multiple merchants with which to initiate a financial transaction for the product, or may initiate a transaction with a predetermined merchant. In some exemplary embodiments, the decoded data may be a pay code, and the acoustic receiving device 1830 may be payer device 10A.

The exemplary system and method for distributing data prompted by acoustic based stimuli has a wide variety of applications, not limited to advertising or consumer products. For instance, the system and method has additional educational applications, such as for use in museums. An acoustic emitting device can be placed near exhibits or points of interest in a museum, and the guest's mobile device used as an acoustic receiving device. The acoustic emitting device may emit a high frequency acoustic stream to an area near the exhibit, and when the mobile device recognizes the stream can display to the guest information related to the exhibit they are viewing.

The use of high frequency acoustic streams can also be used to assist with the visually impaired. Placement of acoustic emitting devices and the use of sound or vibration functions when a cellular phone or other mobile device recognizes an acoustic stream may notify a visually impaired person of an obstacle or assist with navigation of an unfamiliar area.

Voice and Human Based Gesture Actions

Figure 19:
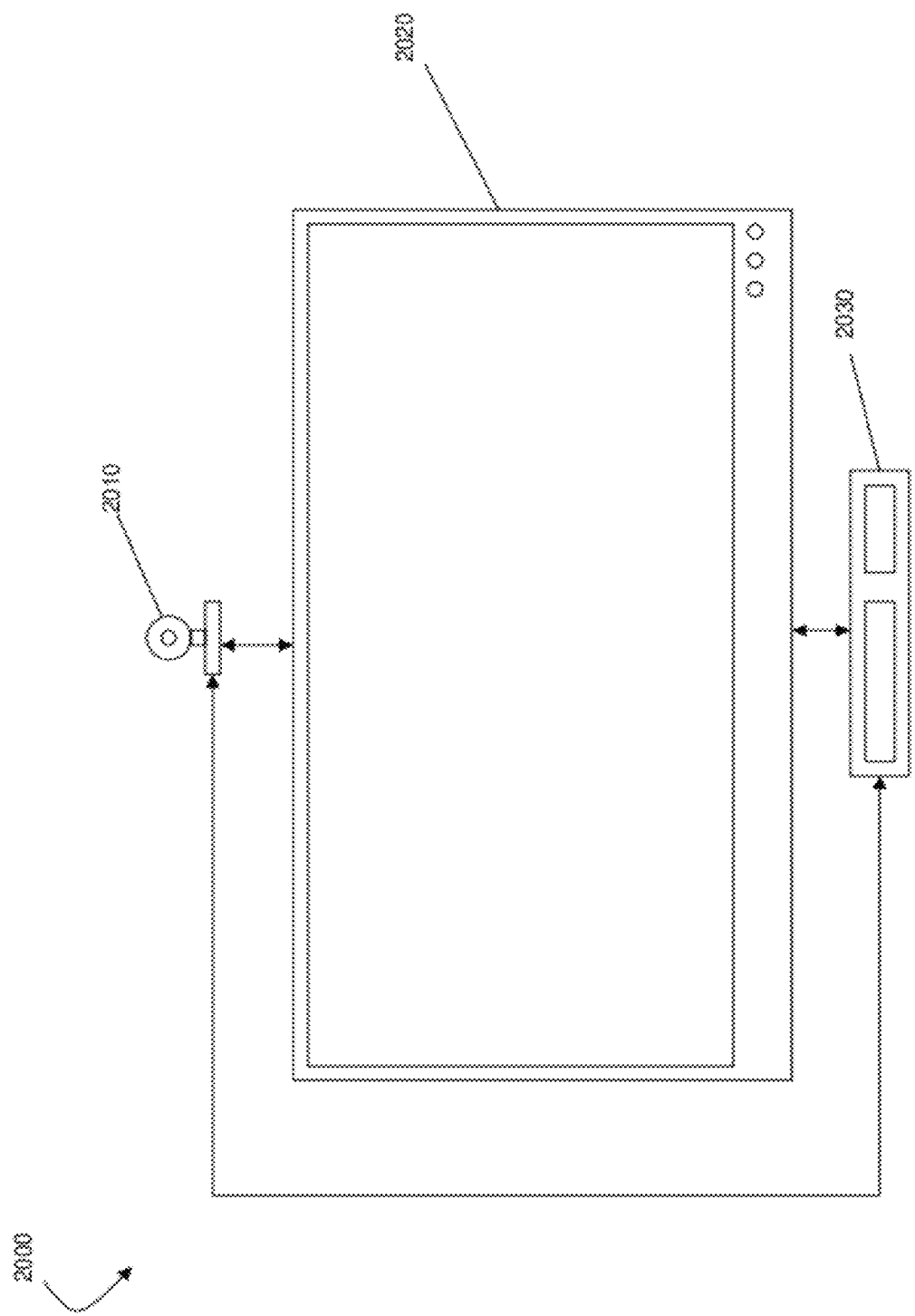
FIG. 19 is a block diagram illustrating an exemplary system for initiating a consumer transaction using voice and human based gesture actions according to exemplary embodiments.

FIG. 19 shows a system 2000 for purchasing products or services through the use of voice and human based gesture actions that includes a human interaction device 2010, display device 2020, and processor device 2030.

Human interaction device 2010 of the system 2000 is a device that is configured to read voice and/or human based gesture actions, e.g., a microphone, camera, or a hybrid device (such as Microsoft® Kinect™ or PlayStation® Eye™). The human interaction device 2010 may transmit voice and/or human based gesture action data to the processor device 2030. Transmission can be through a physical connection, such as a coaxial cable, or through a communication network, such as a local area network (LAN) or the Internet, for instance.

The display device 2020 is a device configured to display visual data to a consumer, such as a television or computer monitor. In some embodiments, the human interaction device 2010 is integrated with the display device 2020, such as in a computer monitor with built-in webcam. The processor device 2030 is configured to receive voice and/or human based gesture action data from the human interaction device 2010 and to transmit display data to the display device 2020. The processor device can be, for example, a set-top box, a gaming device, or a DVD or Blu-Ray player, for example. In some embodiments, the display device 2020 and the processor device 2030 are integrated as a single apparatus, such as in a smart television or a computer. In some embodiments, the system 2000 is contained in a single apparatus, such as a laptop computer with a built-in webcam.

Data that is transmitted from the processor device 2030 to the display device 2020 may contain event data. Event data may be included in video data, acoustic data, or in a combination of both acoustic and video data. Event data may be visible or audible to a consumer (e.g., in a visual advertisement) or may be invisible to a consumer, such as by including event data in a vertical blanking interval of a video transmission. Transmission of event data may include any type or manner of transmission suitable for the systems and methods and discussed herein. Information included in the event data may include product information, transaction identification, machine-readable code, merchant information, etc.

Figure 20:
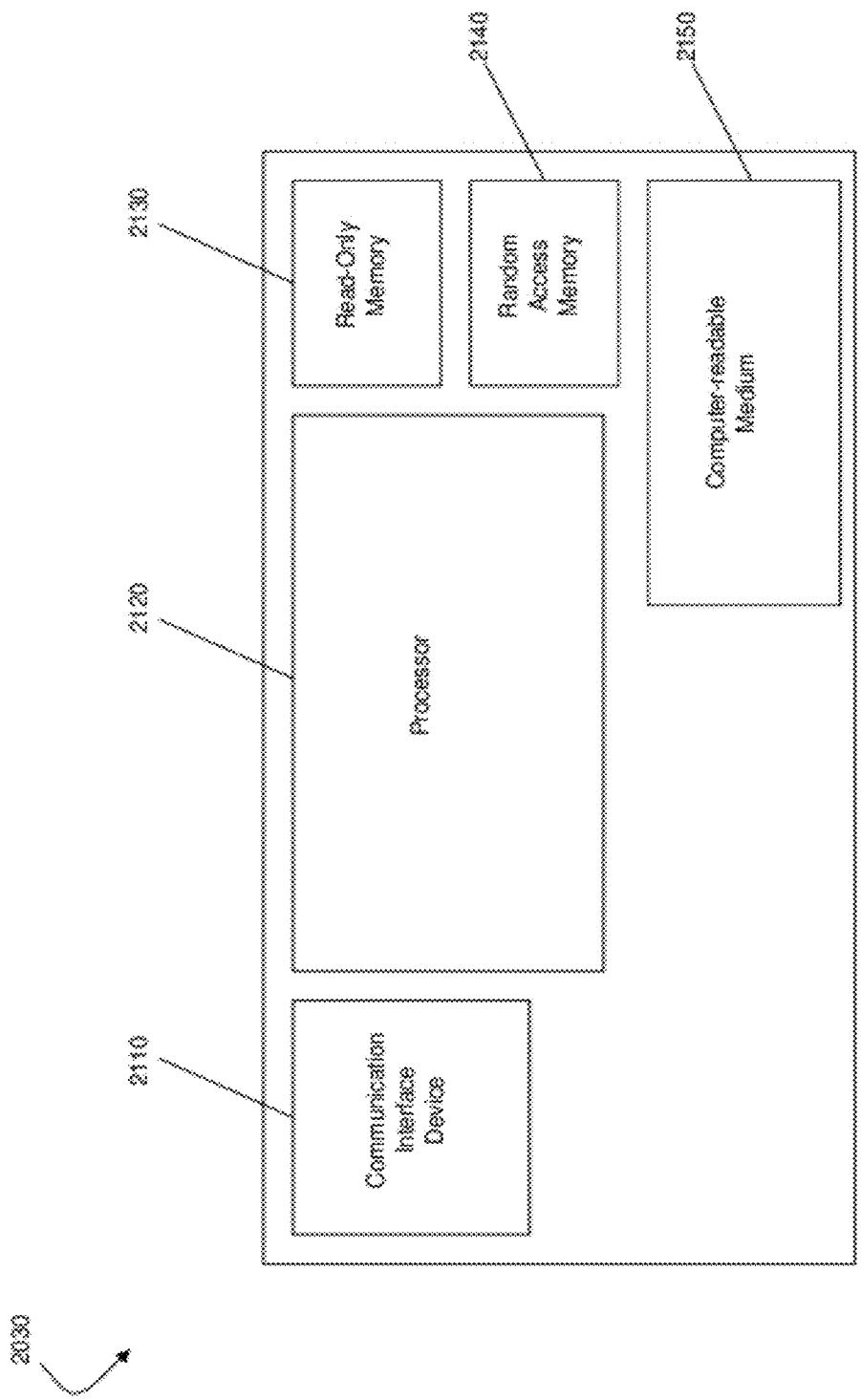
FIG. 20 is a block diagram illustrating a processor device for use in the system of FIG. 19 according to exemplary embodiments.

FIG. 20 is a block diagram illustrating the processor device 2030 according to an embodiment of the disclosed system. The processor device 2030 includes a communication interface device 2110, processor 2120, read-only memory 3130, random access memory 2140, and hard disk drive 2150.

The communication interface device 2110 provides one or more communication paths from the processor device 2030 to and from other systems. The communication interface device 2110 is configured to at least receive voice and/or human based gesture data from the human interaction device 2010 and send visual data to the display device 2020.

The processor 2120 is a device suitable for performing the functions discussed herein, such as a central processing unit (CPU) or a plurality of CPUs. The processor may operate via implementations of hardware, of software, or of a combination of both hardware and software. For example, the processor may utilize software stored in read-only memory 2130 or hard disk drive (computer-readable medium) 2150. The processor is configured to analyze data, such as video and human based gesture data that can be stored, for example, in random access memory 2140 or computer-readable medium 2150. Computer-readable medium 2150 may be any type of non-transitory computer-readable medium suitable for performing the functions discussed herein, e.g., hard disk drive, solid state drive, compact disc, digital versatile disc, etc.

Exemplary Method of Voice or Gesture-Based Transacting

FIG. 21 is a flowchart illustrating a method 2200 for purchasing products or services through the use of voice and/or human based gesture actions.

In step 2202, the processor device 2030 monitors for event data that corresponds to a possible consumer purchase (e.g., product information, product description, merchant information, etc.). In one embodiment, event data may be transmitted to the processor device 2030 at the same time as an advertisement to be displayed. In another embodiment, event data may be stored in a database that can be external to, or included as part of, the processor device 2030.

In step 2204, the processor device 2030 determines if event data has been received. If there has been no receipt of event data, it returns to step 2202 where it continues to monitor for event data. If the event data has been received, the processor device 2030 determines if the corresponding event is occurring. The corresponding event may be, for example, a commercial, a movie, or a sporting event. If the event is not occurring, it returns to step 2202 and continues to monitor for data. If the event is occurring, it means that there is currently at least one product eligible for a transaction. In one embodiment, this is signified by an icon on the display device 2020 to notify the consumer that product(s) are available for purchase through voice or gesture based actions.

If the event is occurring (2206), the processor device 2030 monitors for voice and gesture data in step 2208. Voice and gesture data can include, for example, the consumer speaking a specific, preset phrase, or by waving the consumer's left hand in the air. If voice or gesture data is not detected in step 2208, then the processor device returns to step 2206 to determine if the event is still occurring. If voice or gesture data is received, then it proceeds to step 2212 and initiates the transaction.

In an exemplary embodiment, once the transaction has been initiated, a pay code may be transmitted (e.g., sent) to the consumer's mobile device (e.g., payer device 10A) or displayed on the display device 2020. The consumer can then read (e.g., scan) the pay code and carry out the financial transaction as described above.

The system may also be configured to utilize a consumer's electronic wallet. An electronic wallet if a safe and convenient method for consumers to engage in electronic purchases, such as by securely saving payment information for one or more methods of payment (e.g. a credit card, an electronic check, an ACH transfer from a bank account, or additional payment methods such as PayPal, etc.). It can also store other useful information such as billing or shipping addresses. A consumer's electronic wallet can be associated with them in the system and readily used when they initiate a transaction.

In some instances, multiple consumers may utilize a single system for making purchases using voice or human based gesture actions. In these instances, biometric data can be utilized to distinguish one consumer from another. For example, the consumer's vocal patterns can be used as an identifier when the human interaction device 2010 is a microphone. If the human interaction device 2010 is a camera, facial or retinal recognition can be used as an identifier. In some instances, multiple identifiers may be used for security reasons, such as requiring both vocal and retinal identification. Additionally, the system can be configured to require a consumer personal identification number (PIN) to complete a transaction.

When a consumer initiates a transaction, the system may display (e.g., on the display device 2020 or on the consumer's mobile device) purchasing information for the consumer that corresponds to the specific product and merchant in the advertisement. In one exemplary embodiment, the system may display a machine-readable pay code on the display device 2020. In instances where multiple products are advertised, or when a product is advertised not tied to a specific merchant, a list of products or merchants may be displayed to the consumer. Additional voice or human based gesture actions may be used in order to select among the products or merchants. For example, a cursor can be displayed on the display device 2020 that may be moved through arm gestures or by vocal commands, or the choices may be displayed in a list with the consumer speaking or gesturing their choice in the list (e.g., holding up nine fingers for the item listed ninth). Such a selection method may also be used for the consumer to select between multiple methods of payment or between multiple shipping addresses.

Location- and History-Based Distribution of Offers to a Mobile Device

Figure 23:
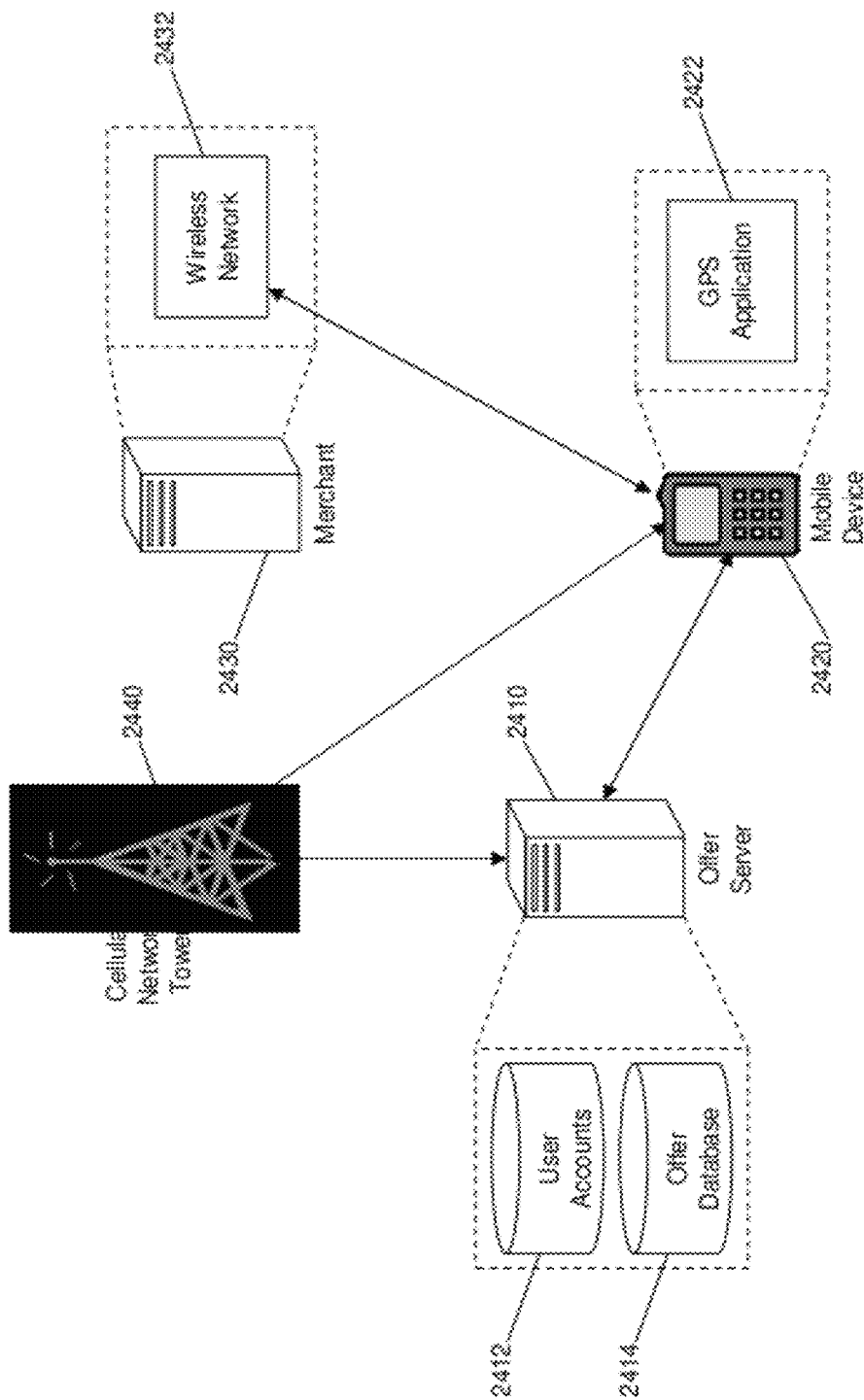
FIG. 23 is a block diagram illustrating a system for distributing offers to a mobile device according to exemplary embodiments.

FIG. 23 illustrates a block diagram of a system for distributing offers to a mobile device. The system may include an offer server 2410, a mobile device 2420, a merchant 2430, and a cellular network tower 2440.

The offer server 2410 may be configured to identify the geographic location of the mobile device 2420. The identification of the geographic location of the mobile device 2420 may be obtained by using, for example, the Global Positioning System (GPS), cellular network tower triangulation (commonly known as Assisted GPS), or Wi-Fi or wireless networks, or any combination thereof.

By way of example, the geographic location of the mobile device 2420 may be obtained by using GPS, such as through GPS application 2422 included on the mobile device 2420. The mobile device 2420 may be in communication with at least one cellular network tower 2440 in order to determine its location. In an exemplary embodiment, the mobile device 2420 is in communication with at least three cellular network towers 2440 for the purposes of triangulation of the mobile device 2420. In one embodiment, the merchant 2430 may include a wireless network 2432. In such an embodiment, the geographic location of the mobile device 2420 may be identified when the mobile device 2420 connects or is otherwise in communication with the wireless network 2432. Other suitable methods of identification of the geographic location of the mobile device 2420 will be apparent to persons having skill in the relevant art.

The offer server 2410 may also be configured to identify the geographic location of the merchant 2430, or may store location information of the merchant 2430 in a database (not shown) either included in the offer server 2410, external to the offer server 2410, or in combination thereof.

The offer server 2410 may also include a user accounts database 2412 and an offer database 2414. These databases may be included as part of the offer server 2410, may be stored externally to the offer server 2410, or in combination thereof. The user accounts database 2412 may include information associated to a user of the mobile device 2420. The information stored in the database 2412 may include a history of financial transactions between the user of the mobile device 2420 and the merchant 2430 if elected by the user. The financial transaction history may be minimal (e.g., only the existence of past transactions) or may include the number of transactions, the amount of each transaction, the time and date of each transaction, or the goods or services purchased in each transaction, for example.

The offer database 2414 may include at least one offer, which the offer server 2410 may be configured to distribute to the mobile device 2420. The offer may only be distributed to the mobile device 2420 if the offer server 2410 identified at least one previous financial transaction between the user of the mobile device 2420 and the merchant 2430 stored in the user accounts database 2412. The offer may be for goods or services, and may be associated with the merchant 2430. The offer may also be an advertisement or a machine-readable code (e.g., a bar code) that when read by the mobile device 2420 initiates a financial transaction with the merchant 2430 for goods or services.

The merchant 2430 may be proximate to the geographic location of the mobile device 2420 identified by the offer server 2410. The proximity of the merchant 2430 may vary from merchant to merchant, offer to offer, or user to user. The proximity may also be based on the number of additional merchants nearby. For example, if the merchant 2430 is the only merchant in a shopping center, offers associated with the merchant may be distributed if the mobile device 2420 is identified as being within one mile of the merchant, but if the merchant is located within a shopping mall that includes a plurality of other merchants, the mobile device 2420 may be required to be within five hundred feet of the merchant 2430 before an offer that is associated with the merchant 2430 may be distributed to the mobile device 2420.

Exemplary Method for Distribution of Location- and History-Based Offers

Figure 24:
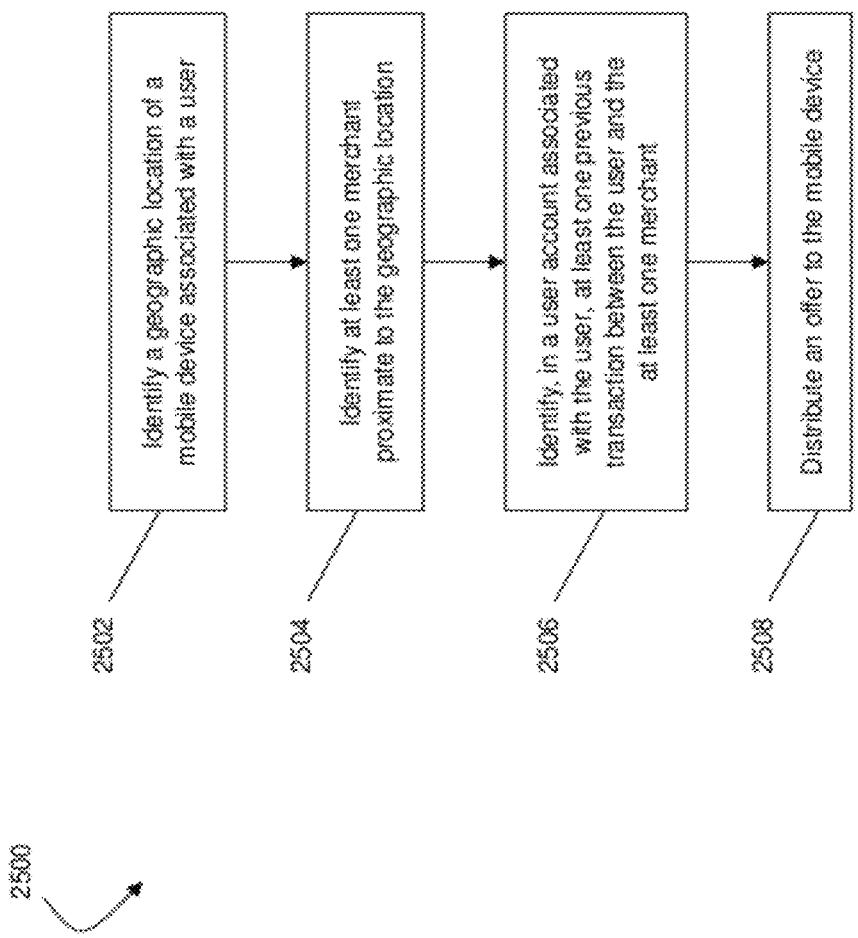
FIG. 24 is a flow diagram illustrating a method for distributing offers to a mobile device according to exemplary embodiments.

FIG. 24 is a flow diagram illustrating an exemplary method for distributing offers to a mobile device in accordance with exemplary embodiments.

In step 2502, the offer server (e.g., offer server 2410) may identify a geographic location of a mobile device (e.g., mobile device 2420) associated with a user. In one embodiment, the offer server uses GPS, Assisted GPS, wireless network discovery, or a combination thereof. In step 2504, the offer server may identify at least one merchant (e.g., merchant 2430) proximate to the geographic location.

In step 2506, the offer server may identify, in a user account associated with the user (e.g., stored in user accounts database 2412), at least one previous transaction between the user and the at least one merchant. In one embodiment, the server must identify at least three previous transactions between the user and the at least one merchant. In step 2508, an offer is distributed to the mobile device. In one exemplary embodiment, the offer is an offer for goods or services and the offer is associated with the at least one merchant. In one embodiment, the mobile device is a mobile communication device configured to read machine-readable code, and the offer is a machine-readable code that initiates a financial transaction with the at least one merchant when read by the mobile device.

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently. For example, although the multiple payer pay code flow (FIGS. 7A-7C) is disclosed and illustrated as being configured to have payer device 10A receive the transaction details and pay prior to payer device 10B, payer device 10B can receive and pay prior to payer device 10A as well.

Techniques consistent with the present disclosure provide, among other features, systems and methods for distributing content to devices, initiating financial transactions, processing electronic financial transactions using a payer device and pay codes, and indirectly controlling websites. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for initiating a consumer transaction, comprising:

receiving, in a processing device and from an external device, video data, wherein the video data comprises at least first video data to be displayed;

transmitting the first video data from the processing device to a display device;
analyzing, by the processing device, the first video data for event data, the first event data originating from a pay code server;
receiving, in the processing device, first event data, wherein the first event data is associated with (i) at least one consumer product or service and (ii) the first video data;
transmitting, from the processing device and to the display device, a machine-readable pay code encoded with pay code data based upon the received first event data, wherein the machine-readable pay code is displayed on the display device and the pay code data indicates the at least one product or service is available for purchase;
responsive to a consumer device reading, via an optical device, the machine-readable pay code displayed on the display device to decode the encoded pay code data, initiating, by the processing device, the consumer transaction by transmitting, to the display device, an interactive notification associated with purchase information corresponding to the at least one product or service available for purchase, wherein the interactive notification is displayed on the display device;
reading, in a contactless manner and by a human interaction device, human based gesture actions responsive to the displayed interactive notification;
analyzing, by the processing device, the human based gesture actions;
determining, by the processing device, that the human based gesture actions conform to a predetermined second set of interaction requirements;
receiving, in the processing device, indications of payer selected transaction options based upon the human based gesture actions;
transmitting, electronically from the processing device, the indications to the pay code server; and
receiving, in the processing device, an indication that electronic financial transaction processing of payment from a payer to payee has been initiated.

2. The method of claim 1, wherein the human interaction device includes a camera and/or a microphone.

3. The method of claim 1, wherein the display device and the human interaction device are a single device.

4. The method of claim 1, wherein the processing device, the display device, and the human interaction device are a single device.

5. The method of claim 1, wherein the event data is included in a vertical blanking interval of the transmitted first video data.

6. The method of claim 1, wherein the payer selected transaction options include at least one option selected from the group consisting of quantity, quality, color, and size.

7. The method of claim 1, wherein the payer selected transaction options include selection of a funding source.

8. The method of claim 1, wherein the payer selected transaction options include user selected shipping details.

9. The method of claim 1, wherein the first event data is associated with a content of the first video data.

10. The method of claim 1, wherein the video data further comprises the first event data.

11. The method of claim 1, wherein the received event data is broadcast data.

12. An electronic financial transaction method, comprising:

receiving, in a processing device and from an external device, video data, wherein the video data comprises at least first video data to be displayed;
transmitting the first video data from the processing device to a display device;
monitoring, by the processing device, the first video data for event data;
receiving, in the processing device, first event data, wherein the first event data is associated with (i) at least one consumer product or service available for purchase and (ii) the first video data;
transmitting, from the processing device and to the display device, an interactive notification based upon the received first event data, wherein the notification is displayed on the display device and indicates the at least one product or service is available for purchase and prompts an interactive response;
reading, in a contactless manner and by a human interaction device, human gesture based actions responsive to the displayed notification;
analyzing, by the processing device, the human gesture based actions;
determining, by the processing device, that the human based gesture actions conform to a predetermined first set of interaction requirements, wherein the first set of interaction requirements are associated with a process for prompting communication between a payer and a pay code server; and
transmitting, responsive to the determining and by the processing device, to one of (i) the display device and (ii) a display of a payee device, a machine-readable pay code in which pay code data related to the at least one product or service available for purchase is encoded, wherein, responsive to the payer device reading, via an optical device, the machine-readable pay code displayed on one of: (i) the display device and (ii) the display of the payee device, to decode the encoded pay code data, the decoded pay code data is configured to be transmitted by the payer device to a pay code server and enable transaction details related to the at least one product or service available for purchase to be acquired by the payer device.

13. The method of claim 12, wherein the machine-readable pay code is a bar code or a video watermark.

14. The method of claim 13, wherein the bar code is a QR bar code.

15. A system for initiating a consumer transaction, comprising:

a display device;
a human interaction device configured to read, in a contactless manner, and transmit human based gesture actions; and
a processing device configured to, at least:
receive video data, from an external device, wherein the received video data comprises at least first video data to be displayed;
transmit the first video data to a display device,
analyze the transmitted first video data for event data, the first event data originating from a pay code server,
receive first event data, wherein the first event data is associated with (i) at least one consumer product or service and (ii) the first video data,
transmit, to the display device, a machine-readable pay code encoded with pay code data based upon the received first event data, wherein the machine-readable pay code is to be displayed on the display device and the pay code data indicates the at least one product or service is available for;

responsive to a consumer device reading, via an optical device, the machine-readable pay code displayed on the display device to decode the encoded pay code data, initiate, by the processing device, the consumer transaction by transmitting, to the display device, an interactive notification associated with purchase information corresponding to the at least one product or service available for purchase, wherein the interactive notification is displayed on the display device;

wherein the human interaction device is further configured to read, in a contactless manner and transmit second human based gesture actions responsive to the displayed interactive notification, and the processing device is further configured to:

receive and analyze the human based gesture actions, determine that the human based gesture actions conform to a predetermined set of interaction requirements, receive indications of payer selected transaction options based upon the human based gesture actions, electronically transmit the indications to the pay code server, and receive an indication that electronic financial transaction processing of payment from a payer to payee has been initiated.

16. The system of claim 15, wherein the human interaction device includes a camera and/or microphone.

17. The system of claim 15, wherein the display device and the human interaction device are a single device.

18. The system of claim 15, wherein the processing device, display device, and human interaction device are a single device.

19. The system of claim 15, wherein the event data is included in a vertical blanking interval of the first video data.

20. The system of claim 15, wherein the payer selected transaction options include at least one option selected from the group consisting of quantity, quality, color, and size.

21. The system of claim 15, wherein the payer selected transaction options include selection of a funding source.

22. The system of claim 15, wherein the payer selected transaction options include user selected shipping details.

23. In an electronic financial transaction system, comprising a payee device, a pay code provider, a display device, and a payer device, a transaction facilitating device comprising:

a human interaction device configured to read, in a contactless manner, and transmit human based gesture actions; and a processing device configured to, at least:

receive video data, from an external device, wherein the video data comprises at least first video data to be displayed;

transmit the first video data to the display device, monitor the first video data for event data, receive first event data, wherein the first event data is associated with (i) at least one consumer product or service and (ii) the first video data, transmit, to the display device, a notification based upon the received first event data, wherein the notification is displayed on the display device and indicates the at least one product or service is available for purchase and prompts an interactive response;

receive and analyze the human based gesture actions, wherein the human based gesture actions are received from the human interaction device, compare the human based gesture actions with a predetermined set of requirements, determine that the human based gesture actions conform to the predetermined set of interaction requirements, wherein the first set of interaction requirements are associated with a process for prompting communication between a payer and a pay code server, and transmit, responsive to the determining, to one of (i) the display device and (ii) a display of a payee device, a machine-readable pay code in which pay code data related to the at least one product or service is encoded, wherein the display device is configured to receive the video data and the notification from the processing device and display the received video data and the received notification, and responsive to the payer device reading, via an optical device, the machine-readable pay code displayed on one of: (i) the display device and (ii) the display of the payee device, to decode the encoded pay code data, the payer device is configured to transmit to the pay code server the decoded pay code data to request the transaction details for the at least one product or service from the pay code server, and configured to display the transaction details received from the pay code server.

* * * * *